US011395235B2

(12) United States Patent
Yang et al.

(10) Patent No.: US 11,395,235 B2
(45) Date of Patent: Jul. 19, 2022

(54) POWER CONTROL ENHANCEMENT FOR INTER-USER EQUIPMENT MULTIPLEXING

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/890,791

(22) Filed: Jun. 2, 2020

(65) Prior Publication Data

US 2020/0383061 A1 Dec. 3, 2020

Related U.S. Application Data

(60) Provisional application No. 62/888,404, filed on Aug. 16, 2019, provisional application No. 62/856,703, filed on Jun. 3, 2019.

(51) Int. Cl.
*H04W 52/14* (2009.01)
*H04W 72/14* (2009.01)
*H04W 88/02* (2009.01)

(52) U.S. Cl.
CPC ......... *H04W 52/146* (2013.01); *H04W 72/14* (2013.01); *H04W 88/02* (2013.01)

(58) Field of Classification Search
CPC .... H04W 72/14; H04W 52/146; H04W 88/02
See application file for complete search history.

(56) References Cited

U.S. PATENT DOCUMENTS

2018/0368157 A1* 12/2018 Jeon ................ H04L 5/0044
2019/0320475 A1* 10/2019 Li .................... H04W 74/02
2020/0146032 A1* 5/2020 Bae ................. H04L 27/2607

FOREIGN PATENT DOCUMENTS

WO WO-2013063802 A1 * 5/2013 .......... H04W 52/248

OTHER PUBLICATIONS

International Search Report and Written Opinion—PCT/US2020/035959—ISA/EPO—dated Sep. 3, 2020.
(Continued)

*Primary Examiner* — Keith Ferguson
(74) *Attorney, Agent, or Firm* — Holland & Hart LLP

(57) ABSTRACT

Methods, systems, and devices for wireless communications are described. A base station may signal power control parameters per configured grant to enable a user equipment (UE) to adjust a transmit power for an uplink message signaled by the configured grant. For example, the base station may transmit the power control parameters in a group-common downlink message to the UE. Accordingly, based on the power control parameters, the UE may or may not apply the power adjustment to a baseline transmit power initially signaled by the base station. In some cases, the base station may signal two power control parameters for the UE to transmit the uplink message. For example, a first power control parameter may include a transmit power control (TPC) command for transmission of the uplink message, and a second power control parameter may include a power adjustment value for transmission of the uplink message.

27 Claims, 23 Drawing Sheets

(56) References Cited

OTHER PUBLICATIONS

Vivo: "Summary#2 of UL Inter UE Tx Prioritization/multiplexing," 3GPP Draft, 3GPP TSG RAN WG1 Meeting #97, R1-1907819, Summary#2 of UL Inter UE Tx Prioritization multiplexing V3, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 20, 2019 (May 20, 2019), XP051740092, 35 pages, Retrieved from the Internet: URL: http://www.3gpp.org/ftp/tsg%5Fran/WG1%5FRL1/TSGR1%5F97/Docs/R1%2D1907819%2Ezip [retrieved on May 20, 2019] p. 16, paragraph 3.3—p. 18 p. 18, paragraph 4—p. 20 p. 25, paragraph R1-1906413 ZTE—p. 26.
ZTE: "UL inter-UE Multiplexing Between eMBB and URLLC", 3GPP Draft, 3GPP TSG RAN WG1 #97, R1-1906413, UL inter-UE multiplexing Between eMBB and URLLC, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051727863, 13 pages, Retrieved from the Internet: URL: http://www.3gpp.org/ftp/Meetings%5F3GPP%5FSYNC/RAN1/Docs/R1%2D1906413%2Ezip [retrieved on May 13, 2019] paragraphs [04.2]-[4.2.4].

\* cited by examiner

POWER CONTROL ENHANCEMENT FOR INTER-USER EQUIPMENT MULTIPLEXING

CROSS REFERENCE

The present application for patent claims the benefit of U.S. Provisional Patent Application No. 62/856,703 by YANG et al., entitled "POWER CONTROL ENHANCEMENT FOR INTER-USER EQUIPMENT MULTIPLEXING," filed Jun. 3, 2019, and to U.S. Provisional Patent Application No. 62/888,404 by YANG et al., entitled "POWER CONTROL ENHANCEMENT FOR INTER-USER EQUIPMENT MULTIPLEXING" filed Aug. 16, 2019, assigned to the assignee hereof, and expressly incorporated herein.

BACKGROUND

The following relates generally to wireless communications, and more specifically to power control enhancement for inter-user equipment (UE) multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UE.

SUMMARY

The described techniques relate to improved methods, systems, devices, and apparatuses that support power control enhancement for inter-user equipment (UE) multiplexing. Generally, the described techniques provide for signaling power control parameters per configured grant (or a group of configured grants) to enable a UE to adjust a transmit power for an uplink message signaled by the configured grant. For example, a base station may configure the power control parameters (e.g., power control fields) per configured grant and transmit the power control parameters in a group-common power control downlink control information (DCI) message to the UE (or a group of UEs communicating with the base station). Accordingly, based on the power control parameters, the UE may apply the power adjustment to a baseline transmit power initially signaled by the base station (e.g., in an initial power configuration) prior to the group-common power control DCI message transmission and transmit the uplink message indicated by the configured grant at the adjusted transmit power. Additionally or alternatively, the UE may not apply the power adjustment and transmit the uplink message indicated by the configured grant at the baseline transmit power. In some cases, the base station may signal two power control parameters for the UE to transmit the uplink message (e.g., a dynamic uplink message or a configured uplink message). For example, a first power control parameter may include a baseline transmit power and transmit power control (TPC) command for transmission of the uplink message, and a second power control parameter may include a power adjustment value for transmission of the uplink message. Accordingly, the UE may determine to use the first power control parameter for all subsequent uplink transmissions in addition to transmission of the uplink message but may determine to use the second power control parameter for transmission of the uplink message and not for the subsequent uplink transmissions.

A method of wireless communications at a UE is described. The method may include receiving, from a base station, a configured grant for uplink transmissions to the base station, the configured grant including an initial power configuration for the configured grant, receiving, from the base station, a group-common downlink control information message, the group-common downlink control information message including a power control parameter, receiving, from the base station, an indication that the power control parameter is associated with the configured grant, determining a transmit power for transmitting an uplink message associated with the configured grant based on the initial power configuration, the power control parameter, and the indication that the power control parameter is associated with the configured grant, and transmitting, to the base station, the uplink message according to the determined transmit power.

An apparatus for wireless communications at a UE is described. The apparatus may include a processor, memory coupled with the processor, and instructions stored in the memory. The instructions may be executable by the processor to cause the apparatus to receive, from a base station, a configured grant for uplink transmissions to the base station, the configured grant including an initial power configuration for the configured grant, receive, from the base station, a group-common downlink control information message, the group-common downlink control information message including a power control parameter, receive, from the base station, an indication that the power control parameter is associated with the configured grant, determine a transmit power for transmitting an uplink message associated with the configured grant based on the initial power configuration, the power control parameter, and the indication that the power control parameter is associated with the configured grant, and transmit, to the base station, the uplink message according to the determined transmit power.

Another apparatus for wireless communications at a UE is described. The apparatus may include means for receiving, from a base station, a configured grant for uplink transmissions to the base station, the configured grant including an initial power configuration for the configured grant, receiving, from the base station, a group-common downlink control information message, the group-common downlink control information message including a power control parameter, receiving, from the base station, an indication that the power control parameter is associated with the configured grant, determining a transmit power for transmitting an uplink message associated with the configured grant based on the initial power configuration, the power control parameter, and the indication that the power control parameter is associated with the configured grant, and transmitting, to the base station, the uplink message according to the determined transmit power.

A non-transitory computer-readable medium storing code for wireless communications at a UE is described. The code may include instructions executable by a processor to receive, from a base station, a configured grant for uplink transmissions to the base station, the configured grant including an initial power configuration for the configured grant, receive, from the base station, a group-common downlink control information message, the group-common downlink control information message including a power control parameter, receive, from the base station, an indication that the power control parameter is associated with the configured grant, determine a transmit power for transmitting an uplink message associated with the configured grant based on the initial power configuration, the power control parameter, and the indication that the power control parameter is associated with the configured grant, and transmit, to the base station, the uplink message according to the determined transmit power.

In some examples of the method, apparatuses, and non-transitory computer-readable medium described herein, determining the transmit power for transmitting the uplink message further may include operations, features, means, or instructions for determining a baseline transmit power based on the initial power configuration for the configured grant, determining a power adjustment value based on the power control parameter received in the group-common downlink control information message, and applying the power adjustment value to the baseline transmit power to obtain the transmit power for transmitting the uplink message.

Some examples of the method, apparatuses, and non-transitory computer-readable medium described herein may further include operations, features, means, or instructions for determining the power adjustment value may be further based on a modulation and coding scheme of the uplink message.

In some examples of the method, apparatuses, and non-transitory computer-readable medium described herein, the initial power configuration includes a set of one or more power adjustment values corresponding to the configured grant, and where determining the power adjustment value includes selecting the power adjustment value from the set of one or more power adjustment values.

In some examples of the method, apparatuses, and non-transitory computer-readable medium described herein, the initial power configuration includes the baseline transmit power and a set of one or more additional transmit power levels, and where determining the power adjustment value includes determining a difference between the baseline transmit power and one of the additional transmit power levels.

In some examples of the method, apparatuses, and non-transitory computer-readable medium described herein, the power adjustment value includes a power boosting value.

Some examples of the method, apparatuses, and non-transitory computer-readable medium described herein may further include operations, features, means, or instructions for receiving, from the base station, a dynamic uplink grant for a dynamic uplink transmission to the base station, the dynamic uplink grant including an additional power configuration for the dynamic uplink grant, determining an additional baseline transmit power based on the additional power configuration for the dynamic uplink grant, and determining to apply the power adjustment value to the baseline transmit power, the additional baseline transmit power, or both, based on a power adjustment parameter.

In some examples of the method, apparatuses, and non-transitory computer-readable medium described herein, the power adjustment parameter includes an indication of an open-loop power control or a closed-loop power control, and the power control parameter may be applied to the baseline transmit power but not to the additional baseline transmit power based on the open-loop power control or the closed-loop power control.

In some examples of the method, apparatuses, and non-transitory computer-readable medium described herein, the power adjustment parameter includes an indication of a set of uplink resources, and the power control parameter may be applied to the additional baseline transmit power based on determining whether the set of uplink resources overlaps at least a portion of uplink resources used for the dynamic uplink transmission and not receiving a dynamic power adjustment value in the dynamic uplink grant.

In some examples of the method, apparatuses, and non-transitory computer-readable medium described herein, the power adjustment parameter includes an indication of a set of uplink resources, and the power control parameter may be not applied to the additional baseline transmit power based on determining whether the set of uplink resources overlaps at least a portion of uplink resources used for the dynamic uplink transmission and receiving a dynamic power adjustment value in the dynamic uplink grant.

Some examples of the method, apparatuses, and non-transitory computer-readable medium described herein may further include operations, features, means, or instructions for determining to apply the power adjustment value to the baseline transmit power based on a processing time for the UE to apply the power adjustment value to the baseline transmit power.

In some examples of the method, apparatuses, and non-transitory computer-readable medium described herein, the processing time includes a minimum processing time for the UE to prepare a dynamic uplink transmission after receiving a dynamic uplink grant scheduling the dynamic uplink transmission.

In some examples of the method, apparatuses, and non-transitory computer-readable medium described herein, the power adjustment value may be applied to the baseline transmit power for the entire uplink message or not applied to the baseline transmit power for any of the uplink message based on the processing time.

In some examples of the method, apparatuses, and non-transitory computer-readable medium described herein, receiving the group-common downlink control information message including the power control parameter and receiving the indication that the power control parameter may be associated with the configured grant may include operations, features, means, or instructions for receiving multiple group-common downlink control information messages including different power control parameters, determining multiple radio network temporary identifiers corresponding to the multiple group-common downlink control information messages, and determining the power control parameter may be associated with the configured grant based on a group-common radio network temporary identifier corresponding to the group-common downlink control information message including the power control parameter associated with the configured grant, where the group-common radio network temporary identifier may be one of the multiple radio network temporary identifiers.

In some examples of the method, apparatuses, and non-transitory computer-readable medium described herein, the multiple radio network temporary identifiers may be associated with different priority levels of the configured grant, one group-common downlink control information message corresponds to one or multiple configured grants, the configured grant may be associated with a single group-common downlink control information message, or a combination thereof.

In some examples of the method, apparatuses, and non-transitory computer-readable medium described herein, determining the transmit power for transmitting the uplink message further may include operations, features, means, or instructions for receiving an index for the configured grant, and determining the transmit power based on the index and the power control parameter.

In some examples of the method, apparatuses, and non-transitory computer-readable medium described herein, the index for the configured grant, a power adjustment value for determining the transmit power, or a combination thereof may be received via radio resource control signaling at a physical layer of the UE.

In some examples of the method, apparatuses, and non-transitory computer-readable medium described herein, the group-common downlink control information message may include operations, features, means, or instructions for receiving, from the base station, a second configured grant for uplink transmissions to the base station, receiving, from the base station, a second indication that the second power control parameter may be associated with the second configured grant, and determining a second transmit power for transmitting a second uplink message associated with the second configured grant based on the second power control parameter.

Some examples of the method, apparatuses, and non-transitory computer-readable medium described herein may further include operations, features, means, or instructions for applying a power adjustment to the transmit power based on a priority of data to be transmitted in the uplink message and the power control parameter in the configured grant.

Some examples of the method, apparatuses, and non-transitory computer-readable medium described herein may further include operations, features, means, or instructions for adjusting the transmit power for a first priority level of the data.

Some examples of the method, apparatuses, and non-transitory computer-readable medium described herein may further include operations, features, means, or instructions for refraining from adjusting the transmit power for a second priority level of the data.

Some examples of the method, apparatuses, and non-transitory computer-readable medium described herein may further include operations, features, means, or instructions for adjusting the transmit power by a first value for a first priority level of the data, adjusting the transmit power by a second value for a second priority level of the data, or a combination thereof for multiple uplink messages in the configured grant, where the first priority level may be higher than the second priority level.

Some examples of the method, apparatuses, and non-transitory computer-readable medium described herein may further include operations, features, means, or instructions for receiving, from the base station, the first value and the second value via radio resource control signaling with the configured grant.

Some examples of the method, apparatuses, and non-transitory computer-readable medium described herein may further include operations, features, means, or instructions for dropping the uplink message based on a priority level of data to be transmitted in the uplink message, an increased transmit power indicated by the power control parameter, or a combination thereof.

In some examples of the method, apparatuses, and non-transitory computer-readable medium described herein, the group-common downlink control information message includes an uplink configured grant index, an uplink configured grant group index, a priority level, or a combination thereof for the power control parameter, and the transmit power for transmitting the uplink message may be determined based on the uplink configured grant index, the uplink configured grant group index, the priority level, or the combination thereof.

In some examples of the method, apparatuses, and non-transitory computer-readable medium described herein, the power control parameter indicates for the UE to use a maximum transmit power for transmitting the uplink message.

In some examples of the method, apparatuses, and non-transitory computer-readable medium described herein, the indication that the power control parameter may be associated with the configured grant may be received via radio resource control signaling or the group-common downlink control information message.

A method of wireless communications at a UE is described. The method may include receiving, from a base station, a grant for one or more uplink transmissions to the base station, receiving, from the base station, at least one of a first power control parameter and a second power control parameter for the uplink transmissions, determining a transmit power for transmitting an uplink message associated with the grant based on the at least one of the first power control parameter and the second power control parameter, and transmitting, to the base station, the uplink message according to the determined transmit power and based on the first power control parameter and the second power control parameter.

An apparatus for wireless communications at a UE is described. The apparatus may include a processor, memory coupled with the processor, and instructions stored in the memory. The instructions may be executable by the processor to cause the apparatus to receive, from a base station, a grant for one or more uplink transmissions to the base station, receive, from the base station, at least one of a first power control parameter and a second power control parameter for the uplink transmissions, determine a transmit power for transmitting an uplink message associated with the grant based on the at least one of the first power control parameter and the second power control parameter, and transmit, to the base station, the uplink message according to the determined transmit power and based on the first power control parameter and the second power control parameter.

Another apparatus for wireless communications at a UE is described. The apparatus may include means for receiving, from a base station, a grant for one or more uplink transmissions to the base station, receiving, from the base station, at least one of a first power control parameter and a second power control parameter for the uplink transmissions, determining a transmit power for transmitting an uplink message associated with the grant based on the at least one of the first power control parameter and the second power control parameter, and transmitting, to the base station, the uplink message according to the determined transmit power and based on the first power control parameter and the second power control parameter.

A non-transitory computer-readable medium storing code for wireless communications at a UE is described. The code may include instructions executable by a processor to receive, from a base station, a grant for one or more uplink transmissions to the base station, receive, from the base station, at least one of a first power control parameter and a second power control parameter for the uplink transmissions, determine a transmit power for transmitting an uplink message associated with the grant based on the at least one of the first power control parameter and the second power control parameter, and transmit, to the base station, the uplink message according to the determined transmit power and based on the first power control parameter and the second power control parameter.

In some examples of the method, apparatuses, and non-transitory computer-readable medium described herein, the first power control parameter includes an accumulative power control value, and the second power control parameter includes a one-shot power adjustment value.

Some examples of the method, apparatuses, and non-transitory computer-readable medium described herein may further include operations, features, means, or instructions for adjusting the transmit power for transmitting the uplink message and any subsequent uplink messages based on receiving the first power control parameter.

Some examples of the method, apparatuses, and non-transitory computer-readable medium described herein may further include operations, features, means, or instructions for adjusting the transmit power for transmitting the uplink message or multiple uplink messages for the grant in a time interval based on receiving the second power control parameter.

Some examples of the method, apparatuses, and non-transitory computer-readable medium described herein may further include operations, features, means, or instructions for adjusting the transmit power for transmitting the uplink message and any subsequent uplink messages based on receiving the first power control parameter, and adjusting the transmit power for transmitting the uplink message or multiple uplink messages for the grant in a time interval based on receiving the second power control parameter.

In some examples of the method, apparatuses, and non-transitory computer-readable medium described herein, the grant may include operations, features, means, or instructions for receiving the first power control parameter and the second power control parameter in the dynamic grant.

In some examples of the method, apparatuses, and non-transitory computer-readable medium described herein, the grant may include operations, features, means, or instructions for receiving the first power control parameter and the second power control parameter in a group-common transmission power control message.

Some examples of the method, apparatuses, and non-transitory computer-readable medium described herein may further include operations, features, means, or instructions for receiving the second power control parameter based on a priority level associated with data to be transmitted in the uplink message.

Some examples of the method, apparatuses, and non-transitory computer-readable medium described herein may further include operations, features, means, or instructions for receiving, from the base station, a power control parameter value in a transmit power control field of a downlink control information message, and determining whether the first power control parameter or the second power control parameter may be received based on the power control parameter value.

Some examples of the method, apparatuses, and non-transitory computer-readable medium described herein may further include operations, features, means, or instructions for transmitting an indication for the UE to adjust the transmit power for transmitting the uplink message and any subsequent uplink messages based on the first power control parameter, and transmitting an indication for the UE to adjust the transmit power for transmitting the uplink message or multiple uplink messages for the grant in a time interval based on the second power control parameter.

Some examples of the method, apparatuses, and non-transitory computer-readable medium described herein may further include operations, features, means, or instructions for receiving, from the base station, a downlink control information field indicating whether the first power control parameter or the second power control parameter is received.

In some examples of the method, apparatuses, and non-transitory computer-readable medium described herein, values for the second power control parameter may be configured via radio resource control signaling.

A method of wireless communications at a base station is described. The method may include transmitting, to a UE, a configured grant for uplink transmissions to the base station, the configured grant including an initial power configuration for the configured grant, determining a transmit power for the UE to transmit an uplink message associated with the configured grant, transmitting, to the UE, a group-common downlink control information message, the group-common downlink control information message including a power control parameter for the determined transmit power, transmitting, to the UE, an indication that the power control parameter is associated with the configured grant, and receiving, from the UE, the uplink message according to the determined transmit power.

An apparatus for wireless communications at a base station is described. The apparatus may include a processor, memory coupled with the processor, and instructions stored in the memory. The instructions may be executable by the processor to cause the apparatus to transmit, to a UE, a configured grant for uplink transmissions to the base station, the configured grant including an initial power configuration for the configured grant, determine a transmit power for the UE to transmit an uplink message associated with the configured grant, transmit, to the UE, a group-common downlink control information message, the group-common downlink control information message including a power control parameter for the determined transmit power, transmit, to the UE, an indication that the power control parameter is associated with the configured grant, and receive, from the UE, the uplink message according to the determined transmit power.

Another apparatus for wireless communications at a base station is described. The apparatus may include means for transmitting, to a UE, a configured grant for uplink transmissions to the base station, the configured grant including an initial power configuration for the configured grant, determining a transmit power for the UE to transmit an uplink message associated with the configured grant, transmitting, to the UE, a group-common downlink control information message, the group-common downlink control information message including a power control parameter for the determined transmit power, transmitting, to the UE, an indication that the power control parameter is associated with the configured grant, and receiving, from the UE, the uplink message according to the determined transmit power.

A non-transitory computer-readable medium storing code for wireless communications at a base station is described. The code may include instructions executable by a processor to transmit, to a UE, a configured grant for uplink transmissions to the base station, the configured grant including an initial power configuration for the configured grant, determine a transmit power for the UE to transmit an uplink message associated with the configured grant, transmit, to the UE, a group-common downlink control information message, the group-common downlink control information message including a power control parameter for the determined transmit power, transmit, to the UE, an indication that the power control parameter is associated with the configured grant, and receive, from the UE, the uplink message according to the determined transmit power.

In some examples of the method, apparatuses, and non-transitory computer-readable medium described herein, determining the transmit power for transmitting the uplink message further may include operations, features, means, or instructions for determining a baseline transmit power based on the initial power configuration for the configured grant, determining a power adjustment value for the UE to apply to the baseline transmit power based on a priority of data to be transmitted in the uplink message, and transmitting, to the UE, the power adjustment value in the power control parameter of the group-common downlink control information message.

Some examples of the method, apparatuses, and non-transitory computer-readable medium described herein may further include operations, features, means, or instructions for determining the power adjustment value may be further based on a modulation and coding scheme of the uplink message.

In some examples of the method, apparatuses, and non-transitory computer-readable medium described herein, the initial power configuration includes a set of one or more power adjustment values corresponding to the configured grant, and where determining the power adjustment value includes selecting the power adjustment value from the set of one or more power adjustment values.

In some examples of the method, apparatuses, and non-transitory computer-readable medium described herein, the initial power configuration for the configured grant includes a baseline transmit power and a set of one or more additional transmit power levels, and the uplink message may be received at the transmit power based on a difference between the baseline transmit power and one of the additional transmit power levels.

In some examples of the method, apparatuses, and non-transitory computer-readable medium described herein, the power adjustment value includes a power boosting value.

Some examples of the method, apparatuses, and non-transitory computer-readable medium described herein may further include operations, features, means, or instructions for transmitting, to the UE, a dynamic uplink grant for a dynamic uplink transmission to the base station, the dynamic uplink grant including an additional power configuration for the dynamic uplink grant, determining an additional baseline transmit power based on the additional power configuration for the dynamic uplink grant, and determining an additional transmit power for the dynamic uplink transmission based on the additional baseline transmit power and the power adjustment value.

In some examples of the method, apparatuses, and non-transitory computer-readable medium described herein, the transmit power and the additional transmit power may be determined based on an open-loop power control, a closed-loop power control, at least a portion of the uplink message associated with the configured grant and the dynamic uplink transmission overlapping, whether a dynamic power adjustment value may be transmitted in the dynamic uplink grant, or a combination thereof.

Some examples of the method, apparatuses, and non-transitory computer-readable medium described herein may further include operations, features, means, or instructions for transmitting, to the UE, a dynamic power adjustment value for the dynamic uplink transmission in the dynamic uplink grant.

In some examples of the method, apparatuses, and non-transitory computer-readable medium described herein, transmitting the group-common downlink control information message including the power control parameter and transmitting the indication that the power control parameter may be associated with the configured grant may include operations, features, means, or instructions for transmitting multiple group-common downlink messages including different power control parameters, and transmitting multiple radio network temporary identifiers corresponding to the multiple group-common downlink messages, where the power control parameter may be associated with the configured grant based on a group-common radio network temporary identifier corresponding to the group-common downlink control information message including the power control parameter associated with the configured grant different, the group-common radio network temporary identifier may be one of the multiple radio network temporary identifiers.

In some examples of the method, apparatuses, and non-transitory computer-readable medium described herein, the multiple group-common radio network temporary identifiers may be associated with different priority levels of the configured grant, one group-common downlink control information message corresponds to one or multiple configured grants, the configured grant may be associated with a single group-common downlink control information message, or a combination thereof.

In some examples of the method, apparatuses, and non-transitory computer-readable medium described herein, determining the transmit power for the UE to transmit the uplink message further may include operations, features, means, or instructions for transmitting an index for the configured grant, where the transmit power may be indicated to the UE based on the index and the power control parameter.

In some examples of the method, apparatuses, and non-transitory computer-readable medium described herein, the index for the configured grant, a power adjustment value for determining the transmit power, or a combination thereof may be transmitted via radio resource control signaling.

Some examples of the method, apparatuses, and non-transitory computer-readable medium described herein may further include operations, features, means, or instructions for transmitting, to the UE, a second configured grant for uplink transmissions to the base station, determining a second transmit power for the UE to transmit a second uplink message associated with the second configured grant, where the group-common downlink control information message including a second power control parameter for the determined second transmit power, and transmitting, to the UE, a second indication that the second power control parameter may be associated with the second configured grant.

Some examples of the method, apparatuses, and non-transitory computer-readable medium described herein may further include operations, features, means, or instructions for receiving, from the UE, the uplink message at a higher transmit power than the initial power configuration based on a priority of data in the uplink message.

Some examples of the method, apparatuses, and non-transitory computer-readable medium described herein may further include operations, features, means, or instructions for transmitting, to the UE, a first value for adjusting the transmit power and a second value for adjusting the transmit power via radio resource control signaling with the configured grant.

In some examples of the method, apparatuses, and non-transitory computer-readable medium described herein, the group-common downlink control information message includes an uplink configured grant index, an uplink configured grant group index, a priority level, or a combination thereof for the power control parameter, and the transmit power for transmitting the uplink message may be determined based on the uplink configured grant index, the uplink configured grant group index, the priority level, or the combination thereof.

In some examples of the method, apparatuses, and non-transitory computer-readable medium described herein, the power control parameter indicates for the UE to use a maximum transmit power for transmitting the uplink message.

In some examples of the method, apparatuses, and non-transitory computer-readable medium described herein, the indication that the power control parameter may be associated with the configured grant may be transmitted via radio resource control signaling or the group-common downlink control information message.

A method of wireless communications at a base station is described. The method may include transmitting, to a UE, a grant for uplink transmissions to the base station, determining a transmit power for the UE to transmit an uplink message associated with the grant, transmitting, to the UE, at least one of a first power control parameter and a second power control parameter for the uplink transmissions, and receiving, from the UE, the uplink message according to the determined transmit power and based on the at least one of the first power control parameter and the second power control parameter.

An apparatus for wireless communications at a base station is described. The apparatus may include a processor, memory coupled with the processor, and instructions stored in the memory. The instructions may be executable by the processor to cause the apparatus to transmit, to a UE, a grant for uplink transmissions to the base station, determine a transmit power for the UE to transmit an uplink message associated with the grant, transmit, to the UE, at least one of a first power control parameter and a second power control parameter for the uplink transmissions, and receive, from the UE, the uplink message according to the determined transmit power and based on the at least one of the first power control parameter and the second power control parameter.

Another apparatus for wireless communications at a base station is described. The apparatus may include means for transmitting, to a UE, a grant for uplink transmissions to the base station, determining a transmit power for the UE to transmit an uplink message associated with the grant, transmitting, to the UE, at least one of a first power control parameter and a second power control parameter for the uplink transmissions, and receiving, from the UE, the uplink message according to the determined transmit power and based on the at least one of the first power control parameter and the second power control parameter.

A non-transitory computer-readable medium storing code for wireless communications at a base station is described. The code may include instructions executable by a processor to transmit, to a UE, a grant for uplink transmissions to the base station, determine a transmit power for the UE to transmit an uplink message associated with the grant, transmit, to the UE, at least one of a first power control parameter and a second power control parameter for the uplink transmissions, and receive, from the UE, the uplink message according to the determined transmit power and based on the at least one of the first power control parameter and the second power control parameter.

In some examples of the method, apparatuses, and non-transitory computer-readable medium described herein, the first power control parameter includes an accumulative power control value, and the second power control parameter includes a one-shot power adjustment value.

Some examples of the method, apparatuses, and non-transitory computer-readable medium described herein may further include operations, features, means, or instructions for transmitting an indication for the UE to adjust the transmit power for transmitting the uplink message and any subsequent uplink messages based on the first power control parameter.

Some examples of the method, apparatuses, and non-transitory computer-readable medium described herein may further include operations, features, means, or instructions for transmitting an indication for the UE to adjust the transmit power for transmitting the uplink message or multiple uplink messages for the grant in a time interval based on the second power control parameter.

In some examples of the method, apparatuses, and non-transitory computer-readable medium described herein, the grant may include operations, features, means, or instructions for transmitting the first power control parameter and the second power control parameter in the dynamic grant.

In some examples of the method, apparatuses, and non-transitory computer-readable medium described herein, the grant may include operations, features, means, or instructions for transmitting the first power control parameter and the second power control parameter in a group-common transmission power control message.

Some examples of the method, apparatuses, and non-transitory computer-readable medium described herein may further include operations, features, means, or instructions for transmitting the second power control parameter based on a priority level associated with data to be transmitted in the uplink message.

Some examples of the method, apparatuses, and non-transitory computer-readable medium described herein may further include operations, features, means, or instructions for transmitting, to the UE, a power control parameter value in a transmit power control field of a downlink control information message, where the first power control parameter or the second power control parameter may be indicated based on the power control parameter value.

Some examples of the method, apparatuses, and non-transitory computer-readable medium described herein may further include operations, features, means, or instructions for transmitting, to the UE, a downlink control information field indicating whether the first power control parameter or the second power control parameter is transmitted.

In some examples of the method, apparatuses, and non-transitory computer-readable medium described herein, values for the second power control parameter may be signaled to the UE via radio resource control signaling.

DETAILED DESCRIPTION

Figure 1:
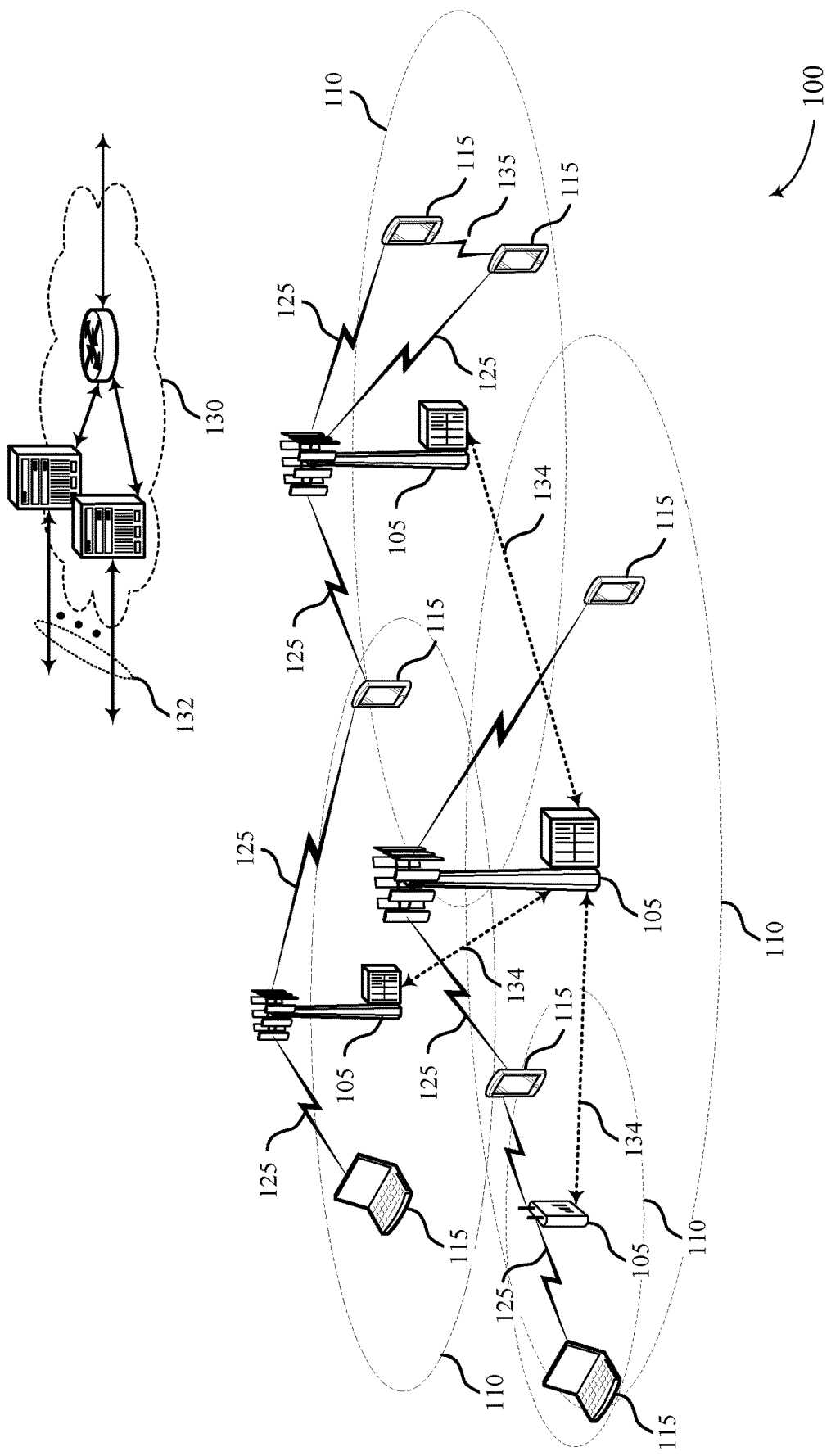
FIG. 1 illustrates an example of a system for wireless communications that supports power control enhancement for inter-user equipment (UE) multiplexing in accordance with aspects of the present disclosure.

In some wireless communications systems, different services may support different reliability and latency requirements as well as different transmission schemes. For example, both grant-based and grant-free transmissions may be supported, where the grant-based transmissions may be dynamically scheduled through uplink grants and the grant-free transmissions may be indicated on allocated resources through configured grants for one or more UEs. In some cases, a base station may schedule a grant-based transmission on one or more of the allocated resources for the grant-free transmissions. As such, interference or conflicts may occur between the transmissions on the same resources. Efficient techniques are desired for accommodating transmissions on the same resources to ensure both are transmitted and received successfully.

In some wireless communications systems, communications for multiple user equipment (UEs) may be multiplexed together, where the multiple UEs may support different services with different reliability and latency requirements. Additionally, both grant-based and grant-free transmissions may be supported in the same wireless communications system. As such, when attempting to multiplex communications with different service types and different transmission schemes, one or more uplink communications may overlap on a set of time-frequency resources (e.g., for better spectrum utilization). For example, a base station may dynamically schedule traffic for multiple services on the same set of resources, which may cause interference or similarly affect the traffic for one service or another. In some cases, the base station and/or a UE may adjust the power of one or both transmissions to ensure both are transmitted and received on the overlapping time-frequency resources. For example, the base station and/or UE may increase a power for transmissions with a higher priority service, lower a power for transmissions with a lower priority service (e.g., or cancel the transmissions with the lower priority service), or a combination thereof.

Conventionally, the base station may transmit a transmit power control (TPC) to indicate a power adjustment for all transmissions of one or more UEs. However, the TPC may be inefficient for adjusting power and scheduling simultaneous transmissions for different service types and transmission schemes. For example, the TPC may adjust a transmit power for all subsequent uplink transmissions across all time-frequency resources for one or more UEs. Additionally, the TPC adjustment may continue until another, subsequent TPC is issued. In some cases, the TPC adjustment also may not be very fast, increasing latency for the different services, which may impact the corresponding reliability and latency requirements for one or more of the services. Additionally, the TPC adjustment may indicate small power changes (e.g., one to three decibels (dBs)), which may not be large enough to overcome interferences from the simultaneous transmissions.

A configured grant is a semi-static assignment or allocation of periodic uplink or downlink resources to a UE. A UE that has a configured grant may use the scheduled uplink or downlink resources to communicate with a base station without requiring an individual grant for each periodic instance of the scheduled resources.

As described herein, a base station may configure separate power control parameters (e.g., power control fields) per a configured grant (e.g., and/or a group of configured grants) to indicate a power adjustment for an uplink message signaled by the configured grant. In some cases, the base station transmit the power control parameters in a group-common power control downlink control information (DCI) message to a group of UEs communicating with the base station.

Accordingly, based on the power control parameters, one or more of the UEs may apply the power adjustment to a baseline transmit power initially signaled by the base station prior to the group-common power control DCI message transmission and transmit an uplink message indicated by the configured grant at the adjusted transmit power. Additionally or alternatively, the one or more UEs may not apply the power adjustment and transmit the uplink message indicated by the configured grant at the baseline transmit power. In some cases, the base station may define two groups of configured grants for high priority data and for low priority data, and the one or more UEs may apply the power adjustment (e.g., from the power control parameters) based on the configured grant group received. Additionally or alternatively, the one or more UEs may selectively apply the power adjustment (e.g., without an explicit indication from the base station to apply the power adjustment) based on an identified priority level of data to be transmitted in the uplink message.

In some cases, the base station may signal two power control parameters for the one or more UEs to transmit an uplink message (e.g., a dynamic uplink message or a configured uplink message). For example, a first power control parameter may include a baseline transmit power and conventional TPC as described above for transmission of the uplink message, and a second power control parameter may include a power adjustment value for transmission of the uplink message. Accordingly, the one or more UEs may use the first power control parameter for all subsequent uplink transmissions in addition to transmission of the uplink message but may use the second power control parameter for transmission of the uplink message and not for the subsequent uplink transmissions. Additionally, the base station may signal these two power control parameters either for configured uplink messages (e.g., via configured grants) or for dynamic uplink messages (e.g., via dynamic uplink grants). Accordingly, for the configured uplink messages, the base station may include the two power control parameters in a group-common TPC. Alternatively, for the dynamic uplink messages, the base station may include the two power control parameters with the uplink grant for the dynamic uplink messages.

Aspects of the disclosure are initially described in the context of a wireless communications system. Additionally, aspects of the disclosure are illustrated through additional wireless communications systems, an open-loop power control, a closed loop power control, and process flows. Aspects of the disclosure are further illustrated by and described with reference to apparatus diagrams, system diagrams, and flowcharts that relate to power control enhancement for inter-UE multiplexing.

FIG. 1 illustrates an example of a wireless communications system 100 that supports power control enhancement for inter-UE multiplexing in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

In some cases, the sidelink communication channel may involve communications between two or more nearby wireless devices (e.g., UEs 115) without the need of a base station 105. These wireless devices may include UEs 115 associated with vehicles, non-vehicle UEs 115, or both. The wireless devices may be any type of wireless device utilizing various wireless technologies such as Evolved UMTS Terrestrial Radio Access Network (E-UTRAN) technology. In some examples, some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some wireless communications systems, multiple services may be supported that require different reliability and latency qualities. For example, enhanced mobile broadband (eMBB) services may support a first set of reliability and latency standards, while ultra-reliable low latency communications (URLLC) services may support a second set of standards with higher reliability and lower latency than the eMBB services. In order to more efficiently utilize a spectrum of time-frequency resources, UEs 115 configured with different services may be dynamically multiplexed on the same time-frequency resources.

Additionally, both grant-based and grant-free transmissions may be supported in the same wireless communications system. The grant-based transmissions may indicate a scheme where each data transmission may be scheduled by a corresponding downlink channel (e.g., physical downlink control channel (PDCCH), DCI, etc.). The grant-based transmissions may be more dynamic than grant-free transmissions. Grant-free transmissions may include a sequence of transmission opportunities scheduled semi-statically (e.g., by RRC signaling or activated by PDCCH). The sequence of transmission opportunities may include resources pre-allocated to a UE 115 on which to transmit uplink data without a grant. The grant-free transmission may be referred to as uplink transmissions with a configured grant, where the configured grant triggers the sequence of transmissions without DCI. In some cases, a base station 105 may multiplex UEs 115 configured for different services and with the different transmission schemes (e.g., grant-free and grant-based transmissions) such that uplink transmissions from the UEs 115 may both be received at the base station 105 (e.g., simultaneously).

However, in some cases, the base station 105 may dynamically schedule traffic for multiple services on the same set of resources, which may cause interference or similarly affect the traffic for one service or another. For example, the base station 105 may configure grant-free transmission opportunities for one or more UEs 115 operating according to URLLC (e.g., URLLC UEs 115) on respective sets of time-frequency resources. The base station 105 may then schedule an uplink transmission for a different UE 115 operating according to eMBB (e.g., eMBB UE 115) on a set of time-frequency resources that at least partially overlap with the time-frequency resources for the grant-free transmission opportunities. As such, the base station 105 may accommodate the uplink transmission for the eMBB UE 115, while meeting the reliability and latency requirements for the grant-free transmission opportunities of the URLLC UEs 115 (e.g., both transmissions may be sent simultaneously and received at the base station 105). Additionally or alternatively, urgent uplink URLLC traffic may arrive, and the base station 105 may need to schedule the URLLC traffic on time-frequency resources partially allocated to the eMBB UEs 115 to ensure the URLLC traffic is successfully transmitted by the URLLC UEs 115.

In some cases, the base station 105 may adjust the power of one or both transmissions to ensure both are transmitted and received on the overlapping time-frequency resources. For example, the base station 105 may transmit a TPC to indicate a power adjustment for all transmissions of one or more UEs 115. The TPC may be a group-common TPC dynamically transmitted (e.g., in a PDCCH) to a group of UEs 115. The group-common TPC may indicate a TPC command for different uplink messages for the one or more UEs 115 to transmit, such as a physical uplink control channel (PUCCH), a physical uplink shared channel (PUSCH), and/or a sounding reference signal (SRS). Additionally or alternatively, the group-common TPC may be multi-casted to the group of UEs in a first DCI format (e.g., DCI format 2_2 for PUCCH/PUSCH) or in a second DCI format (e.g., DCI format 2_3 for SRS). Accordingly, each UE 115 may adjust their transmit power separately, where the adjusted transmit power applies to the rest of grant-free transmissions until a subsequent TPC is received. Additionally, a CRC on a downlink channel (e.g., a PDCCH) for the grant-free transmissions may be scrambled based on the TPC and respective radio network temporary identifiers (RNTIs) for the different uplink messages. For example, the CRC of a PDCCH transmission that includes a group-common DCI (e.g., the first DCI format or the second DCI format described above) may be scrambled by a TPC RNTI for a corresponding uplink message to be transmitted (e.g., a TPC-PUSCH-RNTI for PUSCH transmissions, a TPC-PUCCH-RNTI for a PUCCH transmission, or a TPC-SRS-RNTI for an SRS transmission).

The TPC for indicating a power adjustment for transmissions of one or more UEs 115 may be part of an enhanced power control (e.g., power boosting) technique employed by the base station 105 and the one or more UEs 115 (e.g., a downlink preemption indication (PI)). For example, based on the enhanced power control, the one or more UEs 115 may boost power for transmitting URLLC traffic to reduce the chance of interference from eMBB traffic for ensuring the URLLC traffic is successfully transmitted. In some cases, the enhanced power control may include the base station 105 dynamically indicating an open-loop power control parameter (e.g., an option 1) for adjusting the transmit power. Additionally or alternatively, the enhanced power control may include an increased range of a closed-loop TPC (e.g., an option 2). Additionally or alternatively, the enhanced power control may include the base station 105 signaling a set of time-frequency resources that has an eMBB transmission(s) when transmitting a configured grant, and the one or more UEs 115 may change open-loop parameters for the power control based on whether the time-frequency resources indicated by the configured grant for a corresponding uplink message overlap the signaled set of time-frequency resources that have the eMBB transmission(s)

Accordingly, the transmit power for an uplink message (e.g., transmitted on a PUSCH) may be determined by Equation 1.

$$P_{PUSCH}=\min\{P_{C,max},P_0(j)+\alpha(j)\cdot PL(q)+10\log_{10}(2^{\mu}M_{RB})+\Delta_{TF}+f(l)\} \quad (1)$$

$P_{C,max}$ may represent a maximum transmit power for a UE 115 configured to transmit the uplink message. $P_0(j)$ and $\alpha(j)$ may represent open-loop power control parameters, where $P_0(j)=P_{0,UE}(j)+P_{0,nominal}(j)$ and indicates a desired (e.g., required) receive power at the base station 105 for the uplink message and $\alpha(j) \leq 1$ and indicates a fractional path-loss compensation factor (e.g., how much to compensate for path-loss). j may represent an open-loop power control path-loss index, where j=0 for a msg3 transmission (e.g., as part of a four-step random access channel (RACH) procedure), j=1 for configured grant transmissions, and j=2 . . . (j−1) for dynamically scheduled PUSCH transmissions. In some cases, a sounding reference signal (SRS) resource indicator (SRI) may be used to further select between j=2 . . . (j−1). Additionally, $P_{0,UE}(j)$ and $\alpha$ may be dynamically changed. PL(q) may represent a path-loss measured by downlink reference signals, and q may represent a path-loss index (e.g., useful for beam-based power control). $M_{RB}$ may represent a number of RBs for the PUSCH transmission (e.g., a bandwidth for transmitting the uplink message on the PUSCH), and $\mu$ may represent a sub-carrier spacing (SCS) for the PUSCH transmission. $\Delta_{TF}$ may represent a configured value from the base station 105 for a maximum power reduction (MPR) for the PUSCH transmission. f(l) may represent a closed-loop power control parameter signaled by the base station 105 (e.g., f(l) may change over time based on channel conditions for the PUSCH transmission). For a dynamic PUSCH, the base station 105 may dynamically signal the power control loop via SRI. Additionally or alternatively, for a configured grant PUSCH, the base station 105 may signal the power control loop in RRC signaling (e.g., RRC configured).

In some cases, the base station 105 may signal one or more of the open-loop and/or closed-loop power control parameters to the UEs 115. For example, the base station 105 may signal the open-loop power control parameters (e.g., $P_0$ and $\alpha$) for a configured grant PUSCH and/or a dynamic PUSCH. For the configured grant PUSCH, the base station 105 may configure both parameters via RRC signaling (e.g., RRC configured), and both parameters may be configured separately from open-loop parameters for the dynamic PUSCH. For the dynamic PUSCH, the base station 105 may dynamically indicate the open-loop parameters via an SRI field in an uplink grant (e.g., an uplink scheduling DCI message). When signaling the closed-loop power control parameters (e.g., f(l)), the base station 105 may use a TPC command in a corresponding uplink grant for the dynamic PUSCH and/or a group-common PUSCH TPC command (e.g., a group-common DCI that include the TPC command for several UEs 115 to adjust a transmit power for the PUSCH transmission). Additionally, an index for the closed-loop power control may be RRC configured for a configured PUSCH transmission or dynamically indicated via an SRI field in the uplink grant for the uplink transmission (e.g., for a beam switch).

Conventional systems as described above using a group-common TPC or a UE-specific TPC may be inefficient for adjusting power and scheduling simultaneous transmissions for different service types and transmission schemes. For example, this power control procedure may not be fast (e.g., increasing latency), and a TPC command (e.g., for a closed-loop power control) may be intended for small power adjustments (e.g., 1-3 dB magnitude adjustment) to adapt transmit powers based on channel conditions. In some cases, a base station 105 may transmit the TPC to overcome path loss for transmissions or a similar large-scale parameter of a channel (e.g., inter-cell interference). As such, the TPC may adjust a transmit power for all subsequent uplink transmissions (e.g., accumulative in time) across all time-frequency resources for one or more UEs 115 (e.g., via the group-common TPC). In some cases, an uplink PI may be transmitted by the base station 105 if transmissions of different services are scheduled to overlap. However, the uplink PI may enable a UE 115 to drop transmissions associated with a lower priority service (e.g., eMBB traffic) to accommodate transmissions associated with a higher priority service (e.g., URLLC traffic).

Additionally, when attempting to multiplex communications with different services across multiple UEs 115 (e.g., inter-UE multiplexing), the base station 105 may need to signal large (e.g., greater than six (6) dBs, depending on an amount of interference) and sudden power changes for higher priority traffic (e.g., URLLC uplink transmissions). For example, since the two interfering transmissions (e.g., eMBB traffic and URLLC traffic) are occurring on a same cell (e.g., both at base station 105), the interference levels may be higher compared to an inter-cell interference scenario based on the interfering transmissions being closer to each other (and, hence, stronger). Additionally, having the power adjustment be persistent (e.g., accumulative in time) for subsequent uplink transmissions may be inefficient based on collisions between two different services (e.g., between URLLC traffic and eMBB traffic) being atypical. Accordingly, a UE 115 may use an unnecessarily high transmit power for the subsequent uplink transmissions even though no collisions occur between multiple transmissions.

In some wireless communications systems, the base station 105 and UEs 115 may down-select from different options for enhanced power control for determining transmit powers for an uplink message to mitigate interferences. For example, a first option may include the base station 105 transmitting an indication of open-loop parameter sets by DCI (e.g., to adjust $P_O$). Accordingly, for a dynamic grant PUSCH, the base station 105 may indicate an open-loop parameter set to a UE 115 by a scheduling DCI without using an SRI, where the UE 115 applies the open-loop parameter set to an uplink transmission scheduled by the dynamic grant PUSCH. In some cases, at least for a single active configured grant PUSCH, the base station 105 may indicate an open-loop parameter set to the UE 115 via a UE-specific field in a group-common DCI. For the UE 115, the open-loop parameter sets for the dynamic grant PUSCH and the configured grant PUSCH may be the same or different. Additionally or alternatively, a second option may include the base station 105 transmitting an indication of a TPC with an increased range (e.g., a greater power adjustment magnitude amount) by DCI (e.g., to adjust f(l)). Accordingly, for a dynamic grant PUSCH, the base station 105 may indicate the TPC with an increased range to the UE 115 by a TPC field in a scheduling DCI. Additionally, at least for a single active configured grant PUSCH (e.g., and potentially for a dynamic grant PUSCH), the base station 105 may indicate the TPC with an increased range to the UE 115 by a UE-specific TPC field in a group-common DCI. At least for the dynamic grant PUSCH for the UE 115, the base station 105 may configure a number of TPC entries (e.g., 4 or 8) and power adjustment value for each entry via higher layer signaling (e.g., RRC signaling, system information block (SIB), etc.). Accordingly, for the UE 115, the TPC configuration for the dynamic grant PUSCH and the configured grant PUSCH may be the same or different.

Additionally or alternatively, a third option may include a UE 115 using the first or second option (e.g., down-select from the first option or the second option) as described above for a dynamic grant PUSCH. Accordingly, at least for a single active configured grant PUSCH, the UE 115 may derive the transmissions power based on time-frequency resource(s) indicated by a group common DCI. For example, if a configured grant PUSCH transmission overlaps with the indicated time-frequency resource(s), the UE 115 may use one open-loop parameter set with a higher power for the transmission. Alternatively, if the configured grant PUSCH transmission does not overlap with the indicated time-frequency resource(s), the UE 115 may use another open-loop parameter set with a lower power for the transmission.

However, with the above described options and TPC commands, the UE 115 may be unable to determine whether to apply a power adjustment or not if multiple configured grants on a same cell (e.g., all from the base station 105) are configured for the UE 115. Additionally, the different configured grants may include different priorities (e.g., based on the type of service associated with the configured grant, such as eMBB traffic or URLLC traffic). As such, efficient techniques are desired to both adjust transmit power with greater granularity than a TPC command and to accommodate traffic for multiple services simultaneously for multiple configured grants.

Wireless communications system 100 may support efficient techniques for signaling power control parameters per configured grant (e.g., or a group of configured grants) to enable a UE 115 to adjust a transmit power for an uplink message signaled by the configured grant. For example, a base station 105 may configure the power control parameters (e.g., power control fields) per configured grant and transmit the power control parameters in a group-common power control DCI message to the UE 115 (e.g., or a group of UEs 115 communicating with the base station 105).

Accordingly, based on the power control parameters, the UE 115 may apply the power adjustment to a baseline transmit power initially signaled by the base station 105 prior to the group-common power control DCI message transmission and transmit the uplink message indicated by the configured grant at the adjusted transmit power. Additionally or alternatively, the one or more UEs may not apply the power adjustment and transmit the uplink message indicated by the configured grant at the baseline transmit power. In some cases, the base station 105 may signal two power control parameters for the UE 115 to transmit the uplink message (e.g., a dynamic uplink message or a configured uplink message). For example, a first power control parameter may include a baseline transmit power and conventional TPC as described above for transmission of the uplink message, and a second power control parameter may include a power adjustment value for transmission of the uplink message. Accordingly, the UE 115 may determine to use the first power control parameter for all subsequent uplink transmissions in addition to transmission of the uplink message but may determine to use the second power control parameter for transmission of the uplink message and not for the subsequent uplink transmissions.

Figure 2:
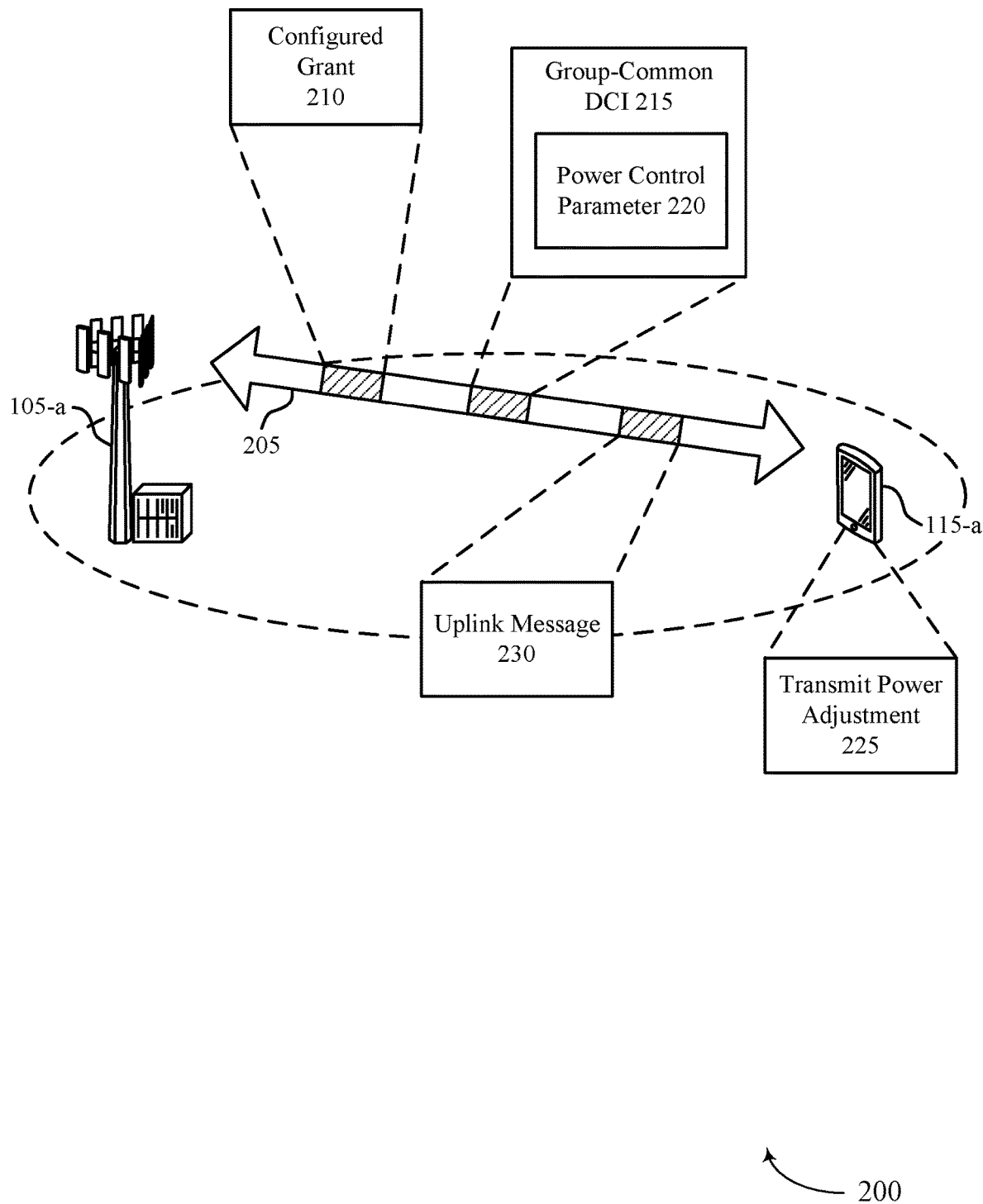
FIGS. 2 and 3 illustrate examples of wireless communications systems that support power control enhancement for inter-UE multiplexing in accordance with aspects of the present disclosure.

FIG. 2 illustrates an example of a wireless communications system 200 that supports power control enhancement for inter-UE multiplexing in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described above with reference to FIG. 1. Additionally, base station 105-a and UE 115-a may communicate on resources of a carrier 205. For example, base station 105-a may transmit a configured grant 210 (e.g., an uplink configured grant) to UE 115-a that indicates an uplink message 230 for UE 115-a to transmit back to base station 105-a (e.g., including allocated time-frequency resources for uplink message 230 on carrier 205). Although the examples provided in FIGS. 2 through 8 show communications between a base station 105 and a UE 115, these principles may also be utilized in sidelink communications between two wireless devices, such as two UEs 115. In other words, one UE 115 may be a sidelink transmitting UE while a corresponding UE 115 may be a sidelink receiving UE. In some examples, an uplink communication from a UE 115 to a base station 105 as described herein may be a sidelink communication. Additionally, an uplink configured grant 210 may also indicate a sidelink configured grant, where the base station 105 may transmit the sidelink configured grant to a first UE 115, and where the first UE 115 may communicate the sidelink configured grant to a second UE 115.

However, as described herein, base station 105-a may attempt to multiplex multiple uplink messages from multiple UEs 115 (e.g., including uplink message 230 from UE 115-a), where the multiple uplink messages may include different priority levels. For example, uplink message 230 may be a URLLC transmission (e.g., or a similar low latency transmission), where base station 105-a may need to ensure that the URLLC transmission is received successfully (e.g., to meet the reliability and latency requirements associated with URLLC). Accordingly, other uplink messages (e.g., eMBB traffic) may interfere with the URLLC transmission, impacting the ability of base station 105-a to receive the URLLC transmission and/or multiplex the multiple uplink messages such that the URLLC transmission is successfully received.

To increase chances that all uplink messages are correctly received at base station 105-a from multiple UEs 115 and base station 105-a is able to multiplex the uplink messages with different priorities, base station 105-a may transmit a group-common DCI 215 to UE 115-a (e.g., and additional UEs 115), where group-common DCI 215 includes a power control parameter 220 (e.g., power control fields, a TPC, etc.) configured per configured grant 210 (e.g., or a configured grant group that includes multiple configured grants). For example, base station 105-a may transmit a separate indication for signaling which configured grants power control parameter 220 applies (e.g., via RRC signaling, group-common DCI 215, etc.). In some cases, for this separate indication, for each power control field (e.g., power control parameter 220) in group-common DCI 215, base station 105-a may configure UE 115-a an uplink configured grant index or a group of uplink configured grant indices. Accordingly, UE 115-a may determine that power control parameter 220 included in a power control field in group-common DCI 215 is associated with one or more configured grants 210 (e.g., uplink configured grants) based on the uplink configured grant index/indices. Additionally or alternatively, base station 105-a may include a power control field (e.g., containing power control parameter 220) and a bit-map for UE 115-a within group-common DCI 215. In some cases, each bit in the bit map may correspond to a particular configured grant 210 (e.g., uplink configured grant) or a particular group of configured grants 210 (e.g., group of uplink configured grants). For example, a bit "1" may indicate that UE 115-a is to apply power control parameter 220 to the corresponding configured grant 210/group of configured grants 210, and a bit "0" may indicate that UE 115-a does not apply power control parameter 220 to the corresponding configured grant 210/group of configured grants 210.

In some cases, base station 105-a may configure power control parameter 220 per uplink cell (e.g., base station 105-a may include multiple uplink cells for receiving uplink messages from UEs 115 or may be considered a single uplink cell). Accordingly, UE 115-a may then perform a transmit power adjustment 225 based on power control parameter 220. In some cases, configuring power control parameter 220 per configured grant 210 may apply for the three different options for enhanced power control as described above with reference to FIG. 1.

For example, power control parameter 220 may include one (1) bit for indicating whether UE 115-a performs transmit power adjustment 225 prior to transmitting uplink message 230 (e.g., an open-loop power control indication for the first option for enhanced power control). Accordingly, a "0" may indicate that UE 115-a does not perform transmit power adjustment 225 (e.g., no open-loop power parameter change), and UE 115-a may use a baseline transmit power configured by base station 105-a previously signaled to UE 115-a (e.g., same open-loop power control parameters as configured in RRC signaling). Alternatively, a "1" in power control parameter 220 may indicate for UE 115-a to perform transmit power adjustment 225, where UE 115-a may increase the baseline transmit power by a configured value from base station 105-a. For example, base station 105-a may transmit the configured value via RRC signaling prior to transmitting configured grant 210 (e.g., or with configured grant 210) and may include a configured power boosting value (e.g., RRC configured power boosting value) on an open-loop power control parameter (e.g., $P_0$), which increases the transmit power for uplink message 230.

In some cases, base station 105-a may configure different power adjustment values (e.g., power boosting values) for different configured grants (e.g., or configured grant groups). Additionally or alternatively, base station 105-a may configure the power adjustment values per modulation and coding scheme (MCS), and UE 115-a may determine a power adjustment value to use for transmitting power adjustment 225 based on the MCS of uplink message 230 (e.g., the configured grant transmission based on configured grant 210). For any of the options for enhanced power control (e.g., the first, second, or third option), the power control parameter (e.g., power boosting indication) may indicate for UE 115-a to use a maximum transmit power for transmitting uplink message 230. In some cases, base station 105-a may configure the baseline transmit power and a set of one or more additional transmit power levels (e.g., in an initial power configuration), where the power adjustment is determined by a difference from the baseline transmit power and one of the additional transmit power levels. That is, instead of explicitly signaling a power change, base station 105-a may signal different power levels, where one power level is the baseline transmit power and UE 115-a uses the other power levels when interference is detected with a different priority level uplink message.

Additionally or alternatively, base station 105-a may configure multiple configured grants (e.g., or multiple configured grant groups) for UE 115-a, which may result in multiple group-common DCIs configured for at least UE 115-a. Accordingly, UE 115-a may be configured with multiple group-common RNTIs, where each group-common RNTI is associated with one group-common DCI carrying a power control parameter 220 (e.g., power control commands). Additionally, different group-common RNTIs may be associated with different priorities of configured grants (e.g., a first priority for URLLC traffic, a second priority for eMBB traffic, etc., where a priority for URLLC traffic is higher than a priority for eMBB traffic). In some cases, one group-common DCI may cover one or multiple configured grants for UE 115-a, while a single configured grant may be limited to associate with a single group-common DCI (e.g., and/or a single configured grant may map to multiple group-common DCIs).

To handle different priorities for configured grants (e.g., including configured grant 210), base station 105-a may use explicit signaling to indicate the priority and need for UE 115-a to perform transmit power adjustment 225. For example, the explicit signaling may include explicit physical layer signaling (e.g., via RRC) for UE 115-a to perform transmit power adjustment 225. In this case, base station 105-a may determine a priority of uplink transmissions (e.g., PUSCH transmissions for eMBB or for URLLC) and associate the priority with a specific configured grant index value. For example, base station 105-a may define two configured grant groups, a first group for high priority data (e.g., URLLC traffic) and a second group for low priority data (e.g., eMBB traffic).

Accordingly, UE 115-a may perform transmit power adjustment 225 based on power control parameter 220 (e.g., a received power control command) and the index value for configured grant 210. For example, if configured grant 210 includes an index value corresponding to the group of configured grants for high priority traffic and power control parameter 220 indicates for UE 115-a to adjust a transmit power for uplink message 230, UE 115-a may then perform transmit power adjustment 225. Additionally or alternatively, if configured grant 210 includes an index value corresponding to the group of configured grants for low priority traffic (e.g., eMBB traffic), UE 115-a may not perform transmit power adjustment 225 for uplink message 230 (e.g., PUSCH transmission associated with configured grant 210). As such, UE 115-a may not base the decision to perform transmit power adjustment 225 on an autonomous determination of a priority of data to be transmitted in uplink message 230, but rather an explicit signal from base station 105-a to perform transmit power adjustment 225 based on a determination made by base station 105-a.

Additionally or alternatively, UE 115-a may determine the priority of the data to be transmitted in uplink message 230 and selectively apply the power adjustment based on the determined priority of data, where the priority is not known to base station 105-a prior to receiving uplink message 230. For example, UE 115-a may use a MAC-layer rule to dynamically determine the priority of the data to be transmitted (e.g., URLLC traffic vs. eMBB traffic) in a configured grant occasion (e.g., time-frequency resources configured for transmitting uplink message 230). UE 115-a performing the priority determination may provide benefits over base station 105-a determining the priority based on UE 115-a identifying the type of data to be transmitted for a grant-free transmission (e.g., not based on configured grant 210). Accordingly, in addition to power control parameter 220 (e.g., the per configured grant power control indication), UE 115-a may selectively apply the power adjustment based on the priority of data that UE 115-a puts in uplink message 230 (e.g., based on the MAC-layer priority).

In some cases, UE 115-a may apply the power adjustment (e.g., power boost) for high priority data and not for low priority data. Additionally or alternatively, UE 115-a may adjust the transmit power by a first value (e.g., X dB, a first power adjustment value, etc.) for high priority data and adjust the transmit power by a second value (e.g., Y dB where Y<X, a second power adjustment value, etc.) for low priority data for uplink messages for a same configured grant 210. Base station 105-a may configure and transmit an indication of the first value and the second value with configured grant 210 (e.g., or additional RRC configuration signaling).

With both the explicit signaling and UE 115-a selectively applying the power adjustment, UE 115-a may, in addition, drop an uplink transmission (e.g., a PUSCH transmission, uplink message 230) if the determined priority is a low priority and/or if UE 115-a is unable to increase a transmit power to a level indicated by base station 105-a (e.g., due to a power limitation).

Figure 3:
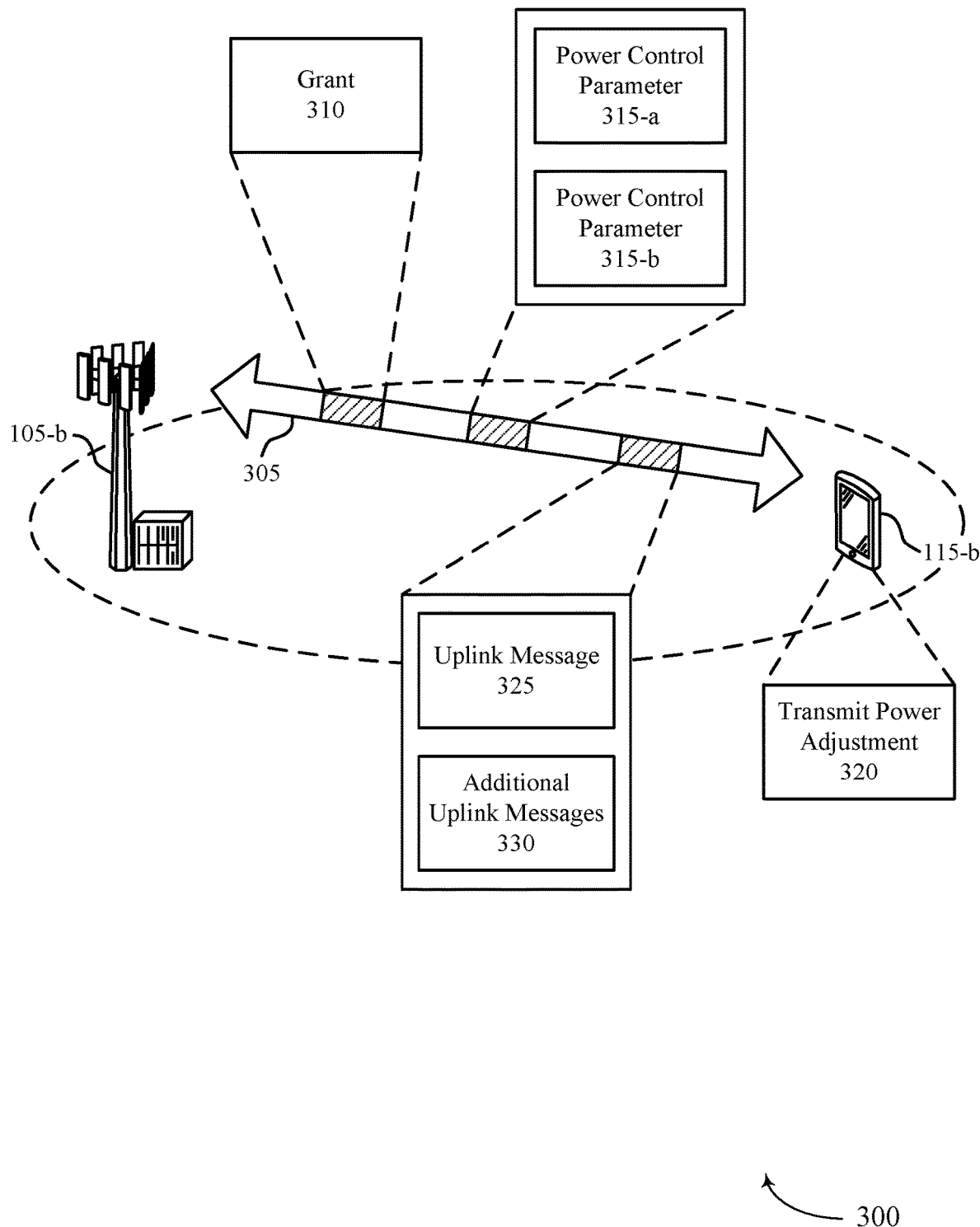

FIG. 3 illustrates an example of a wireless communications system 300 that supports power control enhancement for inter-UE multiplexing in accordance with aspects of the present disclosure. In some examples, wireless communications system 300 may implement aspects of wireless communications systems 100 and/or 200. Similar to wireless communications system 200 as described above with reference to FIG. 2, wireless communications system 300 may include a base station 105-b and a UE 115-b, which may be examples of corresponding base stations 105 and UEs 115, respectively, as described above with reference to FIG. 1-2, where base station 105-b and UE 115-b communicate on resources of a carrier 305. For example, base station 105-b may transmit a grant 310 (e.g., an uplink configured grant, a dynamic grant, etc.) to UE 115-b that indicates an uplink message 325 for UE 115-b to transmit back to base station 105-b (e.g., including allocated time-frequency resources for uplink message 325 on carrier 305).

However, as described herein, base station 105-b may attempt to multiplex multiple uplink messages from multiple UEs 115 (e.g., including uplink message 325 from UE 115-b), where the multiple uplink messages may include different priority levels. For example, uplink message 325 may be a URLLC transmission (e.g., or a similar low latency transmission), where base station 105-b may need to ensure that the URLLC transmission is received successfully (e.g., to meet the reliability and latency requirements associated with URLLC). Accordingly, other uplink messages (e.g., eMBB traffic) may interfere with the URLLC transmission, impacting the ability of base station 105-b to receive the URLLC transmission and/or multiplex the multiple uplink messages such that the URLLC transmission is successfully received.

Additionally or alternatively to the techniques described above with reference to FIG. 2, to increase chances that all uplink messages are correctly received at base station 105-b from multiple UEs 115 and base station 105-b is able to multiplex the uplink messages with different priorities, base station 105-b may transmit two power control parameters 315 (e.g., two closed-loop power control commands, a TPC, etc.) for uplink message 325 (e.g., a dynamic PUSCH, a configured grant uplink message, etc.). For example, a first power control parameter 315-a may indicate a regular power control ($\Delta_{11}$), which can be accumulative (e.g., applies to uplink message 325 and any additional uplink messages 330, where additional uplink messages 330 are transmitted after uplink message 325), and a second power control parameter 315-b may indicate a one-shot power adjustment ($\Delta_2$) (e.g., power boost) that applies to uplink message 325 (e.g., a particular transmission or multiple transmissions in a particular time-interval, such as a slot, configured by grant 310).

Accordingly, UE 115-*b* may then perform a transmit power adjustment 320 based on the power control parameters 315 to determine a transmit power for transmitting uplink message 325. Additionally, UE 115-*a* may perform transmit power adjustment 320 for both dynamic grants and configured grants. For example, grant 310 may be a dynamic grant scheduling a dynamic PUSCH for uplink message 325, and, as such, base station 105-*a* may transmit the power control parameters 315 in grant 310 (e.g., the uplink grant for uplink message 325). Alternatively, grant 310 may be a configured grant scheduling a configured PUSCH for uplink message 325, and, as such, base station 105-*a* may transmit the power control parameters 315 in a group-common TPC for the configured grant. In some cases, second power control parameter 315-*b* may be configured for a DCI associated with high priority traffic (e.g., a URLLC DCI) and not configured for a DCI associated with low priority traffic (e.g., an eMBB DCI).

In some cases, when UE 115-*b* has both dynamic PUSCH and configured PUSCH (e.g., via corresponding grants 310) transmissions, UE 115-*b* may not know whether to apply a one-shot power adjustment (e.g., power control parameter 315-*b*) received in a group-common DCI to both the dynamic PUSCH and the configured PUSCH. Accordingly, for an enhanced power control option 1 or 2 (e.g., open-loop or closed-loop, respectively), UE 115-*b* may apply the power adjustment received in the group-common DCI to the configured PUSCH (e.g., an uplink configured grant) but not to the dynamically indicated PUSCH. At the time when base station 105-*b* sends the group-common DCI (e.g., carrying the TPC), base station 105-*b* may not know whether there will be a dynamic PUSCH (e.g., URLLC PUSCH) scheduled on on-going uplink resources (e.g., eMBB uplink resources) and may not know where (if any) the dynamic PUSCH is scheduled. Therefore, base station 105-*b* may send the power adjustment for a dynamic PUSCH in the grant for the dynamic PUSCH.

Additionally or alternatively, base station 105-*b* may signal an enhanced power control option 3, where UE 115-*b* determines whether to apply the one-shot power adjustment received in the group-common DCI based on the option 3. For example, enhanced power control option 3 may include base station 105-*b* indicating (e.g., via a group-common DCI) a set of resources on which there are on-going transmissions (e.g., on-going eMBB PUSCH transmissions). After receiving the indication, UE 115-*b* may check whether the resources indicated overlap with a dynamic uplink transmission (e.g., URLLC PUSCH). Accordingly, UE 115-*b* may determine whether to increase a transmit power for the dynamic uplink transmission based on a detected overlap (e.g., on signaled interference resources) and having the enhanced power control option 3 signaled.

Additionally, when option 3 is used, if UE 115-*b* is configured with a power adjustment field in a dynamic uplink grant scheduling the dynamic uplink transmission, then UE 115-*b* may not apply the one-shot power adjustment received in the group-common DCI to the dynamic uplink transmission. Alternatively, if UE 115-*b* is not configured with a power adjustment field in the dynamic uplink grant scheduling the dynamic uplink transmission, then UE 115-*b* may apply the one-shot power adjustment received in the group-common DCI to the dynamic uplink transmission. Additionally, in some cases, UE 115-*b* may not apply a one-shot power adjustment signaled in a dynamic grant to a configured PUSCH (e.g., uplink configured grant transmission).

Figure 4A:
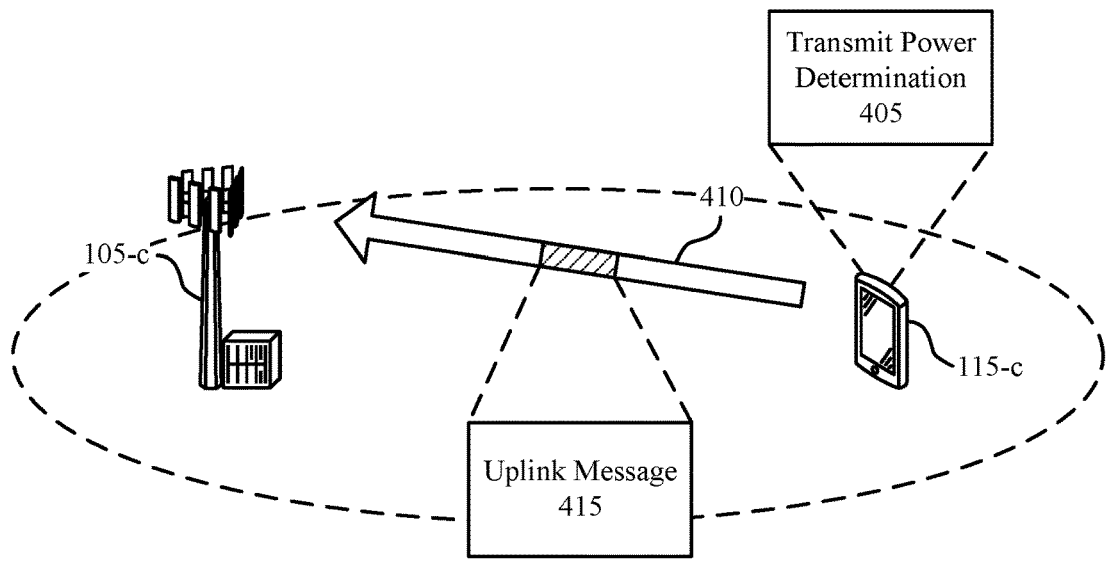
FIGS. 4A and 4B illustrate examples of open and closed-loop power controls, respectively that support power control enhancement for inter-UE multiplexing in accordance with aspects of the present disclosure.
Figure 4B:
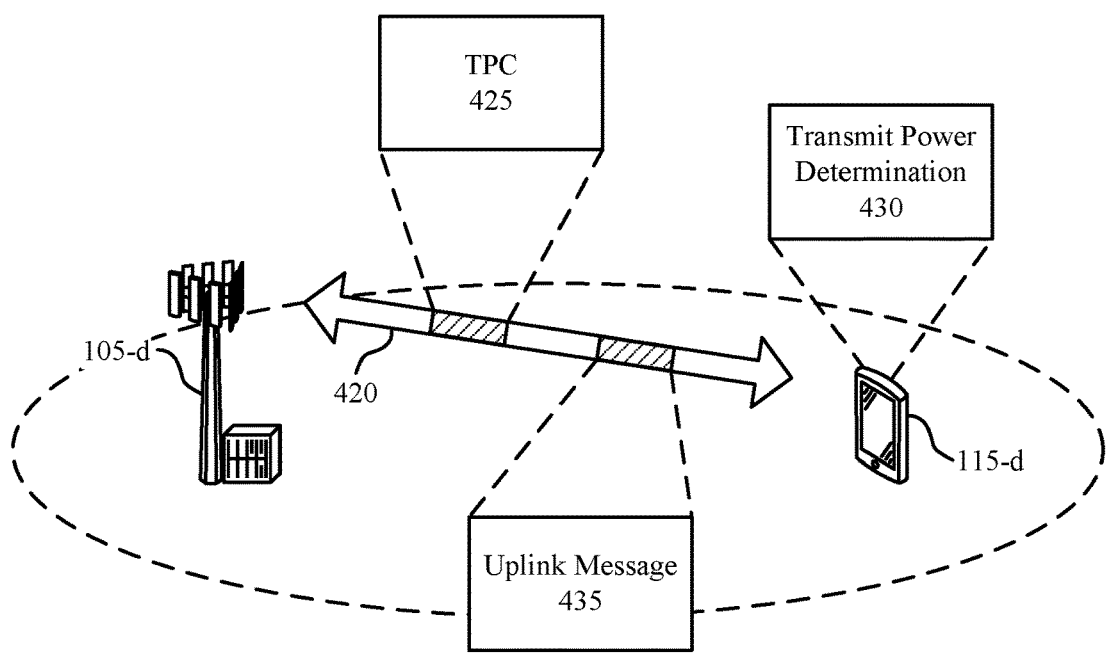

FIGS. 4A and 4B illustrate an example of an open-loop power control 400 and a closed-loop power control 401, respectively that support power control enhancement for inter-UE multiplexing in accordance with aspects of the present disclosure. In some examples, open-loop power control 400 and closed-loop power control 401 may implement aspects of wireless communications systems 100, 200, and/or 300. Open-loop power control 400 may include a base station 105-*c* and a UE 115-*c*, and closed-loop power control 401 may include a base station 105-*d* and a UE 115-*d*, which may all be examples of corresponding base stations 105 and UEs 115, respectively, as described above with reference to FIGS. 1-3.

Open-loop power control 400 may include UE 115-*c* performing a transmit power determination 405 without any signaling from base station 105-*c* prior to transmitting an uplink message 415 on a carrier 410 to base station 105-*c*. For example, in open-loop power control 400, there may not be any feedback from UE 115-*c* to base station 105-*c* or from base station 105-*c* to UE 115-*c* prior to transmission of uplink message 415, and UE 115-*c* may determine a transmission power based on a power setting algorithm in UE 115-*c* (e.g., using higher layer signaling, path loss, or additional factors). In some cases, a dedicated pilot channel may be provided for channel estimation that is transmitted by base station 105-*c* to all the subscribers (e.g., all UEs 115 in a geographic coverage area of base station 105-*c*). Accordingly, UE 115-*c* may receive the pilot channel and estimate the power strength. Based on this estimate, UE 115-*c* may adjust the transmit power accordingly for transmitting uplink message 415. During open-loop power control 400, both forward link (e.g., from base station 105-*c* to UE 115-*c*) and reverse link (e.g., from UE 115-*c* to base station 105-*c*) may be assumed to be correlated. In some cases, UE 115-*c* may use open-loop power control 400 for an initial physical RACH (PRACH) transmit power to connect to base station 105-*c*.

Additionally or alternatively, closed-loop power control 401 may include base station 105-*d* transmitting a TPC 425 on a carrier 420 that UE 115-*d* uses for a transmit power determination 430 to determine a transmit power for transmitting an uplink message 435 on carrier 420. For example, in closed-loop power control 401, feedback may be used for adjusting the transmit power level. That is, transmit power at UE 115-*d* (e.g., UE transmission power) may be controlled dynamically by TPC 425 (e.g., a TPC command signaled by a MAC control element (CE) or a TPC field in a DCI message, such as DCI 0). Accordingly, UE transmission power may be controlled by some feedback input from base station 105-*d*, such that overall power control process may form a loop (e.g., a closed loop). In the forward link direction, base station 105-*d* may receive a mobile signal. Based on this received power level as well as other parameters (e.g., such as signal-to-noise ratio (SNR), block-error rate (BLER), power headroom (PHR), etc.), base station 105-*d* may determine an optimum power level that UE 115-*d* needs to transmit at to achieve effective communication link performance. Base station 105-*d* may then transmit this estimated power level (e.g., via TPC 425) to UE 115-*d* over a control channel. Accordingly, UE 115-*d* may adjust the power level for transmitting uplink message 435 using the feedback provided by base station 105-*d*. Additionally, UE 115-*d* may estimate the base station power level and transmit an indication for base station 105-*d* to adjust its power level to achieve effective reverse link performance.

Figure 5:
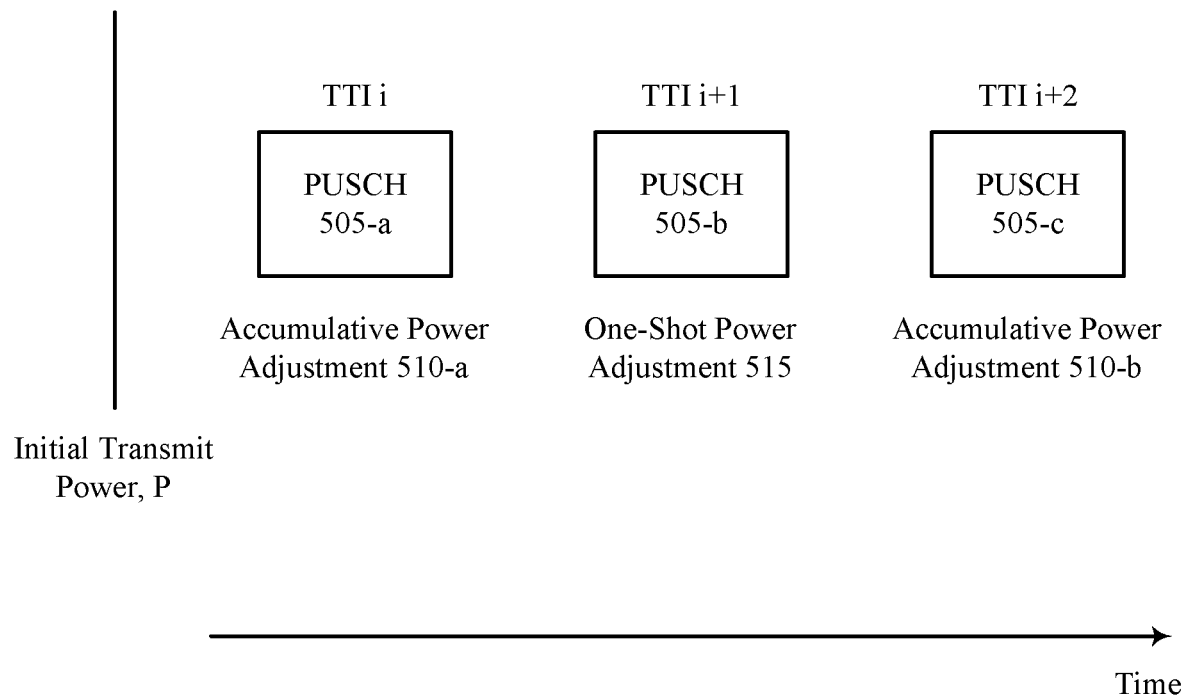
FIG. 5 illustrates an example of a power adjustment configuration that supports power control enhancement for inter-UE multiplexing in accordance with aspects of the present disclosure.

FIG. 5 illustrates an example of a power adjustment configuration 500 that supports power control enhancement for inter-UE multiplexing in accordance with aspects of the present disclosure. In some examples, power adjustment configuration 500 may implement aspects of wireless communications systems 100 and/or 200. As described herein, a UE 115 may receive an indication from a base station 105 to adjust a transmit power for transmitting uplink messages (e.g., PUSCH transmission) to the base station 105. For example, the power adjustment may be an accumulative power adjustment (e.g., power is adjusted for all future uplink messages until a new adjustment is scheduled) or a one-shot power adjustment (e.g., power is adjusted for a single uplink message after an indication of the adjustment is received). In some cases (e.g., as described above), the power adjustment may include an explicit indication of whether the power adjustment is an accumulative power adjustment or a one-shot power adjustment. Additionally or alternatively, the UE 115 may determine whether a power adjustment is accumulative or a one-shot based on signaling from the base station 105.

In some cases, the UE 115 may implicitly determine whether a signaled power adjustment value is accumulative or a one-shot power adjustment based on a TPC command field transmitted by the base station 105. For example, the TPC command field (e.g., transmitted in a DCI) may indicate a particular value of power change. This power change value may be denoted as $\delta_{PUSCH}$. Each $\delta_{PUSCH}$ value may be either an accumulative power change or a one-shot power change. As described above, the accumulative power change may apply to a present uplink transmission and all subsequent uplink transmissions. Alternatively, the one-shot power change may apply to a present uplink transmission but not to future uplink transmissions. Additionally, the one-shot power change may still be applied on top of previously signaled accumulative power changes (e.g., different than an absolute power change). Table 1 below may indicate possible $\delta_{PUSCH}$ value (e.g., power change values) for different TPC command values.

TABLE 1

Mapping of TPC Command Field to $\delta_{PUSCH}$

| TPC Command Field | $\delta_{PUSCH}$ (dB) | |
|---|---|---|
| 0 | −1 | Accumulative Power Adjustment |
| 1 | 0 | |
| 2 | 1 | |
| 3 | 3 | |
| 4 | P1 (e.g., 4) | One-Shot (Non-Accumulated) Power Adjustment |
| 5 | P2 (e.g., 5) | |
| 6 | P3 (e.g., 6) | |
| 7 | P4 (e.g., 9) | |

Table 1 may represent an extension of a previously configured mapping of TPC command fields to $\delta_{PUSCH}$ values, where the TPC field size is increased to allow more TPC values. For example, the first four TPC values (e.g., 0, 1, 2, 3) may be existing TPC command fields with the respective $\delta_{PUSCH}$ values, where the $\delta_{PUSCH}$ values for the first four TPC values may be used for accumulative power adjustments, and any other TPC values (e.g., 4, 5, 6, 7, etc.) may represent new values. Accordingly, if one of the new TPC values are indicated by the base station 105, the UE 115 may interpret the corresponding $\delta_{PUSCH}$ value as a one-shot power adjustment. Additionally or alternatively, the UE 115 may determine if a $\delta_{PUSCH}$ value is accumulative or a one-shot power adjustment based on the signaled TPC command field (e.g., not based on whether the TPC command field is an existing TPC command field or a new TPC command field).

Additionally, P1, P2, P3, and P4 values (e.g., X1, X2, X3, and X4 values) that correspond to the TPC values 4, 5, 6, and 7, respectively, may be configured by the base station 105 to the UE 115. For example, TPC values 0, 1, 2, and 3 (e.g., and the corresponding accumulative power adjustments) may be used by the UE 115 when the base station 105 does not provide higher layer signaling indicating accumulative power control parameters (e.g., tpc-Accumulative RRC signaling). Accordingly, TPC values 4, 5, 6, and 7 may be added to the TPC table for TPC values 0, 1, 2, and 3. To provide flexibility to a base station scheduler, the one-shot power adjustment values corresponding to TPC values 4, 5, 6, and 7 (e.g., P1, P2, P3, and P4) may not be hard-coded. Instead, the base station 105 may configure these values to the UE 115. Further, for the subsequent uplink transmission (s), if interference is not present (e.g., from eMBB traffic), a power adjustment may not need to carry over to these subsequent uplink transmissions. As such, these TPC values and the corresponding power adjustment values (e.g., X1, X2, X3 and X4) may be interpreted differently than legacy power control values (e.g., accumulative power adjustment values).

In some cases, if the UE 115 receives a TPC in an uplink grant which indicates these configured power adjustment values (e.g., P1, P2, P3, or P4), the UE 115 may apply the power adjustment on the current transmission and does not apply them to subsequent transmissions (e.g., one-shot power adjustment). Accordingly, all the power adjustment values for these TPC values may be positive values (e.g., since the base station 105 may not need to signal power de-boost).

Additionally or alternatively, a field may be added to a DCI configured for TPC, where the field indicates a switch between two different TPC tables, where a first TPC table may represent an existing table for accumulative power adjustments and a second TPC table may represent a new table for one-shot power adjustments (e.g., non-accumulative power adjustment). For example, the field may be one (1) bit that indicates either Table 2 (e.g., accumulative TPC) shown below or Table 3 (e.g., one-shot TPC) shown below (e.g., a '0' indicates Table 2 and a '1' indicates Table 3, or vice versa).

TABLE 2

DCI Indicated Accumulative TPC Table

| TPC Command Field | $\delta_{PUSCH}$ (dB) |
|---|---|
| 0 | −1 |
| 1 | 0 |
| 2 | 1 |
| 3 | 3 |

TABLE 3

DCI Indicated One-Shot TPC Table

| TPC Command Field | $\delta_{PUSCH}$ (dB) |
|---|---|
| 0 | P1 (e.g., 4) |
| 1 | P2 (e.g., 5) |
| 2 | P3 (e.g., 6) |
| 3 | P4 (e.g., 9) |

In some cases, both tables may include a same number of entries, but indicate the different types of TPC commands and different power adjustment levels (e.g., different dB increases or decreases). Additionally, the DCI field indicating one of the tables may dynamically indicate whether the power control (e.g., TPC) is accumulative or not. The DCI with the field indicating a table may be transmitted with indications of the different tables, or the tables may be configured to the UE 115, and the UE 115 determines which table to use for TPC based on the DCI with the field. In some cases, Table 2 may represent a legacy table stored in memory of the UE 115 (e.g., defined for the UE 115), and Table 3 may be configured to the UE 115 from the base station 105 (e.g., through RRC configuration). Accordingly, all TPC values/entries in Table 3 may be RRC configurable to the UE 115.

Similar to Equation 1 defined above, the transmit power for an uplink message (e.g., transmitted on a PUSCH) may be determined by Equation 2.

$$P_{PUSCH}(i) = \min\{P_{C,max}, P_0(j) + \alpha(j) \cdot PL(q) + 10 \log_{10}(2^\mu M_{RB}) + \Delta_{TF} + f(i,l)\} \quad (2)$$

However, instead of f(l) represent a closed-loop power control parameter for any occasion, f(i,l) may represent a closed-loop power control parameter for an i-th occasion. Based on Equation 2, accumulative power control adjustments may be defined by Equations 3 and 4 below.

$$f=(i,l)=f(i-1,l)+\delta_{PUSCH}(i,l) \quad (3)$$

$$f(i+1,l)=f(i,l)+\delta_{PUSCH}(i+1,l) \quad (4)$$

Based on Equation 3, the closed-loop power control for an i-th occasion may use the previous occasion (e.g., i−1) and add the $\delta_{PUSCH}$ value signaled for the i-th occasion. Similar, based on Equation 4, the closed-loop power control for a next occurring occasion (e.g., i+1) may also be based off the previous occasion (e.g., i-th occasion) and adding the $\delta_{PUSCH}$ value signaled for that next occurring occasion.

Additionally, one-shot power control adjustments (e.g., non-accumulative adjustments) may be based on Equation 2 and be defined by Equations 5 and 6 below.

$$f(i,l)=f(i-1,l)+\delta_{PUSCH}(i,l) \quad (5)$$

$$f(i+1,l)=f(i-1,l)+\delta_{PUSCH}(i+1,l) \quad (6)$$

Based on Equation 5, similar to Equation 3 above for the accumulative power control adjustments, the closed-loop power control for an i-th occasion may use the previous occasion (e.g., i−1) and add the $\delta_{PUSCH}$ value signaled for the i-th occasion. However, for Equation 6, the closed-loop power control for a next occurring occasion (e.g., i+1) may be based off the original occasion and original power control (e.g., i−1), rather than an immediately preceding occasion. Accordingly, the one-shot power control adjustments may apply to one occasion and not build off each other. Additionally or alternatively, an absolute power control may be used for a closed-loop power control, where the absolute power control is defined by Equations 7 and 8 as shown below.

$$f(i,l)=\delta_{PUSCH}(i,l) \quad (7)$$

$$f(i+1,l)=\delta_{PUSCH}(i+1,l) \quad (8)$$

Based on Equations 7 and 8, a UE 115 may use a signaled $\delta_{PUSCH}$ value for the TPC (e.g., the TPC for an i-th occasion is not based on a previously signaled TPC or $\delta_{PUSCH}$ value). For example, for an i-th occasion or an (i+1)-th occasion, the base station 105 may signal a power level (e.g., $\delta_{PUSCH}$ value) for the UE 115 to use for that corresponding occasion, and the UE 115 then uses the power level regardless of previously signaled TPCs or power levels (e.g., the signaled power level for that occasion overrides other TPCs).

As shown in FIG. 5, the base station 105 may indicate an initial transmit power, P, (e.g., measured in dB) to the UE 115 to transmit one or more PUSCHs 505 but then may adjust P based on an accumulative power adjustment 510 and/or a one-shot power adjustment 510 (e.g., as indicated above by tables, DCI, etc.). Subsequently, for a TTI i (e.g., subframe, slot, an i-th occasion, etc.), the base station 105 may signal a first accumulative power adjustment 510-a for a first PUSCH 505-a. For example, first accumulative power adjustment 510-a may increase the transmit power of the UE 115 by one (1) dB, such that the UE 115 transmits first PUSCH 505-a at a transmit power of P+1 dB (e.g., with respect to the initial transmit power, P). Additionally or alternatively, for a TTI i+1 next occurring after the TTI i, the base station 105 may signal a one-shot power control adjustment 515 for a second PUSCH 505-b. For example, one-shot power adjustment 515 may increase the transmit power of the UE 115 by six (6) dBs, such that the UE 115 transmits second PUSCH 505-b at a transmit power of P+7 dB (e.g., with respect to the initial transmit power, P). Accordingly, the UE 115 may take into account the one (1) dB increase signaled by first accumulative power control adjustment 510-a when applying one-shot power control adjustment 515.

Additionally or alternatively, for a TTI i+2 next occurring after the TTI i+1, the base station 105 may signal a second accumulative power adjustment 510-b for a third PUSCH 505-c. For example, second accumulative power adjustment 510-c may decrease the transmit power of the UE 115 by two (2) dBs, such that the UE 115 transmits third PUSCH 505-c at a transmit power of P−1 dB (e.g., with respect to the initial transmit power, P). Accordingly, the UE 115 may take into account the one (1) dB increase signaled by first accumulative power control adjustment 510-a when applying second accumulative power control adjustment 510-b but may ignore the six (6) dB increase signaled by one-shot power control adjustment 515. In some cases, although not shown, the base station 105 may indicate an absolute power control value, where the UE 115 uses the absolute power control value for a transmit power without taking into account any previously signaled power control adjustments (e.g., including accumulative power control adjustments 510). For example, the absolute power control value may be x dB, and the UE 115 transmits a PUSCH 505 for a corresponding occasion at x dB.

As described above, the base station 105 may signal a power adjustment per an uplink configured grant group in a group-common DCI. Additionally or alternatively, a power adjustment field (e.g., power-boosting field) with an additional priority level field. For example, the base station 105 may signal a "+6 dB power boosting" and an uplink configured grant index or an uplink configured grant group index or a priority level in one group-common DCI.

Figure 6:
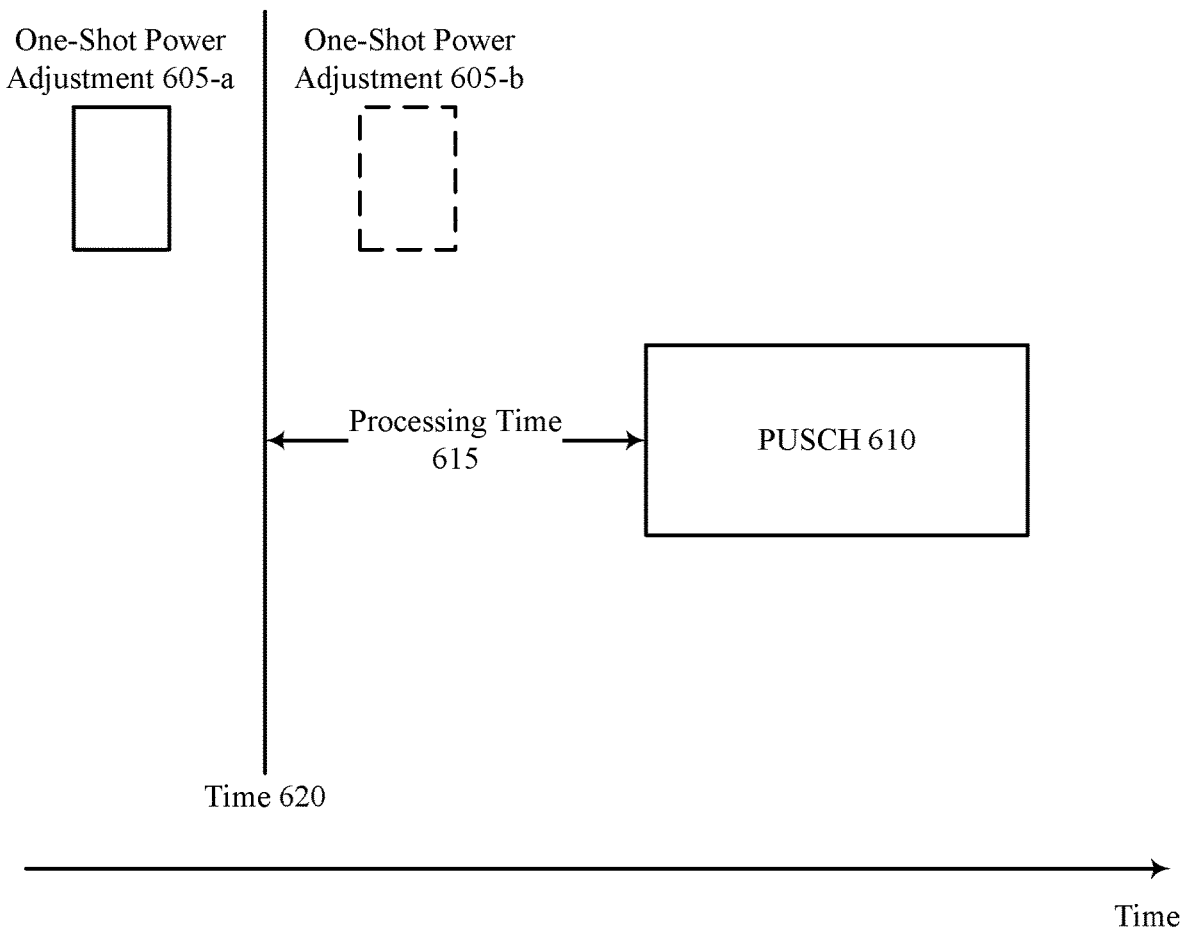
FIG. 6 illustrates an example of a processing timeline that supports power control enhancement for inter-UE multiplexing in accordance with aspects of the present disclosure.

FIG. 6 illustrates an example of a processing timeline 600 that supports power control enhancement for inter-UE multiplexing in accordance with aspects of the present disclosure. In some examples, processing timeline 600 may implement aspects of wireless communications systems 100 and/or 200. In some cases, a UE 115 may use processing timeline 600 to determine whether or not to apply a one-shot power adjustment 605 to a PUSCH 610 based on a processing time 615.

Conventionally, for an uplink configured grant transmission (e.g., PUSCH 610), the UE 115 may apply a TPC if the TPC is received within a threshold amount of time before the uplink configured grant transmission is sent. For example, the threshold amount of time may include $K_{2,min} \times 14$ symbols, where $K_{2,min}$ represents an integer which is a minimum of values provided by $K_2$ in a PUSCH configuration message (e.g., PUSCH-ConfigCommon message) for an active uplink bandwidth part of a carrier of a serving cell. For a one-shot power adjustment 605, this timeline may be too slow (e.g., for a URLLC uplink transmission, the power adjustment may need to be applied sooner to ensure the reliability and latency requirements associated with URLLC).

Accordingly, as shown in FIG. 6, the UE 115 may use a timeline associated with processing time 615 to determine whether to apply a one-shot power adjustment 605 to a transmit power level for transmitting PUSCH 610. For example, the UE 115 may determine to apply a first one-shot power adjustment 605-a for transmitting PUSCH 610 based on receiving first one-shot power adjustment 605-a before a time 620 that corresponds to a number of TTIs (e.g., symbols) before transmitting PUSCH 610. Alternatively, the UE 115 may determine not to apply a second one-shot power adjustment 605-b for transmitting PUSCH 610 based on receiving second one-shot power adjustment 605-a after time 620. In some cases, processing time 615 may correspond to a minimum processing time for the UE 115 to prepare a dynamic PUSCH transmission (e.g., from the time when the UE 115 receives the uplink grant scheduling the dynamic PUSCH transmission). For example, processing time 615 may be defined as an N2 parameter for URLLC transmissions. Additionally, based on processing timeline 600, the UE 115 may either apply the one-shot power adjustment 605 to all of PUSCH 610 or not apply the one-shot power adjustment 605 to any symbols (e.g., any part) of PUSCH 610. Accordingly, the UE 115 may not apply the one-shot power adjustment 605 partially to PUSCH 610.

Figure 7:
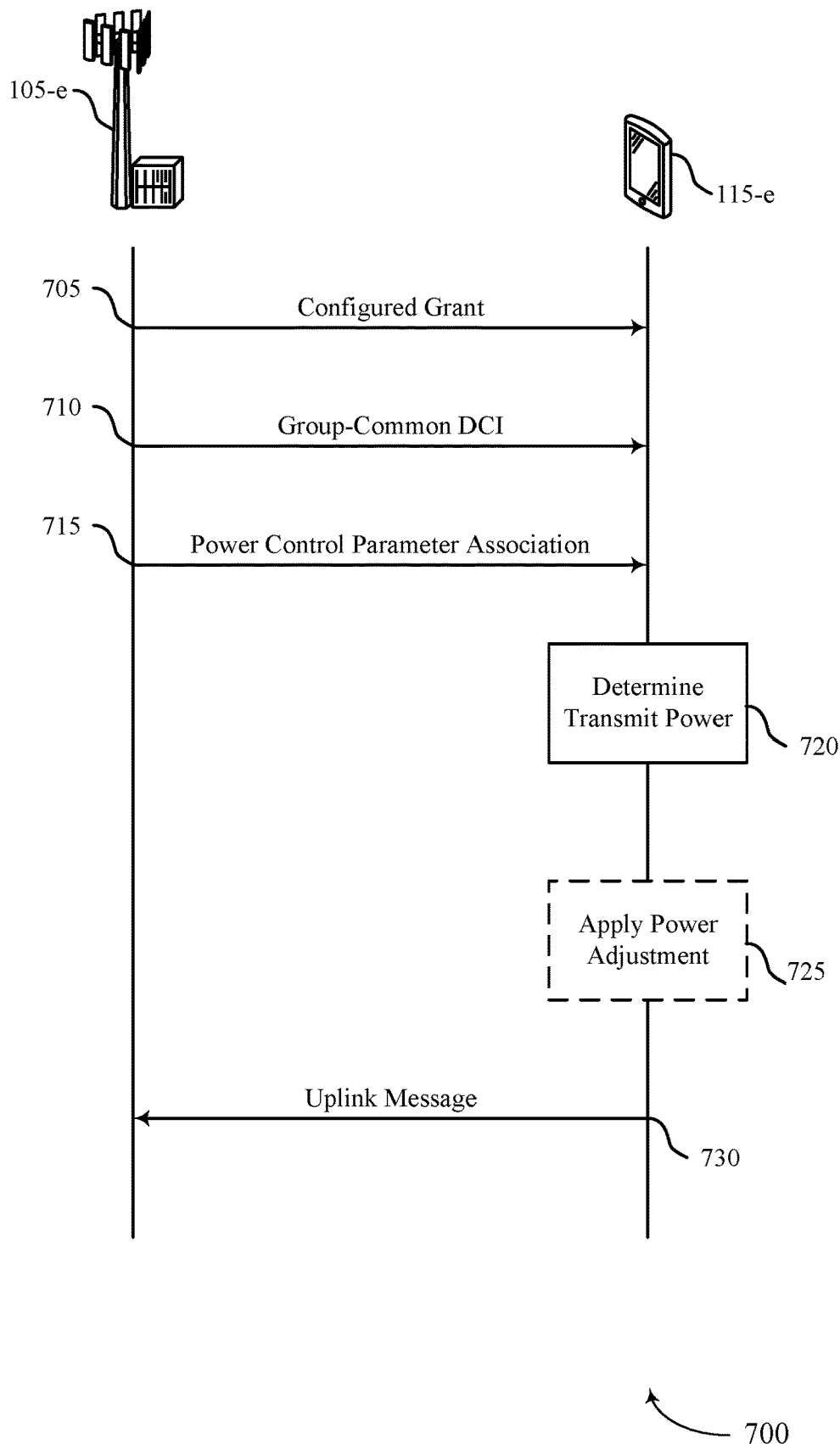
FIGS. 7 and 8 illustrate examples of process flows that support power control enhancement for inter-UE multiplexing in accordance with aspects of the present disclosure.

FIG. 7 illustrates an example of a process flow 700 that supports power control enhancement for inter-UE multiplexing in accordance with aspects of the present disclosure. In some examples, process flow 700 may implement aspects of wireless communications systems 100 and/or 200. Process flow 700 may include a base station 105-e and a UE 115-e, which may be examples of corresponding base stations 105 and UEs 115, respectively, as described above with reference to FIGS. 1-6.

In the following description of the process flow 700, the operations between UE 115-e and base station 105-e may be performed in different orders or at different times. Certain operations may also be left out of the process flow 700, or other operations may be added to the process flow 700. It is to be understood that while UE 115-e and base station 105-e are shown performing a number of the operations of process flow 700, any wireless device may perform the operations shown.

At 705, UE 115-e may receive, from base station 105-e, configured grant for uplink transmissions to base station 105-e, the configured grant including an initial power configuration for the configured grant.

At 710, UE 115-e may receive, from base station 105-e, a group common DCI message, the group common DCI message including a power control parameter. In some cases, UE 115-e may receive multiple group-common DCI messages including different power control parameters and may determine multiple RNTIs corresponding to the multiple group-common DCI messages. Accordingly, the multiple RNTIs may be associated with different priority levels of the configured grant, one group-common DCI message may correspond to one or multiple configured grants, the configured grant may be associated with a single group-common DCI message, or a combination thereof. In some cases, the power control parameter may indicate for UE 115-e to use a maximum transmit power for transmitting the uplink message. In some cases, base station 105-e may determine a transmit power for the UE to transmit the uplink message associated with the configured grant, where the power control parameter corresponds to the determined transmit power. Additionally, in some cases, the group-common DCI message may include an uplink configured grant index, an uplink configured grant group index, a priority level, or a combination thereof for the power control parameter, and the transmit power for transmitting the uplink message may be determined based at least in part on the uplink configured grant index, the uplink configured grant group index, the priority level, or the combination thereof.

At 715, UE 115-e may receive, from base station 105-e, an indication that the power control parameter is associated with the configured grant. In some cases, the indication that the power control parameter is associated with the configured grant may be received via RRC signaling or the group-common DCI message.

At 720, UE 115-e may determine a transmit power for transmitting an uplink message associated with the configured grant based on the initial power configuration, the power control parameter, and the indication that the power control parameter is associated with the configured grant. In some cases, UE 115-e may determine a baseline transmit power based on the initial power configuration for the configured grant and then determine a power adjustment value (e.g., a power boosting value) based on the power control parameter received in the group common DCI message. Additionally or alternatively, the power adjustment value may be further based on an MCS of the uplink message. In some cases, the initial power configuration may include a set of one or more power adjustment values corresponding to the configured grant, and the power adjustment value may be determined based on selecting the power adjustment value from the set of one or more power adjustment values. Additionally or alternatively, the initial power configuration may include the baseline transmit power and the set of one or more additional transmit power levels, the power adjustment value may be determined based on a difference between the baseline transmit power and one of the additional transmit power levels.

In some cases, UE 115-e may determine the power control parameter is associated with the configured grant based on a group-common RNTI corresponding to the group-common DCI message including the power control parameter associated with the configured grant, where the group-common RNTI is one of the multiple RNTIs. Additionally or alternatively, UE 115-e may receive an index for the configured grant and determine the transmit power based on the index and the power control parameter. In some cases, where the group-common DCI message includes a second power control parameter, UE 115-e may receive, from base station 105-e, a second configured grant for uplink transmissions to base station 105-e and receive, from base station 105-e, a second indication that the second power control parameter is associated with the second configured grant. Accordingly, UE 115-e may determine a second transmit power for transmitting a second uplink message associated with the second configured grant based on the second power control parameter. In some cases, the index for the configured grant, a power adjustment value for determining the transmit power, or a combination thereof may be received via RRC signaling at a physical layer of UE 115-e.

Additionally or alternatively, UE 115-e may receive, from base station 105-e, a dynamic uplink grant for a dynamic uplink transmission to base station 105-e, the dynamic uplink grant including an additional power configuration for the dynamic uplink grant, may determine an additional baseline transmit power based on the additional power configuration for the dynamic uplink grant, and may determine to apply the power adjustment value to the baseline transmit power, the additional baseline transmit power, or both, based on a power adjustment parameter. In some cases, the power adjustment parameter may include an indication of an open-loop power control or a closed-loop power control, and the power control parameter may be applied to the baseline transmit power but not to the additional baseline transmit power based on the open-loop power control or the closed-loop power control. Additionally or alternatively, the power adjustment parameter may include an indication of a set of uplink resources, and the power control parameter may be applied to the additional baseline transmit power based on determining whether the set of uplink resources overlaps at least a portion of uplink resources used for the dynamic uplink transmission and not receiving a dynamic power adjustment value in the dynamic uplink grant. Alternatively, the power control parameter may not be applied to the additional baseline transmit power based on determining whether the set of uplink resources overlaps at least a portion of uplink resources used for the dynamic uplink transmission and receiving a dynamic power adjustment value in the dynamic uplink grant.

At 725, UE 115-e may apply a power adjustment to the transmit power based on a priority of data to be transmitted in the uplink message and the power control parameter in the configured grant. In some cases, UE 115-e may adjust (e.g., increase) the transmit power for a first priority level of the data and may refrain from adjusting the transmit power for a second priority level of the data. Additionally or alternatively, UE 115-e may adjust (e.g., increase) the transmit power by a first value for a first priority level of the data, adjust (e.g., increase) the transmit power by a second value for a second priority level of the data, or a combination thereof for multiple uplink messages in the configured grant, where the first priority level is higher than the second priority level. Accordingly, UE 115-e may receive, from base station 105-e, the first value and the second value via RRC signaling with the configured grant.

In some cases, UE 115-e may determine to apply the power adjustment value to the baseline transmit power based on a processing time for the UE to apply the power adjustment value to the baseline transmit power. For example, the processing time may include a minimum processing time for the UE to prepare a dynamic uplink transmission after receiving a dynamic uplink grant scheduling the dynamic uplink transmission. Additionally, the power adjustment value may be applied to the baseline transmit power for the entire uplink message or not applied to the baseline transmit power for any of the uplink message based on the processing time.

At 730, UE 115-e may transmit, to base station 105-e, the uplink message according to the determined transmit power. In some cases, UE 115-e may drop the uplink message based on a priority level of data to be transmitted in the uplink message, an increased transmit power indicated by the power control parameter (e.g., that UE 115-e is unable to reach based on, for example, a power limitation), or a combination thereof.

Figure 8:
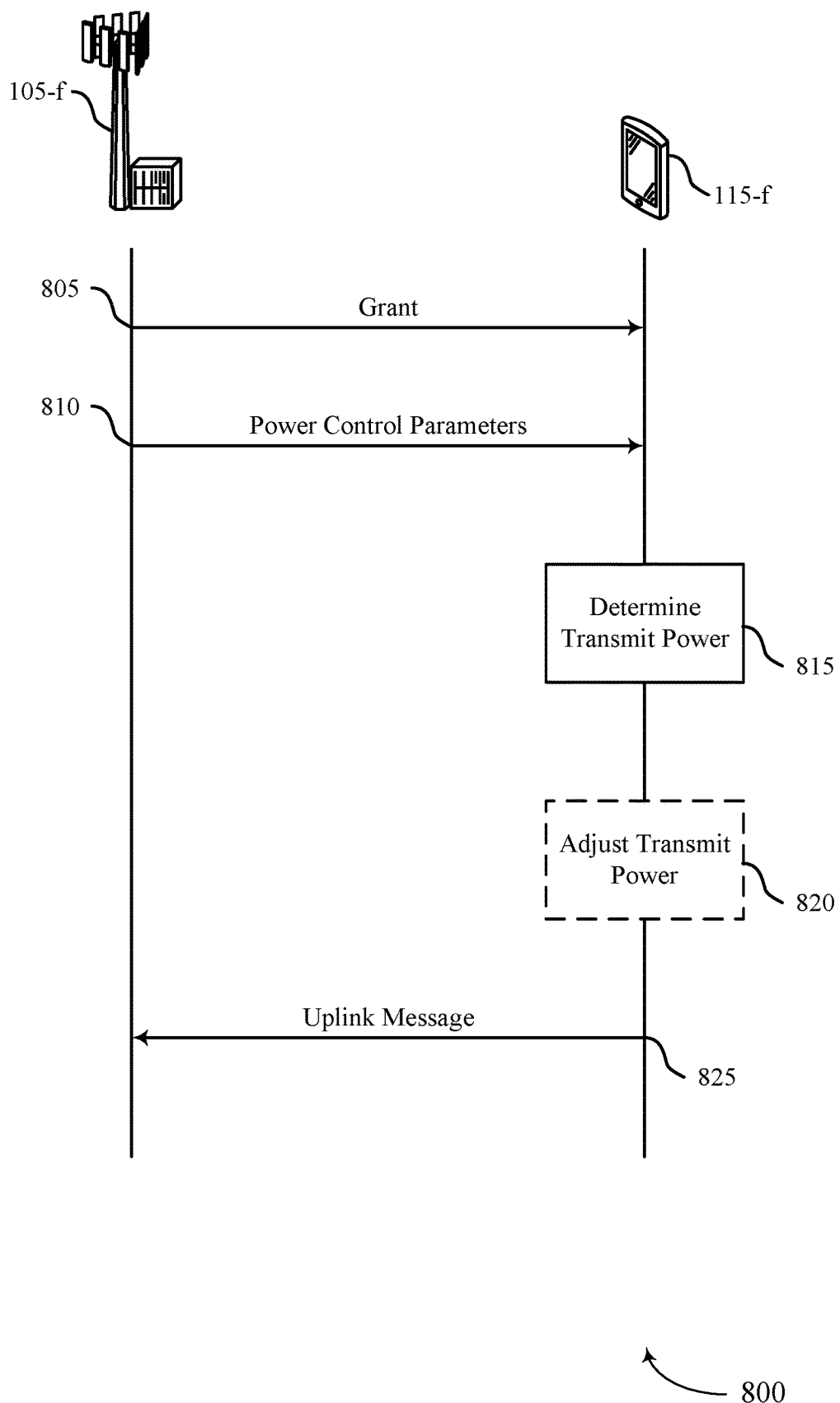

FIG. 8 illustrates an example of a process flow 800 that supports power control enhancement for inter-UE multiplexing in accordance with aspects of the present disclosure. In some examples, process flow 800 may implement aspects of wireless communications systems 100 and/or 300. Process flow 800 may include a base station 105-$f$ and a UE 115-$f$, which may be examples of corresponding base stations 105 and UEs 115, respectively, as described above with reference to FIGS. 1-7.

In the following description of the process flow 800, the operations between UE 115-$f$ and base station 105-$f$ may be performed in different orders or at different times. Certain operations may also be left out of the process flow 800, or other operations may be added to the process flow 800. It is to be understood that while UE 115-$f$ and base station 105-$f$ are shown performing a number of the operations of process flow 800, any wireless device may perform the operations shown.

At 805, UE 115-$f$ may receive, from base station 105-$f$, a grant for one or more uplink transmissions to base station 105-$f$.

At 810, UE 115-$f$ may receive, from base station 105-$f$, a first power control parameter that includes a baseline transmit power for the uplink transmissions and a second power control parameter that includes a power adjustment value for the uplink transmissions. In some cases, where the grant includes a dynamic grant and the uplink message includes a dynamic physical uplink channel (e.g., dynamic PUSCH) message, UE 115-$f$ may receive the first power control parameter and the second power control parameter in the dynamic grant. Additionally or alternatively, where the grant includes a configured grant and the uplink message includes a configured physical uplink channel (e.g., configured PUSCH) message, UE 115-$f$ may receive the first power control parameter and the second power control parameter in a group-common TPC message. In some cases, UE 115-$f$ may receive the second power control parameter based on a priority level associated with data to be transmitted in the uplink message (e.g., for URLLC traffic).

In some cases, UE 115-$f$ may receive, from base station 105-$f$, at least one of the first power control parameter and the second power control parameter for the uplink transmissions. Additionally, the first power control parameter may include an accumulative power control value, and the second power control parameter may include a one-shot power adjustment value. In some cases, UE 115-$f$ may receive, from base station 105-$f$, a power control parameter value in a transmit power control field of a DCI message and may determine whether the first power control parameter or the second power control parameter is received based on the power control parameter value. Additionally or alternatively, UE 115-$f$ may receive, from base station 105-$f$, a DCI field indicating whether the first power control parameter or the second power control parameter is received. In some cases, values for the second power control parameter may be configured via RRC signaling.

At 815, UE 115-$f$ may determine a transmit power for transmitting an uplink message associated with the grant based on the first power control parameter and the second power control parameter. In some cases, base station 105-$f$ may determine a transmit power for the UE to transmit the uplink message associated with the grant, where the first power control parameter and the second power control parameter correspond to the determined transmit power.

At 820, UE 115-$f$ may adjust the transmit power for transmitting the uplink message and any subsequent uplink messages based on the first power control parameter. Additionally or alternatively, UE 115-*f* may adjust the transmit power for transmitting the uplink message or multiple uplink messages for the grant in a time interval (e.g., a slot) based on the second power control parameter. In some cases, UE 115-*f* may adjust the transmit power for transmitting the uplink message and any subsequent uplink messages based on receiving the first power control parameter and may adjust the transmit power for transmitting the uplink message or multiple uplink messages for the grant in a time interval based on receiving the second power control parameter.

At 825, UE 115-*f* may transmit, to base station 105-*f*, the uplink message according to the determined transmit power and based on the first power control parameter and the second power control parameter.

Figure 9:
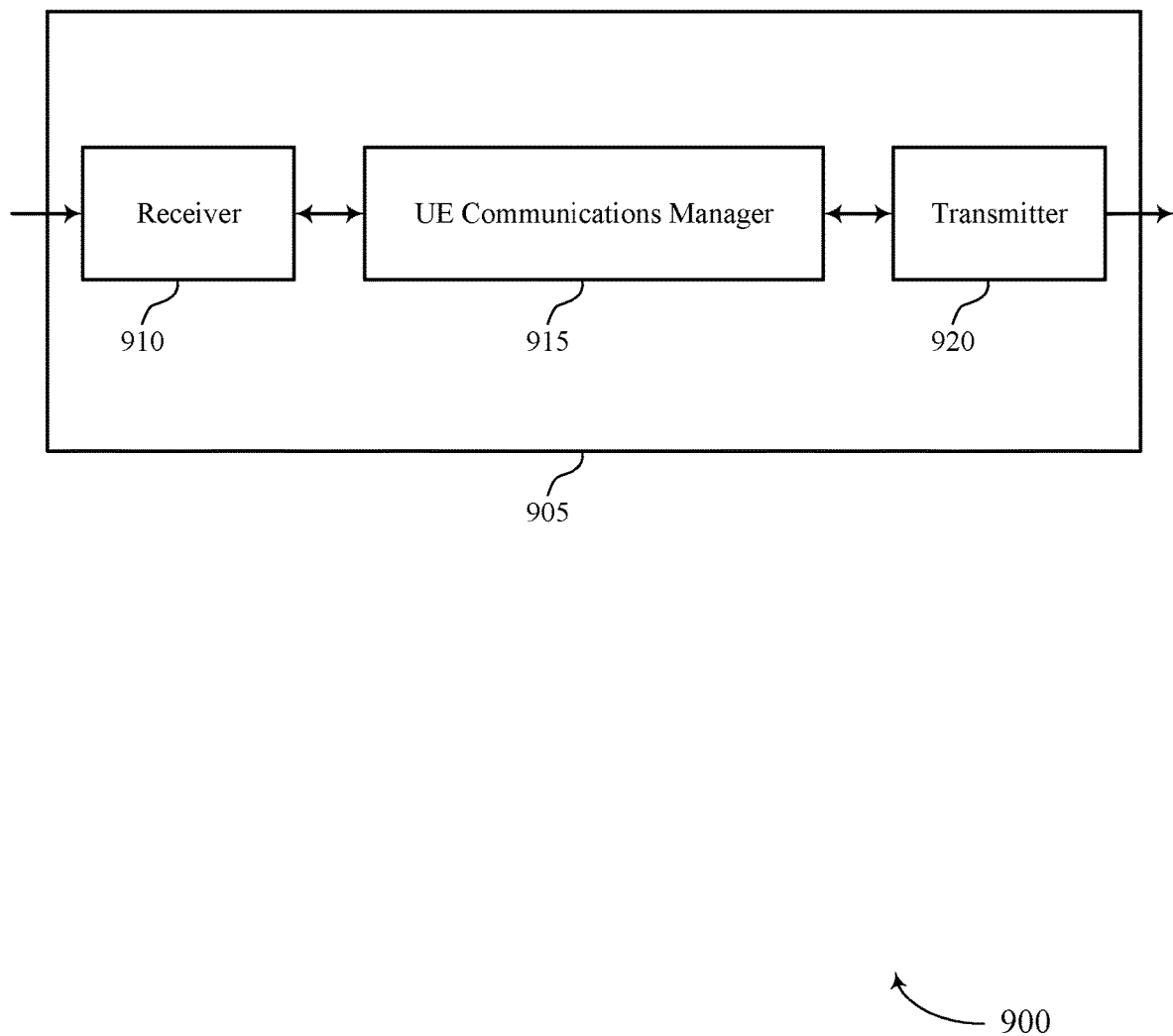
FIGS. 9 and 10 show block diagrams of devices that support power control enhancement for inter-UE multiplexing in accordance with aspects of the present disclosure.

FIG. 9 shows a block diagram 900 of a device 905 that supports power control enhancement for inter-UE multiplexing in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to power control enhancement for inter-UE multiplexing, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive, from a base station, a configured grant for uplink transmissions to the base station, the configured grant including an initial power configuration for the configured grant. In some cases, the UE communications manager 915 may receive, from the base station, a group-common downlink control information message, the group-common downlink control information message including a power control parameter. Additionally, the UE communications manager 915 may receive, from the base station, an indication that the power control parameter is associated with the configured grant. Accordingly, the UE communications manager 915 may determine a transmit power for transmitting an uplink message associated with the configured grant based on the initial power configuration, the power control parameter, and the indication that the power control parameter is associated with the configured grant. Subsequently, the UE communications manager 915 may transmit, to the base station, the uplink message according to the determined transmit power.

Additionally or alternatively, the UE communications manager 915 may receive, from a base station, a grant for one or more uplink transmissions to the base station. In some cases, the UE communications manager 915 may receive, from the base station, at least one of a first power control parameter and a second power control parameter for the uplink transmissions. Accordingly, the UE communications manager 915 may determine a transmit power for transmitting an uplink message associated with the grant based on the at least one of the first power control parameter and the second power control parameter. Subsequently, the UE communications manager 915 may transmit, to the base station, the uplink message according to the determined transmit power and based on the first power control parameter and the second power control parameter. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 915 as described herein may be implemented to realize one or more potential advantages. One implementation may provide improved quality and reliability of service at the UE 115, as the described techniques may enable the UE 115 to adjust a transmit power for an uplink message signaled by the configured grant. Additionally or alternatively, the UE 115 may more efficiently adjust transmit power with greater granularity than a TPC command and to accommodate traffic for multiple services simultaneously for multiple configured grants.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
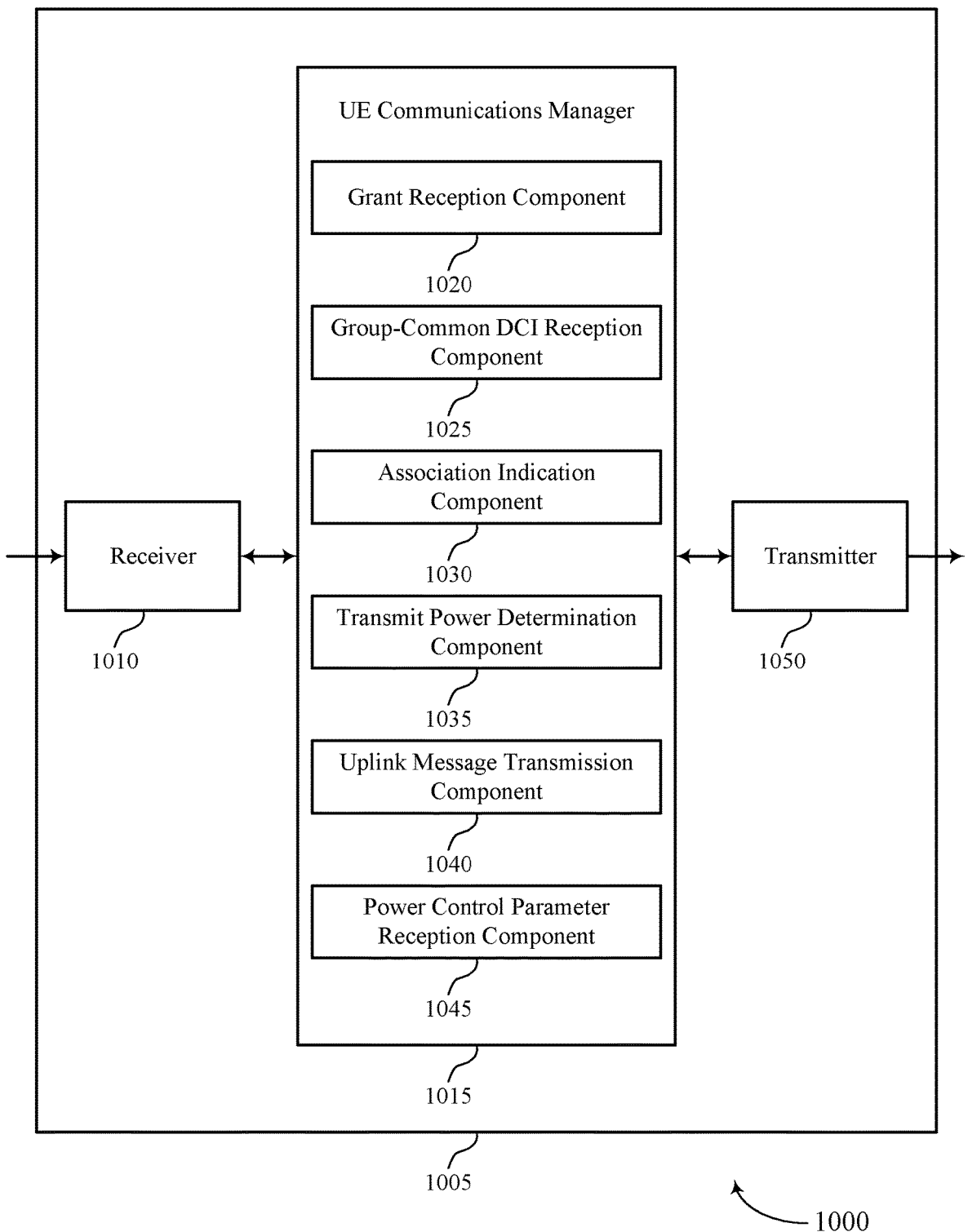

FIG. 10 shows a block diagram 1000 of a device 1005 that supports power control enhancement for inter-UE multiplexing in accordance with aspects of the present disclosure. The device 1005 may be an example of aspects of a device 905, or a UE 115 as described herein. The device 1005 may include a receiver 1010, a UE communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to power control enhancement for inter-UE multiplexing, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a grant reception component 1020, a group-common DCI reception component 1025, an association indication component 1030, a transmit power determination component 1035, an uplink message transmission component 1040, and a power control parameter reception component 1045. The UE communications manager 1015 may be an example of aspects of the UE communications manager 1210 described herein.

The grant reception component 1020 may receive, from a base station, a configured grant for uplink transmissions to the base station, the configured grant including an initial power configuration for the configured grant. Additionally or alternatively, the grant reception component 1020 may receive, from a base station, a grant for one or more uplink transmissions to the base station.

The group-common DCI reception component 1025 may receive, from the base station, a group-common downlink control information message, the group-common downlink control information message including a power control parameter.

The association indication component 1030 may receive, from the base station, an indication that the power control parameter is associated with the configured grant.

The power control parameter reception component 1045 may receive, from the base station, at least one of a first power control parameter and a second power control parameter for the uplink transmissions.

The transmit power determination component 1035 may determine a transmit power for transmitting an uplink message associated with the configured grant based on the initial power configuration, the power control parameter, and the indication that the power control parameter is associated with the configured grant. Additionally or alternatively, the transmit power determination component 1035 may determine a transmit power for transmitting an uplink message associated with the grant based on the at least one of the first power control parameter and the second power control parameter.

The uplink message transmission component 1040 may transmit, to the base station, the uplink message according to the determined transmit power. Additionally or alternatively, the uplink message transmission component 1040 may transmit, to the base station, the uplink message according to the determined transmit power and based on the first power control parameter and the second power control parameter.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
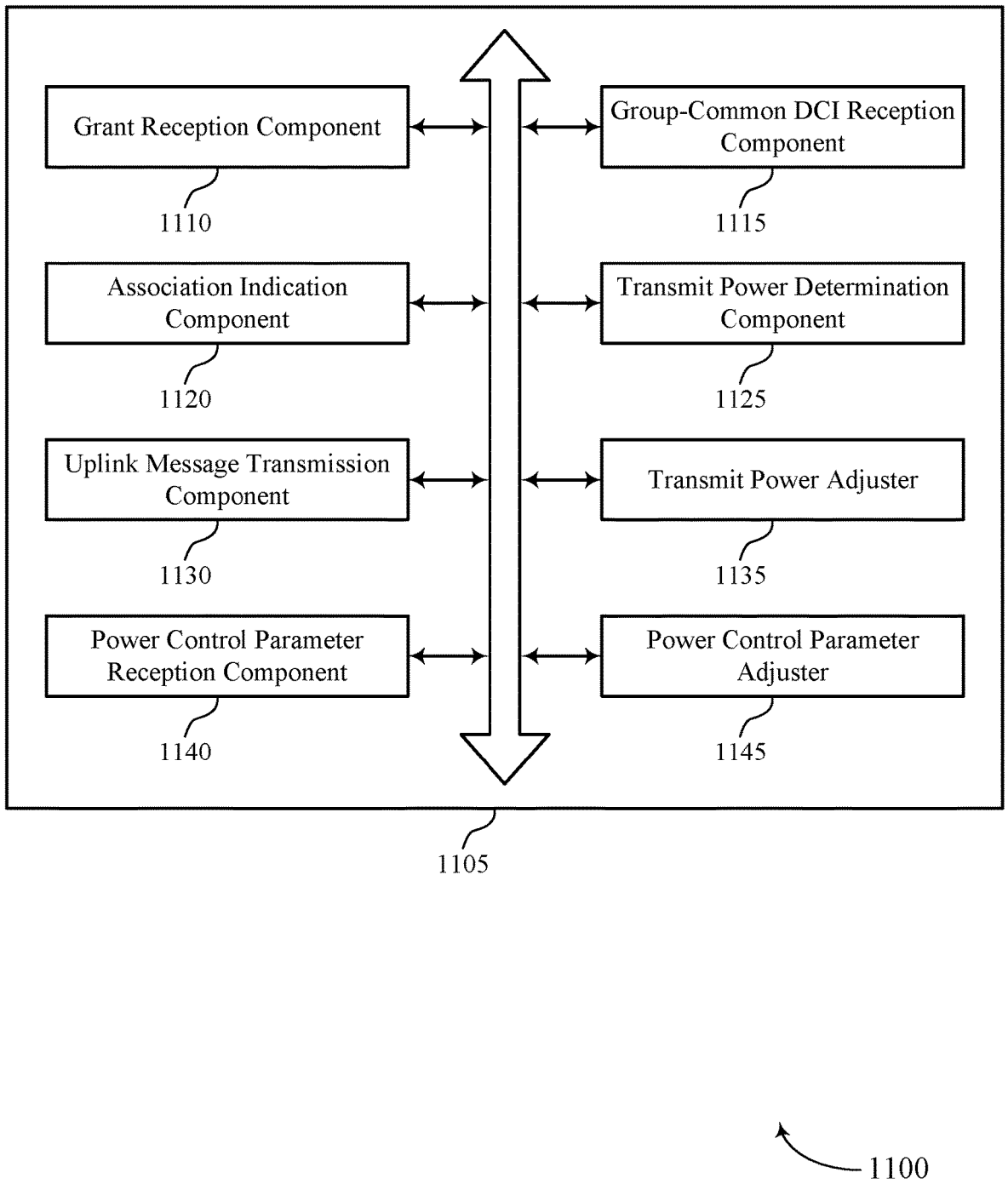
FIG. 11 shows a block diagram of a UE communications manager that supports power control enhancement for inter-UE multiplexing in accordance with aspects of the present disclosure.

FIG. 11 shows a block diagram 1100 of a UE communications manager 1105 that supports power control enhancement for inter-UE multiplexing in accordance with aspects of the present disclosure. The UE communications manager 1105 may be an example of aspects of a UE communications manager 915, a UE communications manager 1015, or a UE communications manager 1210 described herein. The UE communications manager 1105 may include a grant reception component 1110, a group-common DCI reception component 1115, an association indication component 1120, a transmit power determination component 1125, an uplink message transmission component 1130, a transmit power adjuster 1135, a power control parameter reception component 1140, and a power control parameter adjuster 1145. Each of these modules may communicate, directly or indirectly, with one another (e.g., via one or more buses).

The grant reception component 1110 may receive, from a base station, a configured grant for uplink transmissions to the base station, the configured grant including an initial power configuration for the configured grant. Additionally or alternatively, the grant reception component 1110 may receive, from a base station, a grant for one or more uplink transmissions to the base station.

The group-common DCI reception component 1115 may receive, from the base station, a group-common downlink control information message, the group-common downlink control information message including a power control parameter. In some examples, the group-common DCI reception component 1115 may receive multiple group-common downlink control information messages including different power control parameters and determine multiple radio network temporary identifiers corresponding to the multiple group-common downlink control information messages. Accordingly, the group-common DCI reception component 1115 may determine the power control parameter is associated with the configured grant based on a group-common radio network temporary identifier corresponding to the group-common downlink control information message including the power control parameter associated with the configured grant, where the group-common radio network temporary identifier is one of the multiple radio network temporary identifiers.

In some cases, the multiple radio network temporary identifiers may be associated with different priority levels of the configured grant, one group-common downlink control information message may correspond to one or multiple configured grants, the configured grant may be associated with a single group-common downlink control information message, or a combination thereof. Additionally, the power control parameter may indicate for the UE to use a maximum transmit power for transmitting the uplink message. In some cases, the group-common DCI message may include an uplink configured grant index, an uplink configured grant group index, a priority level, or a combination thereof for the power control parameter, and the transmit power for transmitting the uplink message may be determined based on the uplink configured grant index, the uplink configured grant group index, the priority level, or the combination thereof.

The association indication component 1120 may receive, from the base station, an indication that the power control parameter is associated with the configured grant. In some cases, the indication that the power control parameter is associated with the configured grant may be received via radio resource control signaling or the group-common downlink control information message.

The transmit power determination component 1125 may determine a transmit power for transmitting an uplink message associated with the configured grant based on the initial power configuration, the power control parameter, and the indication that the power control parameter is associated with the configured grant. In some examples, the transmit power determination component 1125 may receive an index for the configured grant and may determine the transmit power based on the index and the power control parameter. Additionally or alternatively, where the group-common DCI message includes a second power control parameter, the transmit power determination component 1125 may receive, from the base station, a second configured grant for uplink transmissions to the base station, receive, from the base station, a second indication that the second power control parameter is associated with the second configured grant, and determine a second transmit power for transmitting a second uplink message associated with the second configured grant based on the second power control parameter. In some cases, the index for the configured grant, a power adjustment value for determining the transmit power, or a combination thereof may be received via radio resource control signaling at a physical layer of the UE.

Additionally or alternatively, the transmit power determination component 1125 may determine a transmit power for transmitting an uplink message associated with the grant based on the at least one of the first power control parameter and the second power control parameter.

The uplink message transmission component 1130 may transmit, to the base station, the uplink message according to the determined transmit power. In some examples, the uplink message transmission component 1130 may drop the uplink message based on a priority level of data to be transmitted in the uplink message, an increased transmit power indicated by the power control parameter, or a combination thereof.

Additionally or alternatively, the uplink message transmission component 1130 may transmit, to the base station, the uplink message according to the determined transmit power and based on the first power control parameter and the second power control parameter.

The power control parameter reception component 1140 may receive, from the base station, at least one of a first power control parameter and a second power control parameter for the uplink transmissions. In some cases, values for the second power control parameter may be configured via RRC signaling. In some examples, where the grant includes a dynamic grant and the uplink message includes a dynamic physical uplink channel message, the power control parameter reception component 1140 may receive at least one of the first power control parameter and the second power control parameter in the dynamic grant. Additionally or alternatively, where the grant includes a configured grant and the uplink message includes a configured physical uplink channel message, the power control parameter reception component 1140 may receive the first power control parameter and the second power control parameter in a group-common transmission power control message. In some examples, the power control parameter reception component 1140 may receive the second power control parameter based on a priority level associated with data to be transmitted in the uplink message. In some cases, the first power control parameter may include an accumulative power control value, and the second power control parameter may include a one-shot power adjustment value.

Additionally, the power control parameter reception component 1140 may receive, from the base station, a power control parameter value in a transmit power control field of a downlink control information message and may determine whether the first power control parameter or the second power control parameter is received based on the power control parameter value. In some cases, the power control parameter reception component 1140 may receive, from the base station, a downlink control indication field indicating whether the first power control parameter or the second power control parameter is received.

The transmit power adjuster 1135 may determine a baseline transmit power based on the initial power configuration for the configured grant, determine a power adjustment value based on the power control parameter received in the group-common downlink control information message, and apply the power adjustment value to the baseline transmit power to obtain the transmit power for transmitting the uplink message. In some examples, the transmit power adjuster 1135 may determine the power adjustment value is further based on a modulation and coding scheme of the uplink message. Additionally or alternatively, the transmit power adjuster 1135 may apply a power adjustment to the transmit power based on a priority of data to be transmitted in the uplink message and the power control parameter in the configured grant. For example, the transmit power adjuster 1135 may adjust the transmit power for a first priority level of the data and may refrain from adjusting the transmit power for a second priority level of the data.

In some cases, the initial power configuration may include a set of one or more power adjustment values corresponding to the configured grant and determining the power adjustment value may include selecting the power adjustment value from the set of one or more power adjustment values. Additionally or alternatively, the initial power configuration may include the baseline transmit power and a set of one or more additional transmit power levels and determining the power adjustment value may include determining a difference between the baseline transmit power and one of the additional transmit power levels. In some cases, the power adjustment value may include a power boosting value.

Additionally or alternatively, the transmit power adjuster 1135 may adjust the transmit power by a first value for a first priority level of the data, adjusting the transmit power by a second value for a second priority level of the data, or a combination thereof for multiple uplink messages in the configured grant, where the first priority level is higher than the second priority level. In some examples, the transmit power adjuster 1135 may receive, from the base station, the first value and the second value via radio resource control signaling with the configured grant.

In some cases, the transmit power adjuster 1135 may receive, from the base station, a dynamic uplink grant for a dynamic uplink transmission to the base station, the dynamic uplink grant including an additional power configuration for the dynamic uplink grant, determine an additional baseline transmit power based on the additional power configuration for the dynamic uplink grant, and determine to apply the power adjustment value to the baseline transmit power, the additional baseline transmit power, or both, based at least a power adjustment parameter. For example, the power adjustment parameter may include an indication of an open-loop power control or a closed-loop power control, and the power control parameter may be applied to the baseline transmit power but not to the additional baseline transmit power based on the open-loop power control or the closed-loop power control. Additionally or alternatively, the power adjustment parameter comprises an indication of a set of uplink resources, and the power control parameter may be applied to the additional baseline transmit power based on determining whether the set of uplink resources overlaps at least a portion of uplink resources used for the dynamic uplink transmission and not receiving a dynamic power adjustment value in the dynamic uplink grant. Alternatively, the power control parameter may not be applied to the additional baseline transmit power based on determining whether the set of uplink resources overlaps at least a portion of uplink resources used for the dynamic uplink transmission and receiving a dynamic power adjustment value in the dynamic uplink grant.

The power control parameter adjuster 1145 may adjust the transmit power for transmitting the uplink message and any subsequent uplink messages based on the first power control parameter. In some examples, the power control parameter adjuster 1145 may adjust the transmit power for transmitting the uplink message or multiple uplink messages for the grant in a time interval based on the second power control parameter. Additionally or alternatively, the power control parameter adjuster 1145 may adjust the transmit power for transmitting the uplink message and any subsequent uplink messages based on receiving the first power control parameter and may adjust the transmit power for transmitting the uplink message or multiple uplink messages for the grant in a time interval based on receiving the second power control parameter.

In some cases, the power control parameter adjuster 1145 may determine to apply the power adjustment value to the baseline transmit power based on a processing time for the UE to apply the power adjustment value to the baseline transmit power. For example, the processing time may include a minimum processing time for the UE to prepare a dynamic uplink transmission after receiving a dynamic uplink grant scheduling the dynamic uplink transmission. Additionally, the power adjustment value may be applied to the baseline transmit power for the entire uplink message or not applied to the baseline transmit power for any of the uplink message based at least in part on the processing time.

Figure 12:
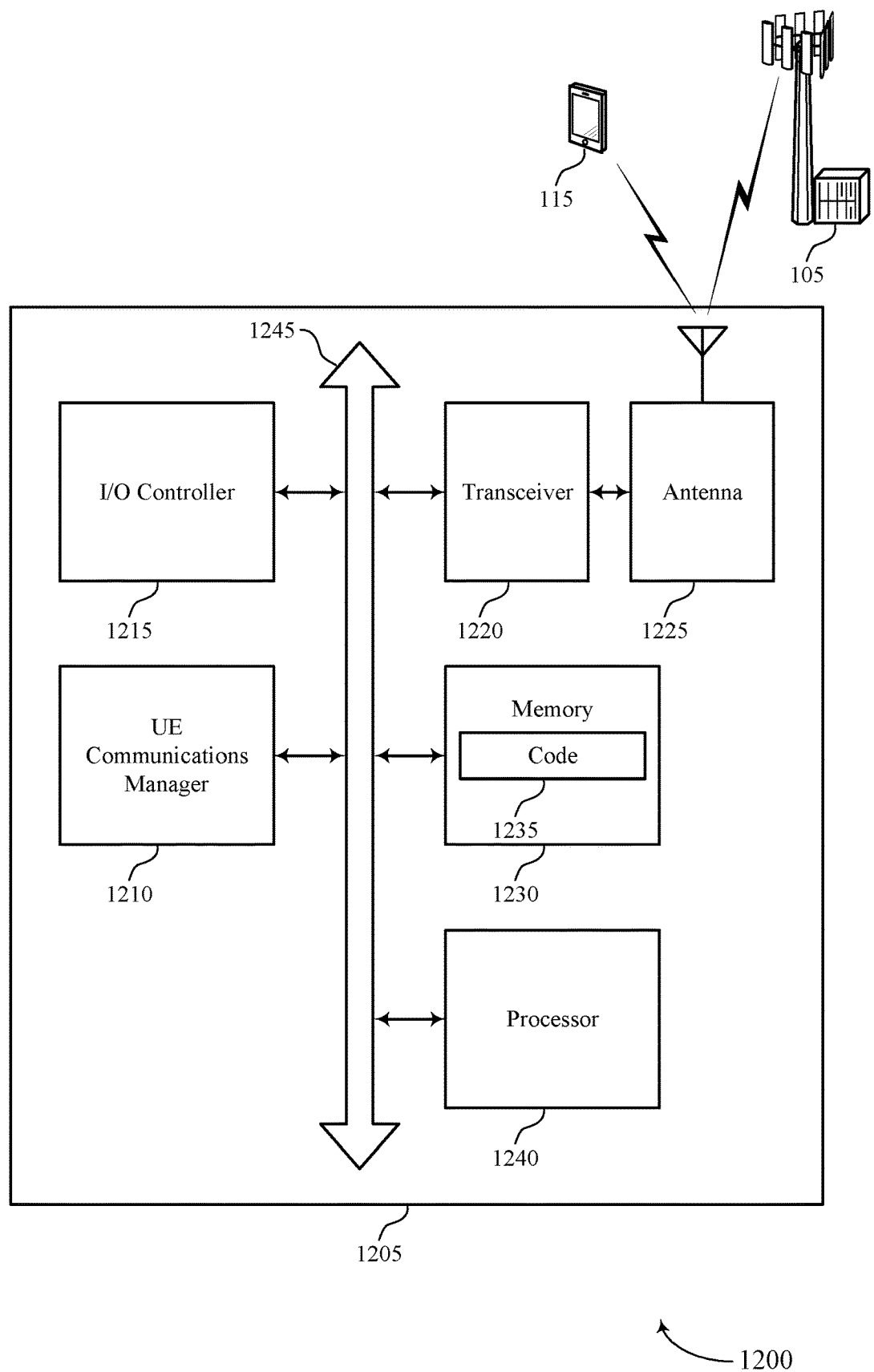
FIG. 12 shows a diagram of a system including a device that supports power control enhancement for inter-UE multiplexing in accordance with aspects of the present disclosure.

FIG. 12 shows a diagram of a system 1200 including a device 1205 that supports power control enhancement for inter-UE multiplexing in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may receive, from a base station, a configured grant for uplink transmissions to the base station, the configured grant including an initial power configuration for the configured grant. In some cases, the UE communications manager 1210 may receive, from the base station, a group-common downlink control information message, the group-common downlink control information message including a power control parameter. Additionally, the UE communications manager 1210 may receive, from the base station, an indication that the power control parameter is associated with the configured grant. Accordingly, the UE communications manager 1210 may determine a transmit power for transmitting an uplink message associated with the configured grant based on the initial power configuration, the power control parameter, and the indication that the power control parameter is associated with the configured grant. Subsequently, the UE communications manager 1210 may transmit, to the base station, the uplink message according to the determined transmit power.

Additionally or alternatively, the UE communications manager 1210 may receive, from a base station, a grant for one or more uplink transmissions to the base station. In some cases, the UE communications manager 1210 may receive, from the base station, at least one of a first power control parameter and a second power control parameter. Accordingly, the UE communications manager 1210 may determine a transmit power for transmitting an uplink message associated with the grant based on the at least one of the first power control parameter and the second power control parameter. Subsequently, the UE communications manager 1210 may transmit, to the base station, the uplink message according to the determined transmit power and based on the first power control parameter and the second power control parameter.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power control enhancement for inter-UE multiplexing).

Based on adjusting a transmit power for an uplink message signaled by the configured grant, a processor 1240 of a UE 115 may efficiently adjust power and schedule simultaneous transmissions for different service types and transmission schemes. As such, the processor 1240 may reduce processing power due to not having to retransmit uplink transmissions due to an incorrect transmit power.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
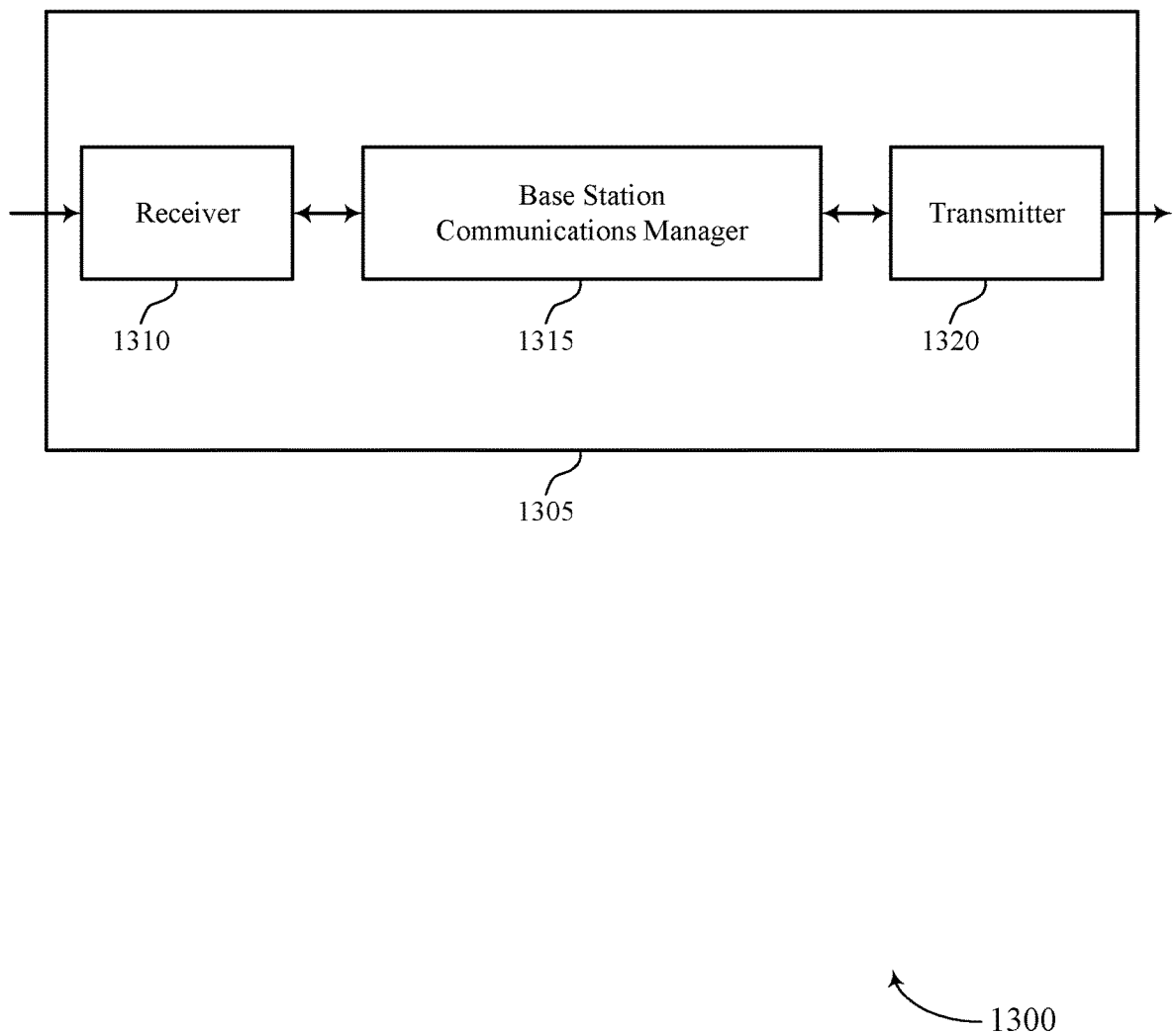
FIGS. 13 and 14 show block diagrams of devices that support power control enhancement for inter-UE multiplexing in accordance with aspects of the present disclosure.

FIG. 13 shows a block diagram 1300 of a device 1305 that supports power control enhancement for inter-UE multiplexing in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to power control enhancement for inter-UE multiplexing, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may transmit, to a UE, a configured grant for uplink transmissions to the base station, the configured grant including an initial power configuration for the configured grant. In some cases, the base station communications manager 1315 may determine a transmit power for the UE to transmit an uplink message associated with the configured grant. Additionally, the base station communications manager 1315 may transmit, to the UE, a group-common downlink control information message, the group-common downlink control information message including a power control parameter for the determined transmit power. In some cases, the base station communications manager 1315 may transmit, to the UE, an indication that the power control parameter is associated with the configured grant. Subsequently, the base station communications manager 1315 may receive, from the UE, the uplink message according to the determined transmit power.

Additionally or alternatively, the base station communications manager 1315 may transmit, to a UE, a grant for uplink transmissions to the base station. In some cases, the base station communications manager 1315 may determine a transmit power for the UE to transmit an uplink message associated with the grant. Additionally, the base station communications manager 1315 may transmit, to the UE, at least one of a first power control parameter and a second power control parameter for the uplink transmissions. Subsequently, the base station communications manager 1315 may receive, from the UE, the uplink message according to the determined transmit power and based on the at least one of the first power control parameter and the second power control parameter. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The actions performed by the base station communications manager 1315 as described herein may be implemented to realize one or more potential advantages. One implementation may provide improved quality and reliability of service at the base station 105, as the described techniques may enable the base station 105 to adjust a transmit power to signal a large number of UEs 105. Additionally or alternatively, the base station 105 may more efficiently adjust transmit power given multiple signaling options as described herein.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
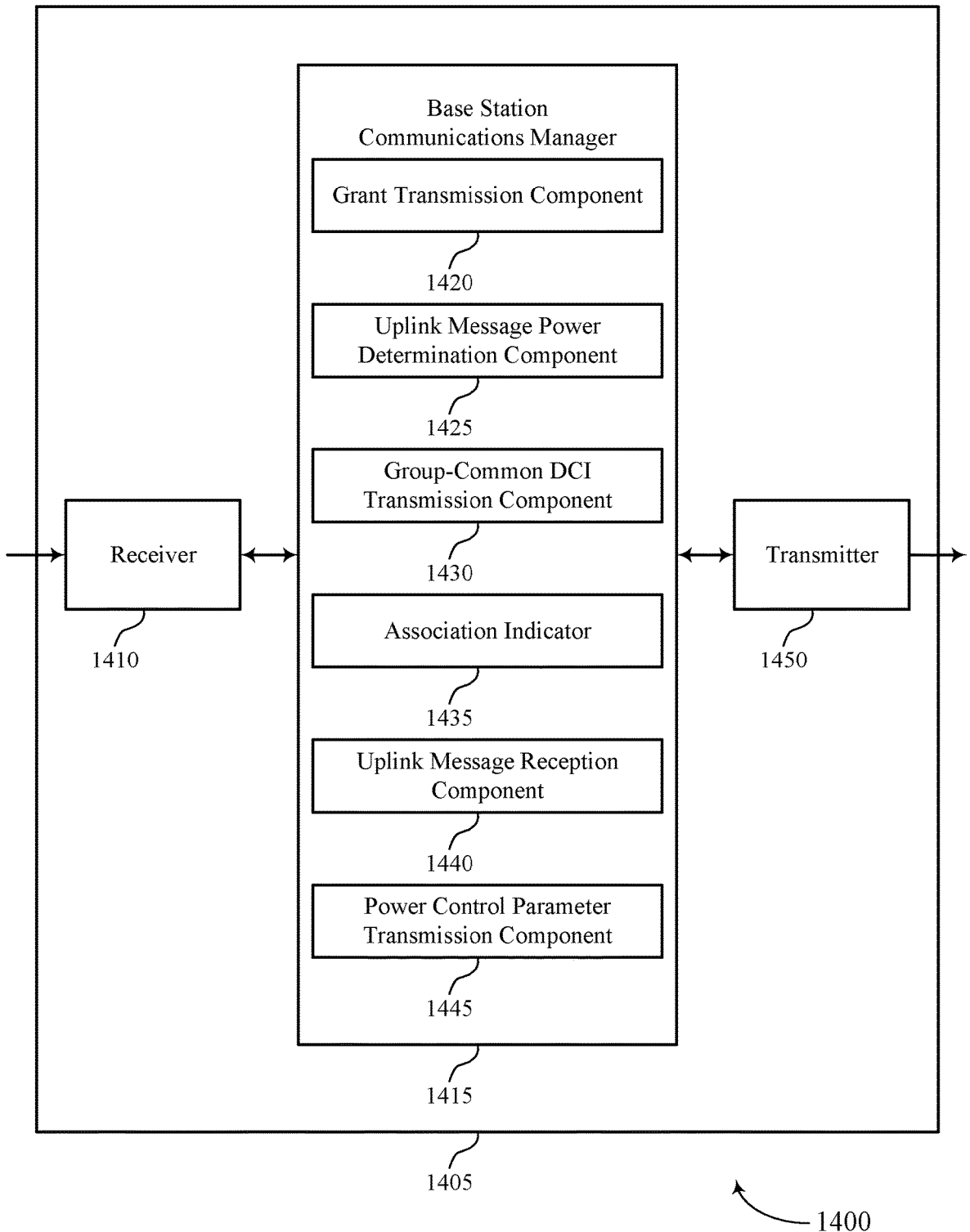

FIG. 14 shows a block diagram 1400 of a device 1405 that supports power control enhancement for inter-UE multiplexing in accordance with aspects of the present disclosure. The device 1405 may be an example of aspects of a device 1305, or a base station 105 as described herein. The device 1405 may include a receiver 1410, a base station communications manager 1415, and a transmitter 1450. The device 1405 may also include a processor. Each of these components may be in communication with one another (e.g., via one or more buses).

The receiver 1410 may receive information such as packets, user data, or control information associated with various information channels (e.g., control channels, data channels, and information related to power control enhancement for inter-UE multiplexing, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a grant transmission component 1420, an uplink message power determination component 1425, a group-common DCI transmission component 1430, an association indicator 1435, an uplink message reception component 1440, and a power control parameter transmission component 1445. The base station communications manager 1415 may be an example of aspects of the base station communications manager 1610 described herein.

The grant transmission component 1420 may transmit, to a UE, a configured grant for uplink transmissions to the base station, the configured grant including an initial power configuration for the configured grant. Additionally or alternatively, the grant transmission component 1420 may transmit, to a UE, a grant for uplink transmissions to the base station.

The uplink message power determination component 1425 may determine a transmit power for the UE to transmit an uplink message associated with the configured grant. Additionally or alternatively, the uplink message power determination component 1425 may determine a transmit power for the UE to transmit an uplink message associated with the grant.

The group-common DCI transmission component 1430 may transmit, to the UE, a group-common downlink control information message, the group-common downlink control information message including a power control parameter for the determined transmit power.

The association indicator 1435 may transmit, to the UE, an indication that the power control parameter is associated with the configured grant.

The power control parameter transmission component 1445 may transmit, to the UE, at least one of a first power control parameter and a second power control parameter for the uplink transmissions.

The uplink message reception component 1440 may receive, from the UE, the uplink message according to the determined transmit power. Additionally or alternatively, the uplink message reception component 1440 may receive, from the UE, the uplink message according to the determined transmit power and based on the at least one of the first power control parameter and the second power control parameter.

The transmitter 1450 may transmit signals generated by other components of the device 1405. In some examples, the transmitter 1450 may be collocated with a receiver 1410 in a transceiver module. For example, the transmitter 1450 may be an example of aspects of the transceiver 1620 described with reference to FIG. 16. The transmitter 1450 may utilize a single antenna or a set of antennas.

Figure 15:
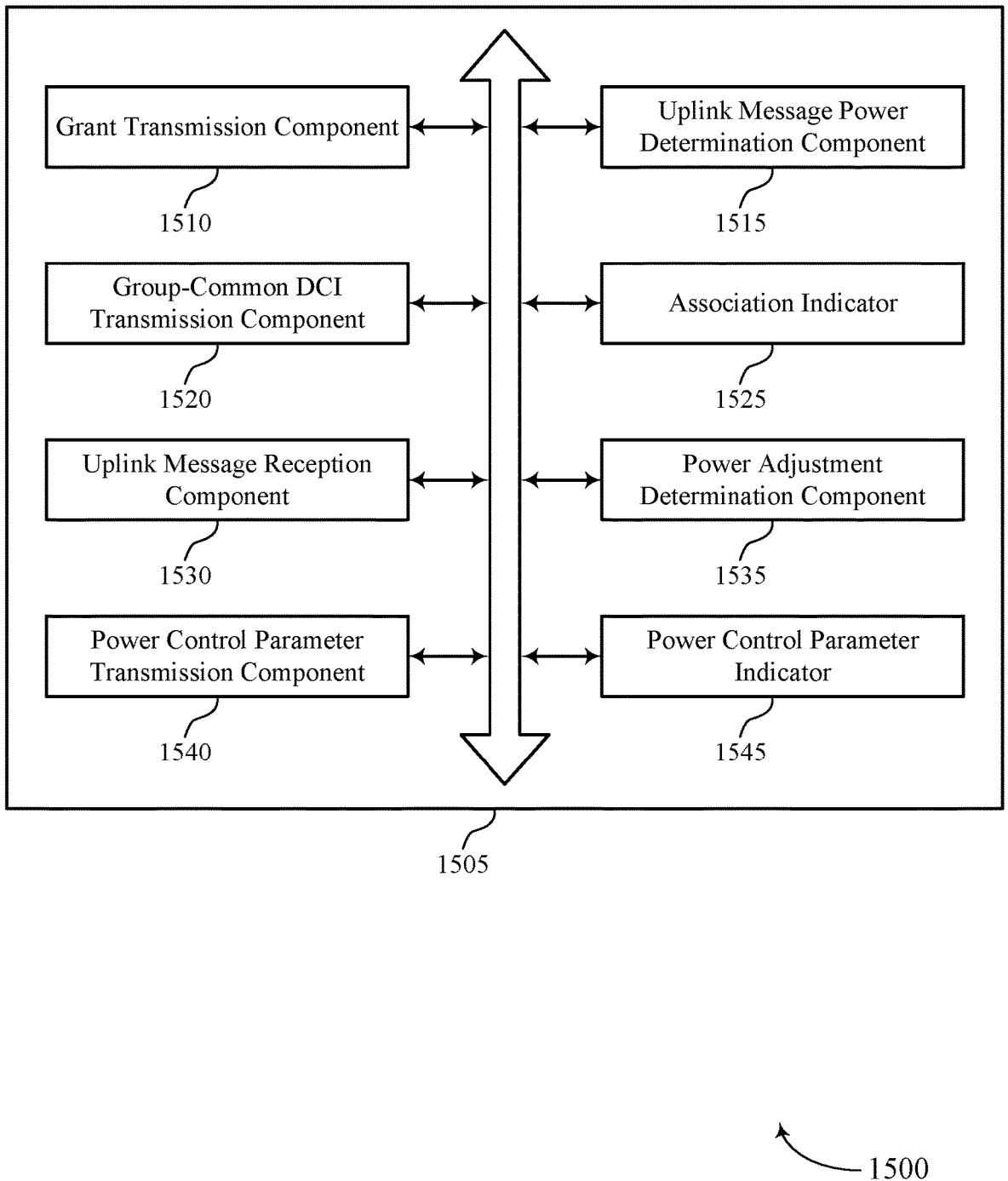
FIG. 15 shows a block diagram of a base station communications manager that supports power control enhancement for inter-UE multiplexing in accordance with aspects of the present disclosure.

FIG. 15 shows a block diagram 1500 of a base station communications manager 1505 that supports power control enhancement for inter-UE multiplexing in accordance with aspects of the present disclosure. The base station communications manager 1505 may be an example of aspects of a base station communications manager 1315, a base station communications manager 1415, or a base station communications manager 1610 described herein. The base station communications manager 1505 may include a grant transmission component 1510, an uplink message power determination component 1515, a group-common DCI transmission component 1520, an association indicator 1525, an uplink message reception component 1530, a power adjustment determination component 1535, a power control parameter transmission component 1540, and a power control parameter indicator 1545. Each of these modules may communicate, directly or indirectly, with one another (e.g., via one or more buses).

The grant transmission component 1510 may transmit, to a UE, a configured grant for uplink transmissions to the base station, the configured grant including an initial power configuration for the configured grant. Additionally or alternatively, the grant transmission component 1510 may transmit, to a UE, a grant for uplink transmissions to the base station.

The uplink message power determination component 1515 may determine a transmit power for the UE to transmit an uplink message associated with the configured grant. In some examples, the uplink message power determination component 1515 may transmit an index for the configured grant, where the transmit power is indicated to the UE based on the index and the power control parameter. In some examples, the uplink message power determination component 1515 may transmit, to the UE, a second configured grant for uplink transmissions to the base station, determine a second transmit power for the UE to transmit a second uplink message associated with the second configured grant, where the group-common downlink control information message including a second power control parameter for the determined second transmit power, and transmit, to the UE, a second indication that the second power control parameter is associated with the second configured grant. Additionally or alternatively, the uplink message power determination component 1515 may transmit, to the UE, a first value for adjusting the transmit power and a second value for adjusting the transmit power via radio resource control signaling with the configured grant. In some cases, the index for the configured grant, a power adjustment value for determining the transmit power, or a combination thereof may be transmitted via radio resource control signaling.

Additionally or alternatively, the uplink message power determination component 1515 may determine a transmit power for the UE to transmit an uplink message associated with the grant.

The group-common DCI transmission component 1520 may transmit, to the UE, a group-common downlink control information message, the group-common downlink control information message including a power control parameter for the determined transmit power. In some examples, the group-common DCI transmission component 1520 may transmit multiple group-common downlink messages including different power control parameters and may transmit multiple radio network temporary identifiers corresponding to the multiple group-common downlink messages, where the power control parameter is associated with the configured grant based on a group-common radio network temporary identifier corresponding to the group-common downlink control information message including the power control parameter associated with the configured grant different, the group-common radio network temporary identifier is one of the multiple radio network temporary identifiers. In some cases, the multiple group-common radio network temporary identifiers may be associated with different priority levels of the configured grant, one group-common downlink control information message may correspond to one or multiple configured grants, the configured grant may be associated with a single group-common downlink control information message, or a combination thereof. In some cases, the power control parameter may indicate for the UE to use a maximum transmit power for transmitting the uplink message. Additionally, the group-common DCI message may include an uplink configured grant index, an uplink configured grant group index, a priority level, or a combination thereof for the power control parameter, and the transmit power for transmitting the uplink message is determined based at least in part on the uplink configured grant index, the uplink configured grant group index, the priority level, or the combination thereof.

The association indicator 1525 may transmit, to the UE, an indication that the power control parameter is associated with the configured grant. In some cases, the indication that the power control parameter is associated with the configured grant may be transmitted via radio resource control signaling or the group-common downlink control information message.

The uplink message reception component 1530 may receive, from the UE, the uplink message according to the determined transmit power. In some examples, the uplink message reception component 1530 may receive, from the UE, the uplink message at a higher transmit power than the initial power configuration based on a priority of data in the uplink message.

Additionally or alternatively, the uplink message reception component 1530 may receive, from the UE, the uplink message according to the determined transmit power and based on the at least one of the first power control parameter and the second power control parameter.

The power control parameter transmission component 1540 may transmit, to the UE, at least one of a first power control parameter and a second power control parameter for the uplink transmissions. In some cases, the first power control parameter may include an accumulative power control value, and the second power control parameter may include a one-shot power adjustment value. Additionally, values for the second power control parameter may be signaled to the UE via RRC signaling. In some examples, where the grant includes a dynamic grant and the uplink message includes a dynamic physical uplink channel message, the power control parameter transmission component 1540 may transmit the first power control parameter and the second power control parameter in the dynamic grant. Additionally or alternatively, where the grant includes a configured grant and the uplink message includes a configured physical uplink channel message, the power control parameter transmission component 1540 may transmit the first power control parameter and the second power control parameter in a group-common transmission power control message. In some examples, the power control parameter transmission component 1540 may transmit the second power control parameter based on a priority level associated with data to be transmitted in the uplink message.

The power adjustment determination component 1535 may determine a baseline transmit power based on the initial power configuration for the configured grant. In some examples, the power adjustment determination component 1535 may determine a power adjustment value for the UE to apply to the baseline transmit power based on a priority of data to be transmitted in the uplink message and may transmit, to the UE, the power adjustment value in the power control parameter of the group-common downlink control information message. Additionally or alternatively, the power adjustment determination component 1535 may determine the power adjustment value is further based on a modulation and coding scheme of the uplink message. In some cases, the power adjustment value may include a power boosting value.

In some cases, the initial power configuration may include a set of one or more power adjustment values corresponding to the configured grant and determining the power adjustment value may include selecting the power adjustment value from the set of one or more power adjustment values. Additionally or alternatively, the initial power configuration for the configured grant may include a baseline transmit power and a set of one or more additional transmit power levels and the uplink message may be received at the transmit power based on a difference between the baseline transmit power and one of the additional transmit power levels.

Additionally or alternatively, the power adjustment determination component 1535 may transmit, to the UE, a dynamic uplink grant for a dynamic uplink transmission to the base station, the dynamic uplink grant including an additional power configuration for the dynamic uplink grant, may determine an additional baseline transmit power based on the additional power configuration for the dynamic uplink grant, and may determine an additional transmit power for the dynamic uplink transmission based on the additional baseline transmit power and the power adjustment value. For example, the transmit power and the additional transmit power may be determined based on an open-loop power control, a closed-loop power control, at least a portion of the uplink message associated with the configured grant and the dynamic uplink transmission overlapping, whether a dynamic power adjustment value is transmitted in the dynamic uplink grant, or a combination thereof. In some cases, the power adjustment determination component 1535 may transmit, to the UE, a dynamic power adjustment value for the dynamic uplink transmission in the dynamic uplink grant.

The power control parameter indicator 1545 may transmit an indication for the UE to adjust the transmit power for transmitting the uplink message and any subsequent uplink messages based on the first power control parameter. In some examples, the power control parameter indicator 1545 may transmit an indication for the UE to adjust the transmit power for transmitting the uplink message or multiple uplink messages for the grant in a time interval based on the second power control parameter. Additionally or alternatively, the power control parameter indicator 1545 may transmit an indication for the UE to adjust the transmit power for transmitting the uplink message and any subsequent uplink messages based on the first power control parameter and may transmit an indication for the UE to adjust the transmit power for transmitting the uplink message or multiple uplink messages for the grant in a time interval based on the second power control parameter. In some cases, the power control parameter indicator 1545 may transmit, to the UE, a power control parameter value in a transmit power control field of a DCI message, where the first power control parameter or the second power control parameter is indicated based on the power control parameter value. Additionally or alternatively, the power control parameter indicator 1545 may transmitting, to the UE, a DCI field indicating whether the first power control parameter or the second power control parameter is transmitted.

Figure 16:
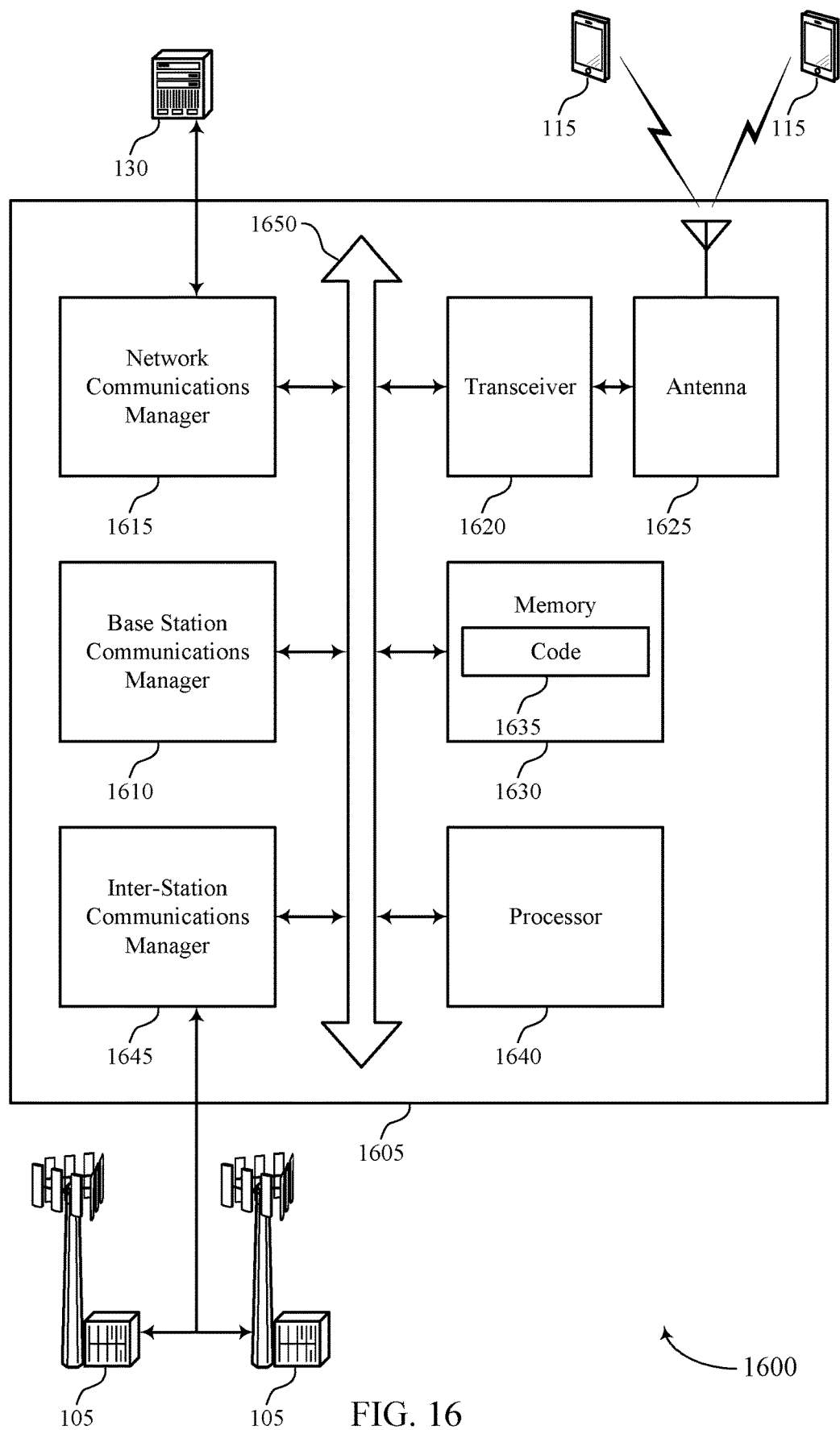
FIG. 16 shows a diagram of a system including a device that supports power control enhancement for inter-UE multiplexing in accordance with aspects of the present disclosure.

FIG. 16 shows a diagram of a system 1600 including a device 1605 that supports power control enhancement for inter-UE multiplexing in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may transmit, to a UE, a configured grant for uplink transmissions to the base station, the configured grant including an initial power configuration for the configured grant. Additionally, the base station communications manager 1610 may determine a transmit power for the UE to transmit an uplink message associated with the configured grant. In some cases, the base station communications manager 1610 may transmit, to the UE, a group-common downlink control information message, the group-common downlink control information message including a power control parameter for the determined transmit power. Additionally, the base station communications manager 1610 may transmit, to the UE, an indication that the power control parameter is associated with the configured grant. Subsequently, the base station communications manager 1610 may receive, from the UE, the uplink message according to the determined transmit power.

Additionally or alternatively, the base station communications manager 1610 may transmit, to a UE, a grant for uplink transmissions to the base station. In some cases, the base station communications manager 1610 may determine a transmit power for the UE to transmit an uplink message associated with the grant. Additionally, the base station communications manager 1610 may transmit, to the UE, a first power control parameter including a baseline transmit power for the uplink message and a second power control parameter including a power adjustment value for the uplink message. Subsequently, the base station communications manager 1610 may receive, from the UE, the uplink message according to the determined transmit power and based on the first power control parameter and the second power control parameter.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting power control enhancement for inter-UE multiplexing).

Based on enhanced power control for determining transmit powers for an uplink message to mitigate interferences, a processor 1640 of a base station 105 may efficiently adjust power and schedule simultaneous transmissions for different service types and transmission schemes. As such, the processor 1640 may reduce processing power due to not having to retransmit downlink transmissions due to an incorrect transmit power.

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
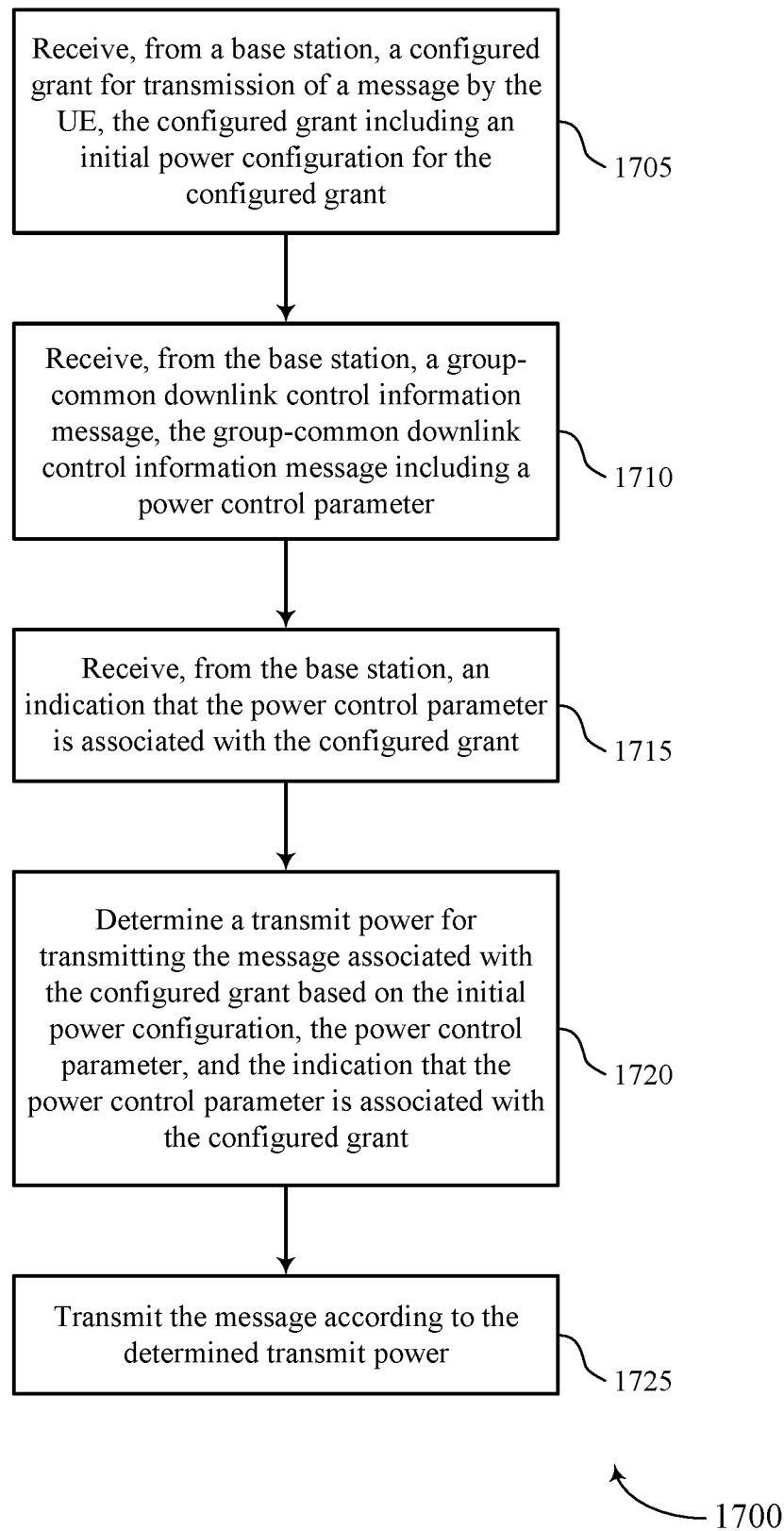
FIGS. 17 through 23 show flowcharts illustrating methods that support power control enhancement for inter-UE multiplexing in accordance with aspects of the present disclosure.

FIG. 17 shows a flowchart illustrating a method 1700 that supports power control enhancement for inter-UE multiplexing in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configured grant for transmission of a message by the UE, the configured grant including an initial power configuration for the configured grant. The operations of 1705 may be performed according to the methods described herein. In some examples, aspects of the operations of 1705 may be performed by a grant reception component as described with reference to FIGS. 9 through 12.

At 1710, the UE may receive, from the base station, a group-common downlink control information message, the group-common downlink control information message including a power control parameter. The operations of 1710 may be performed according to the methods described herein. In some examples, aspects of the operations of 1710 may be performed by a group-common DCI reception component as described with reference to FIGS. 9 through 12.

At 1715, the UE may receive, from the base station, an indication that the power control parameter is associated with the configured grant. The operations of 1715 may be performed according to the methods described herein. In some examples, aspects of the operations of 1715 may be performed by an association indication component as described with reference to FIGS. 9 through 12.

At 1720, the UE may determine a transmit power for transmitting the message associated with the configured grant based on the initial power configuration, the power control parameter, and the indication that the power control parameter is associated with the configured grant. The operations of 1720 may be performed according to the methods described herein. In some examples, aspects of the operations of 1720 may be performed by a transmit power determination component as described with reference to FIGS. 9 through 12.

At 1725, the UE may transmit the message according to the determined transmit power. The operations of 1725 may be performed according to the methods described herein. In some examples, aspects of the operations of 1725 may be performed by an uplink message transmission component as described with reference to FIGS. 9 through 12.

Figure 18:
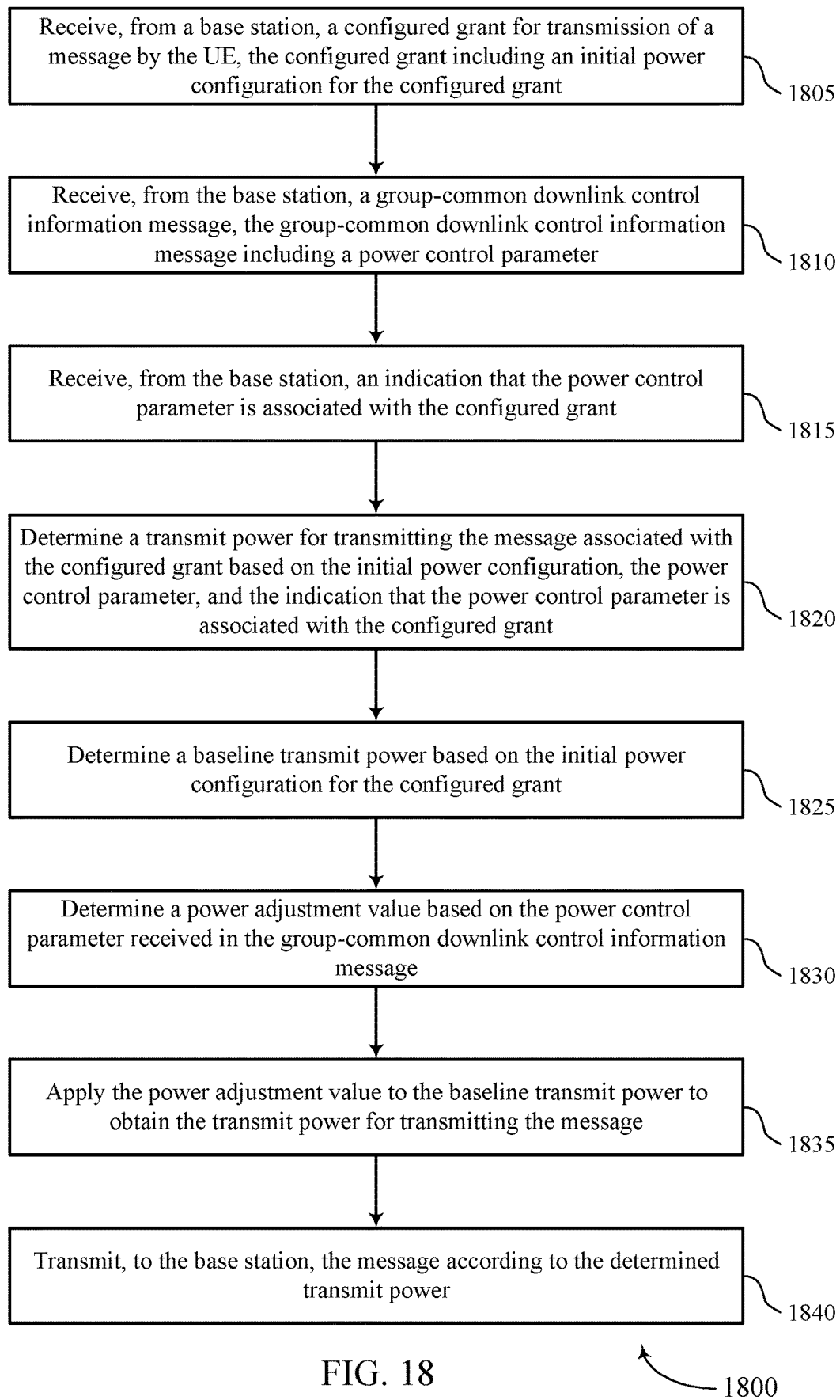

FIG. 18 shows a flowchart illustrating a method 1800 that supports power control enhancement for inter-UE multiplexing in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configured grant for transmission of a message by the UE, the configured grant including an initial power configuration for the configured grant. The operations of 1805 may be performed according to the methods described herein. In some examples, aspects of the operations of 1805 may be performed by a grant reception component as described with reference to FIGS. 9 through 12.

At 1810, the UE may receive, from the base station, a group-common downlink control information message, the group-common downlink control information message including a power control parameter. The operations of 1810 may be performed according to the methods described herein. In some examples, aspects of the operations of 1810 may be performed by a group-common DCI reception component as described with reference to FIGS. 9 through 12.

At 1815, the UE may receive, from the base station, an indication that the power control parameter is associated with the configured grant. The operations of 1815 may be performed according to the methods described herein. In some examples, aspects of the operations of 1815 may be performed by an association indication component as described with reference to FIGS. 9 through 12.

At 1820, the UE may determine a transmit power for transmitting the message associated with the configured grant based on the initial power configuration, the power control parameter, and the indication that the power control parameter is associated with the configured grant. The operations of 1820 may be performed according to the methods described herein. In some examples, aspects of the operations of 1820 may be performed by a transmit power determination component as described with reference to FIGS. 9 through 12.

At 1825, the UE may determine a baseline transmit power based on the initial power configuration for the configured grant. The operations of 1825 may be performed according to the methods described herein. In some examples, aspects of the operations of 1825 may be performed by a transmit power adjuster as described with reference to FIGS. 9 through 12.

At 1830, the UE may determine a power adjustment value based on the power control parameter received in the group-common downlink control information message. The operations of 1830 may be performed according to the methods described herein. In some examples, aspects of the operations of 1830 may be performed by a transmit power adjuster as described with reference to FIGS. 9 through 12.

At 1835, the UE may apply the power adjustment value to the baseline transmit power to obtain the transmit power for transmitting the message. The operations of 1835 may be performed according to the methods described herein. In some examples, aspects of the operations of 1835 may be performed by a transmit power adjuster as described with reference to FIGS. 9 through 12.

At 1840, the UE may transmit the message according to the determined transmit power. The operations of 1840 may be performed according to the methods described herein. In some examples, aspects of the operations of 1840 may be performed by an uplink message transmission component as described with reference to FIGS. 9 through 12.

Figure 19:
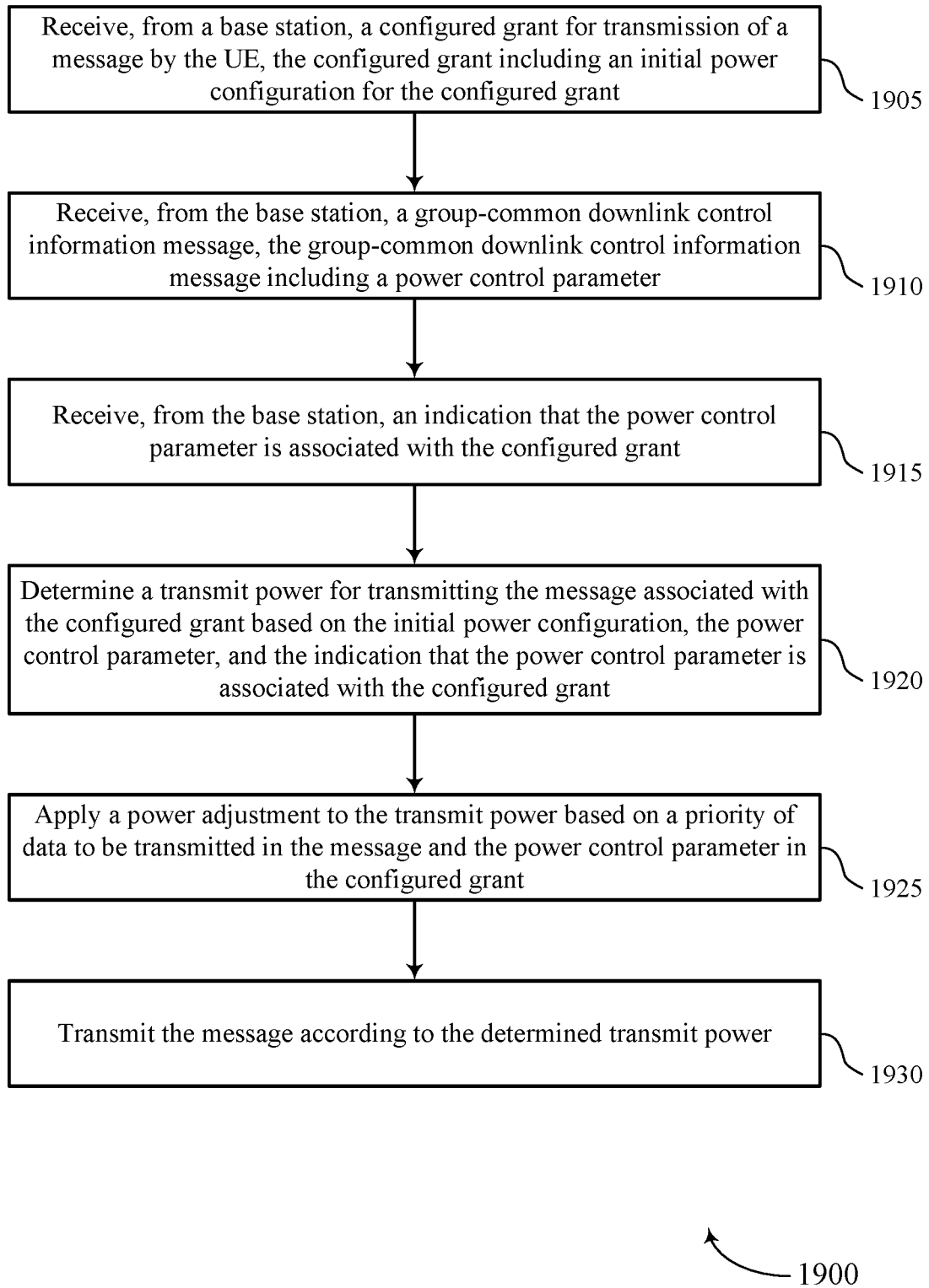

FIG. 19 shows a flowchart illustrating a method 1900 that supports power control enhancement for inter-UE multiplexing in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configured grant for transmission of a message by the UE, the configured grant including an initial power configuration for the configured grant. The operations of 1905 may be performed according to the methods described herein. In some examples, aspects of the operations of 1905 may be performed by a grant reception component as described with reference to FIGS. 9 through 12.

At 1910, the UE may receive, from the base station, a group-common downlink control information message, the group-common downlink control information message including a power control parameter. The operations of 1910 may be performed according to the methods described herein. In some examples, aspects of the operations of 1910 may be performed by a group-common DCI reception component as described with reference to FIGS. 9 through 12.

At 1915, the UE may receive, from the base station, an indication that the power control parameter is associated with the configured grant. The operations of 1915 may be performed according to the methods described herein. In some examples, aspects of the operations of 1915 may be performed by an association indication component as described with reference to FIGS. 9 through 12.

At 1920, the UE may determine a transmit power for transmitting the message associated with the configured grant based on the initial power configuration, the power control parameter, and the indication that the power control parameter is associated with the configured grant. The operations of 1920 may be performed according to the methods described herein. In some examples, aspects of the operations of 1920 may be performed by a transmit power determination component as described with reference to FIGS. 9 through 12.

At 1925, the UE may apply a power adjustment to the transmit power based on a priority of data to be transmitted in the message and the power control parameter in the configured grant. The operations of 1925 may be performed according to the methods described herein. In some examples, aspects of the operations of 1925 may be performed by a transmit power adjuster as described with reference to FIGS. 9 through 12.

At 1930, the UE may transmit the message according to the determined transmit power. The operations of 1930 may be performed according to the methods described herein. In some examples, aspects of the operations of 1930 may be performed by an uplink message transmission component as described with reference to FIGS. 9 through 12.

Figure 20:
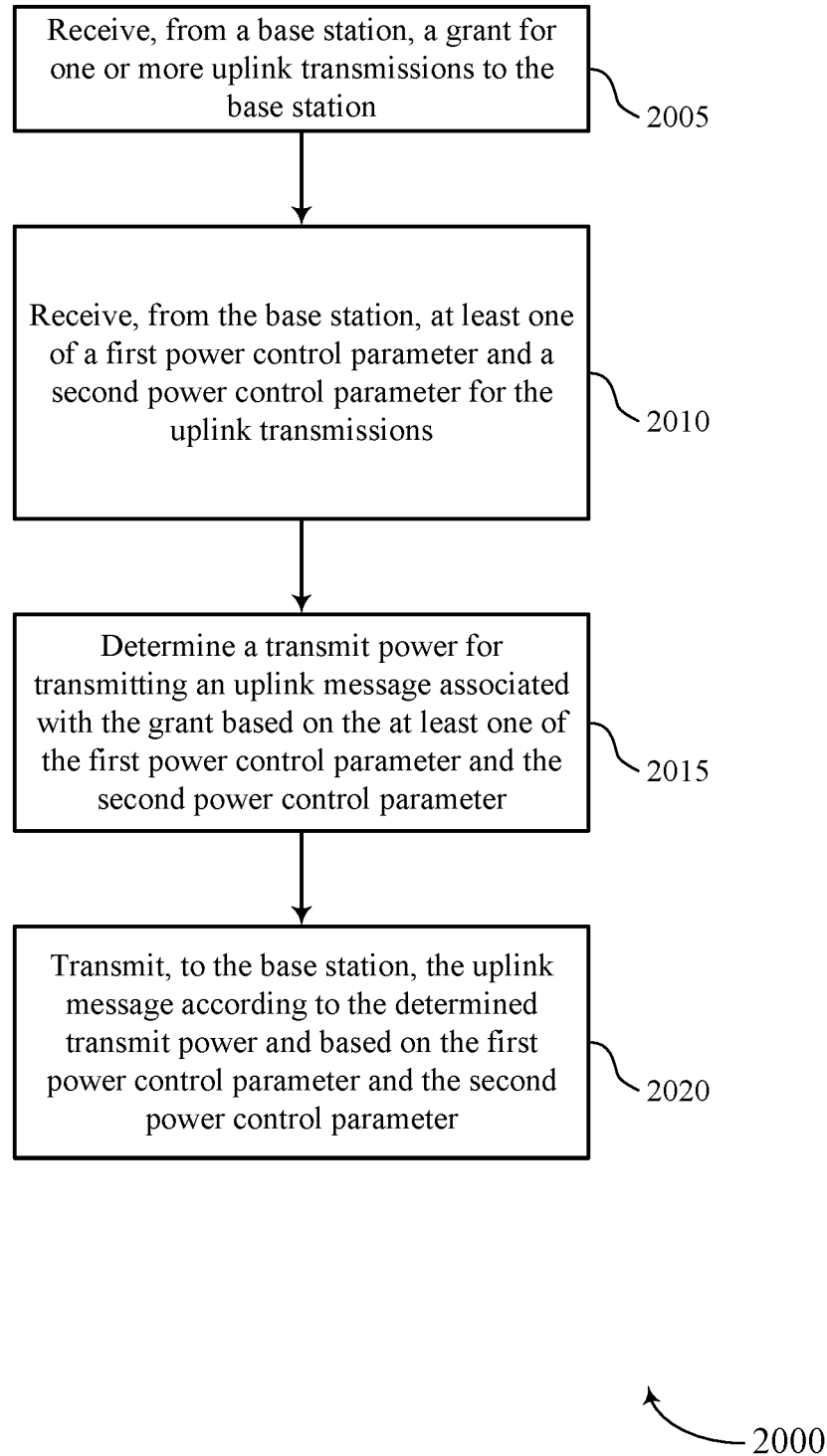

FIG. 20 shows a flowchart illustrating a method 2000 that supports power control enhancement for inter-UE multiplexing in accordance with aspects of the present disclosure. The operations of method 2000 may be implemented by a UE 115 or its components as described herein. For example, the operations of method 2000 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, a grant for one or more uplink transmissions to the base station. The operations of 2005 may be performed according to the methods described herein. In some examples, aspects of the operations of 2005 may be performed by a grant reception component as described with reference to FIGS. 9 through 12.

At 2010, the UE may receive, from the base station, at least one of a first power control parameter and a second power control parameter for the uplink transmissions. The operations of 2010 may be performed according to the methods described herein. In some examples, aspects of the operations of 2010 may be performed by a power control parameter reception component as described with reference to FIGS. 9 through 12.

At 2015, the UE may determine a transmit power for transmitting an uplink message associated with the grant based on the at least one of the first power control parameter and the second power control parameter. The operations of 2015 may be performed according to the methods described herein. In some examples, aspects of the operations of 2015 may be performed by a transmit power determination component as described with reference to FIGS. 9 through 12.

At 2020, the UE may transmit, to the base station, the uplink message according to the determined transmit power and based on the first power control parameter and the second power control parameter. The operations of 2020 may be performed according to the methods described herein. In some examples, aspects of the operations of 2020 may be performed by an uplink message transmission component as described with reference to FIGS. 9 through 12.

Figure 21:
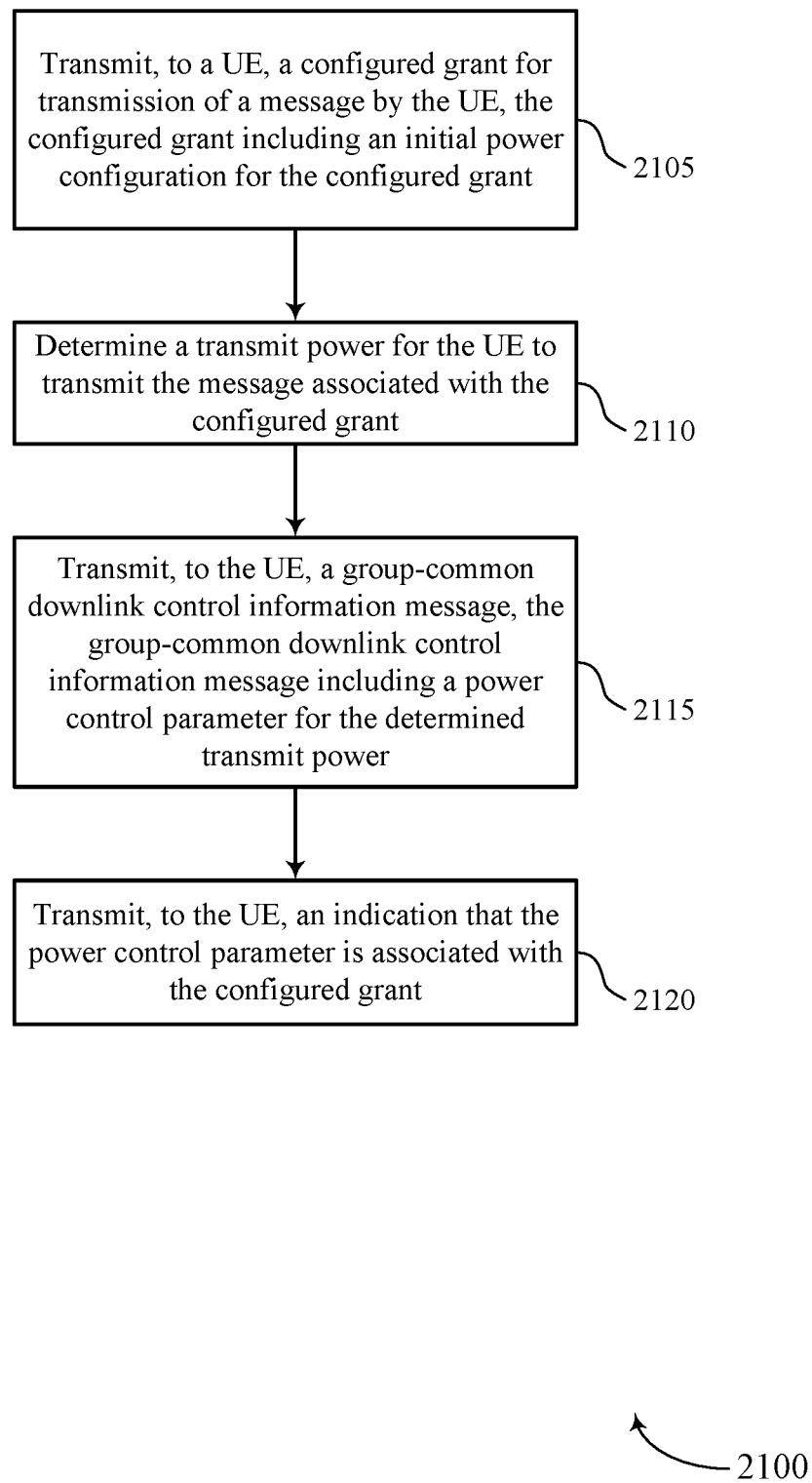

FIG. 21 shows a flowchart illustrating a method 2100 that supports power control enhancement for inter-UE multiplexing in accordance with aspects of the present disclosure. The operations of method 2100 may be implemented by a base station 105 or its components as described herein. For example, the operations of method 2100 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a configured grant for transmission of a message by the UE, the configured grant including an initial power configuration for the configured grant. The operations of 2105 may be performed according to the methods described herein. In some examples, aspects of the operations of 2105 may be performed by a grant transmission component as described with reference to FIGS. 13 through 16.

At 2110, the base station may determine a transmit power for the UE to transmit the message associated with the configured grant. The operations of 2110 may be performed according to the methods described herein. In some examples, aspects of the operations of 2110 may be performed by an uplink message power determination component as described with reference to FIGS. 13 through 16.

At 2115, the base station may transmit, to the UE, a group-common downlink control information message, the group-common downlink control information message including a power control parameter for the determined transmit power. The operations of 2115 may be performed according to the methods described herein. In some examples, aspects of the operations of 2115 may be performed by a group-common DCI transmission component as described with reference to FIGS. 13 through 16.

At 2120, the base station may transmit, to the UE, an indication that the power control parameter is associated with the configured grant. The operations of 2120 may be performed according to the methods described herein. In some examples, aspects of the operations of 2120 may be performed by an association indicator as described with reference to FIGS. 13 through 16.

Figure 22:
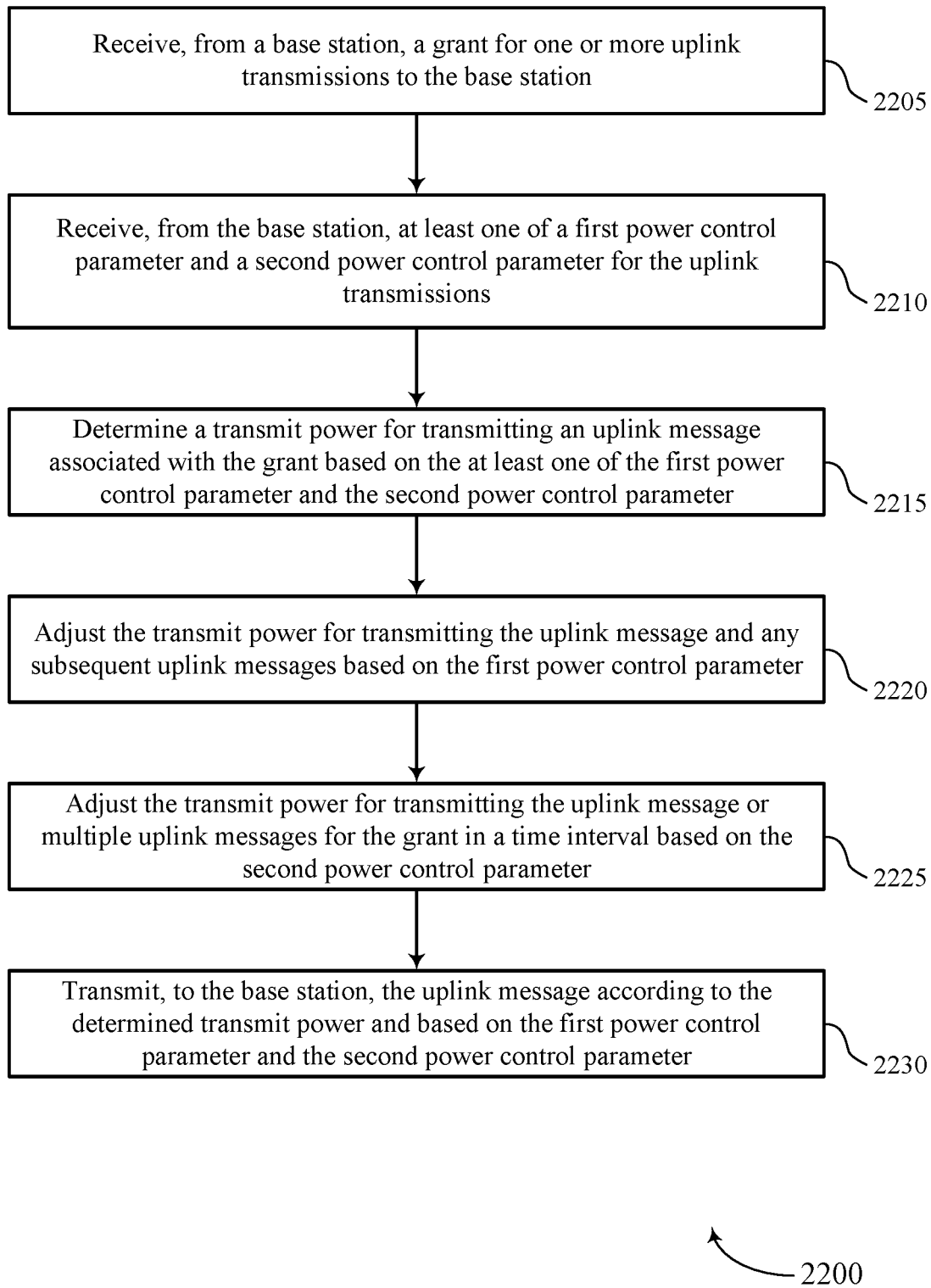

FIG. 22 shows a flowchart illustrating a method 2200 that supports power control enhancement for inter-UE multiplexing in accordance with aspects of the present disclosure. The operations of method 2200 may be implemented by a UE 115 or its components as described herein. For example, the operations of method 2200 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, a grant for one or more uplink transmissions to the base station. The operations of 2205 may be performed according to the methods described herein. In some examples, aspects of the operations of 2205 may be performed by a grant reception component as described with reference to FIGS. 9 through 12.

At 2210, the UE may receive, from the base station, at least one of a first power control parameter and a second power control parameter for the uplink transmissions. The operations of 2210 may be performed according to the methods described herein. In some examples, aspects of the operations of 2210 may be performed by a power control parameter reception component as described with reference to FIGS. 9 through 12.

At 2215, the UE may determine a transmit power for transmitting an uplink message associated with the grant based on the at least one of the first power control parameter and the second power control parameter. The operations of 2215 may be performed according to the methods described herein. In some examples, aspects of the operations of 2215 may be performed by a transmit power determination component as described with reference to FIGS. 9 through 12.

At 2220, the UE may adjust the transmit power for transmitting the uplink message and any subsequent uplink messages based on the first power control parameter. The operations of 2220 may be performed according to the methods described herein. In some examples, aspects of the operations of 2220 may be performed by a power control parameter adjuster as described with reference to FIGS. 9 through 12.

At 2225, the UE may adjust the transmit power for transmitting the uplink message or multiple uplink messages for the grant in a time interval based on the second power control parameter. The operations of 2225 may be performed according to the methods described herein. In some examples, aspects of the operations of 2225 may be performed by a power control parameter adjuster as described with reference to FIGS. 9 through 12.

At 2230, the UE may transmit, to the base station, the uplink message according to the determined transmit power and based on the first power control parameter and the second power control parameter. The operations of 2230 may be performed according to the methods described herein. In some examples, aspects of the operations of 2230 may be performed by an uplink message transmission component as described with reference to FIGS. 9 through 12.

Figure 23:
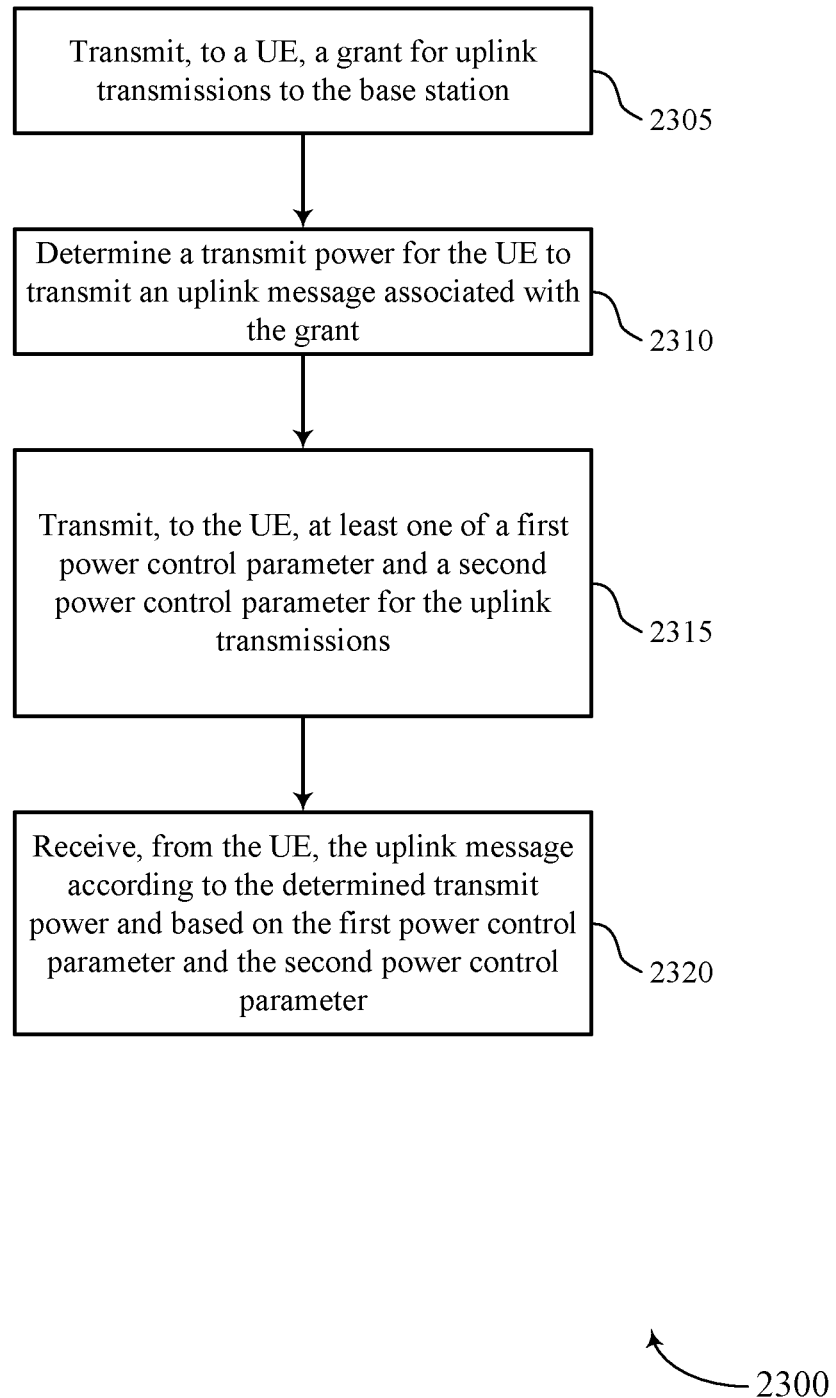

FIG. 23 shows a flowchart illustrating a method 2300 that supports power control enhancement for inter-UE multiplexing in accordance with aspects of the present disclosure. The operations of method 2300 may be implemented by a base station 105 or its components as described herein. For example, the operations of method 2300 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, a grant for uplink transmissions to the base station. The operations of 2305 may be performed according to the methods described herein. In some examples, aspects of the operations of 2305 may be performed by a grant transmission component as described with reference to FIGS. 13 through 16.

At 2310, the base station may determine a transmit power for the UE to transmit an uplink message associated with the grant. The operations of 2310 may be performed according to the methods described herein. In some examples, aspects of the operations of 2310 may be performed by an uplink message power determination component as described with reference to FIGS. 13 through 16.

At 2315, the base station may transmit, to the UE, at least one of a first power control parameter and a second power control parameter for the uplink transmissions. The operations of 2315 may be performed according to the methods described herein. In some examples, aspects of the operations of 2315 may be performed by a power control parameter transmission component as described with reference to FIGS. 13 through 16.

At 2320, the base station may receive, from the UE, the uplink message according to the determined transmit power and based on the at least one of the first power control parameter and the second power control parameter. The operations of 2320 may be performed according to the methods described herein. In some examples, aspects of the operations of 2320 may be performed by an uplink message reception component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving, from a network device, a configured grant for transmission of a message by the UE, the configured grant comprising an initial power configuration for the configured grant;

receiving, from the network device, a group-common downlink control information message, the group-common downlink control information message comprising a power control parameter and a configured grant index, a configured grant group index, a priority level, or a combination thereof;

receiving, from the network device, an indication that the power control parameter is associated with the configured grant;

determining a transmit power for transmitting the message associated with the configured grant based at least in part on the initial power configuration, the power control parameter, the configured grant index, the configured grant group index, the priority level, or the combination thereof, and the indication that the power control parameter is associated with the configured grant; and transmitting the message to another UE in a sidelink communication according to the determined transmit power.

2. The method of claim 1, wherein determining the transmit power for transmitting the message further comprises:

determining a baseline transmit power based at least in part on the initial power configuration for the configured grant;

determining a power adjustment value based at least in part on the power control parameter received in the group-common downlink control information message; and applying the power adjustment value to the baseline transmit power to obtain the transmit power for transmitting the message.

3. The method of claim 2, further comprising:

determining to apply the power adjustment value to the baseline transmit power based at least in part on a processing time for the UE to apply the power adjustment value to the baseline transmit power.

4. The method of claim 3, wherein the processing time comprises a minimum processing time for the UE to prepare a dynamic transmission after receiving a dynamic grant scheduling the dynamic transmission.

5. The method of claim 3, wherein the power adjustment value is applied to the baseline transmit power for an entirety of the message or not applied to the baseline transmit power for any of the message based at least in part on the processing time.

6. The method of claim 1, wherein receiving the group-common downlink control information message comprising the power control parameter and receiving the indication that the power control parameter is associated with the configured grant comprises:

receiving multiple group-common downlink control information messages comprising different power control parameters;

determining multiple radio network temporary identifiers corresponding to the multiple group-common downlink control information messages; and determining the power control parameter is associated with the configured grant based at least in part on a group-common radio network temporary identifier corresponding to the group-common downlink control information message comprising the power control parameter associated with the configured grant, wherein the group-common radio network temporary identifier is one of the multiple radio network temporary identifiers.

7. The method of claim 6, wherein the multiple radio network temporary identifiers are associated with different priority levels of the configured grant, one group-common downlink control information message corresponds to one or multiple configured grants, the configured grant is associated with a single group-common downlink control information message, or a combination thereof.

8. The method of claim 1, wherein the group-common downlink control information message comprises a second power control parameter, and further comprising:

receiving, from the network device, a second configured grant for transmission of a second message by the UE;

receiving, from the network device, a second indication that the second power control parameter is associated with the second configured grant; and determining a second transmit power for transmitting the second message associated with the second configured grant based at least in part on the second power control parameter.

9. The method of claim 1, wherein the indication that the power control parameter is associated with the configured grant is received via radio resource control signaling or the group-common downlink control information message.

10. A method for wireless communications at a network device, comprising:

transmitting, to a user equipment (UE), a configured grant for transmission of a message by the UE, the configured grant comprising an initial power configuration for the configured grant;

determining a transmit power for the UE to transmit the message associated with the configured grant;

transmitting, to the UE, a group-common downlink control information message, the group-common downlink control information message comprising a power control parameter for the determined transmit power, and a configured grant index, a configured grant group index, a priority level, or a combination thereof, and wherein the transmit power for transmitting the message is determined based at least in part on the configured grant index, the configured grant group index, the priority level, or the combination thereof; and transmitting, to the UE, an indication that the power control parameter is associated with the configured grant.

11. The method of claim 10, wherein determining the transmit power for transmitting the message further comprises:

determining a baseline transmit power based at least in part on the initial power configuration for the configured grant;

determining a power adjustment value for the UE to apply to the baseline transmit power based at least in part on a priority of data to be transmitted in the message; and transmitting, to the UE, the power adjustment value in the power control parameter of the group-common downlink control information message.

12. The method of claim 10, wherein transmitting the group-common downlink control information message comprising the power control parameter and transmitting the indication that the power control parameter is associated with the configured grant comprises:

transmitting multiple group-common downlink messages comprising different power control parameters; and transmitting multiple radio network temporary identifiers corresponding to the multiple group-common downlink messages, wherein the power control parameter is associated with the configured grant based at least in part on a group-common radio network temporary identifier corresponding to the group-common downlink control information message comprising the power control parameter associated with the configured grant different, the group-common radio network temporary identifier is one of the multiple radio network temporary identifiers.

13. The method of claim 12, wherein the multiple group-common radio network temporary identifiers are associated with different priority levels of the configured grant, one group-common downlink control information message corresponds to one or multiple configured grants, the configured grant is associated with a single group-common downlink control information message, or a combination thereof.

14. The method of claim 10, further comprising:
transmitting, to the UE, a second configured grant for transmission of a second message by the UE;
determining a second transmit power for the UE to transmit the second message associated with the second configured grant, wherein the group-common downlink control information message comprising a second power control parameter for the determined second transmit power; and
transmitting, to the UE, a second indication that the second power control parameter is associated with the second configured grant.

15. The method of claim 10, wherein the indication that the power control parameter is associated with the configured grant is transmitted via radio resource control signaling or the group-common downlink control information message.

16. An apparatus for wireless communications at a user equipment (UE), comprising:
a processor; and
a memory coupled with the processor, wherein the memory includes instructions executable by the processor to cause the apparatus to:
receive, from a network device, a configured grant for transmissions of a message by the UE, the configured grant comprising an initial power configuration for the configured grant;
receive, from the network device, a group-common downlink control information message, the group-common downlink control information message comprising a power control parameter and a configured grant index, a configured grant group index, a priority level, or a combination thereof;
receive, from the network device, an indication that the power control parameter is associated with the configured grant;
determine a transmit power for transmitting the message associated with the configured grant based at least in part on the initial power configuration, the power control parameter, the configured grant index, the configured grant group index, the priority level, or the combination thereof, and the indication that the power control parameter is associated with the configured grant; and
transmit the message to another UE in a sidelink communication according to the determined transmit power.

17. The apparatus of claim 16, wherein the instructions to determine the transmit power for transmitting the message further are executable by the processor to cause the apparatus to:
determine a baseline transmit power based at least in part on the initial power configuration for the configured grant;
determine a power adjustment value based at least in part on the power control parameter received in the group-common downlink control information message; and
apply the power adjustment value to the baseline transmit power to obtain the transmit power for transmitting the message.

18. The apparatus of claim 17, wherein the instructions are further executable by the processor to cause the apparatus to:
determine to apply the power adjustment value to the baseline transmit power based at least in part on a processing time for the UE to apply the power adjustment value to the baseline transmit power.

19. The apparatus of claim 18, wherein the processing time comprises a minimum processing time for the UE to prepare a dynamic transmission after receiving a dynamic grant scheduling the dynamic transmission.

20. The apparatus of claim 18, wherein the power adjustment value is applied to the baseline transmit power for an entirety of the message or not applied to the baseline transmit power for any of the message based at least in part on the processing time.

21. The apparatus of claim 16, wherein the instructions to receive the group-common downlink control information message comprising the power control parameter and to receive the indication that the power control parameter is associated with the configured grant are further executable by the processor to cause the apparatus to:
receive multiple group-common downlink control information messages comprising different power control parameters;
determine multiple radio network temporary identifiers corresponding to the multiple group-common downlink control information messages; and
determine the power control parameter is associated with the configured grant based at least in part on a group-common radio network temporary identifier corresponding to the group-common downlink control information message comprising the power control parameter associated with the configured grant, wherein the group-common radio network temporary identifier is one of the multiple radio network temporary identifiers.

22. The apparatus of claim 21, wherein the multiple radio network temporary identifiers are associated with different priority levels of the configured grant, one group-common downlink control information message corresponds to one or multiple configured grants, the configured grant is associated with a single group-common downlink control information message, or a combination thereof.

23. The apparatus of claim 16, wherein the group-common downlink control information message comprises a second power control parameter, and the instructions are further executable by the processor to cause the apparatus to:
receive, from the network device, a second configured grant for transmission of a second message by the UE;
receive, from the network device, a second indication that the second power control parameter is associated with the second configured grant; and
determine a second transmit power for transmitting the second message associated with the second configured grant based at least in part on the second power control parameter.

24. An apparatus for wireless communications at a network device, comprising:
a processor; and a memory coupled with the processor, wherein the memory includes instructions executable by the processor to cause the apparatus to:

transmit, to a user equipment (UE), a configured grant for transmission of a message by the UE, the configured grant comprising an initial power configuration for the configured grant;

determine a transmit power for the UE to transmit the message associated with the configured grant;

transmit, to the UE, a group-common downlink control information message, the group-common downlink control information message comprising a power control parameter for the determined transmit power, and a configured grant index, a configured grant group index, a priority level, or a combination thereof, and wherein the transmit power for transmitting the message is determined based at least in part on the configured grant index, the configured grant group index, the priority level, or the combination thereof; and transmit, to the UE, an indication that the power control parameter is associated with the configured grant.

25. The apparatus of claim 24, wherein the instructions to determine the transmit power for transmitting the message further are executable by the processor to cause the apparatus to:

determine a baseline transmit power based at least in part on the initial power configuration for the configured grant;

determine a power adjustment value for the UE to apply to the baseline transmit power based at least in part on a priority of data to be transmitted in the message; and transmit, to the UE, the power adjustment value in the power control parameter of the group-common downlink control information message.

26. The apparatus of claim 24, wherein the instructions to transmit the group-common downlink control information message comprising the power control parameter and to transmit the indication that the power control parameter is associated with the configured grant are further executable by the processor to cause the apparatus to:

transmit multiple group-common downlink messages comprising different power control parameters; and transmit multiple radio network temporary identifiers corresponding to the multiple group-common downlink messages, wherein the power control parameter is associated with the configured grant based at least in part on a group-common radio network temporary identifier corresponding to the group-common downlink control information message comprising the power control parameter associated with the configured grant different, the group-common radio network temporary identifier is one of the multiple radio network temporary identifiers.

27. The apparatus of claim 24, wherein the instructions are further executable by the processor to cause the apparatus to:

transmit, to the UE, a second configured grant for transmission of a second message by the UE;

determine a second transmit power for the UE to transmit the second message associated with the second configured grant, wherein the group-common downlink control information message comprising a second power control parameter for the determined second transmit power; and transmit, to the UE, a second indication that the second power control parameter is associated with the second configured grant.

* * * * *